(12) United States Patent
Parker et al.

(10) Patent No.: US 12,105,104 B2
(45) Date of Patent: Oct. 1, 2024

(54) INTEGRATED CONSUMABLE DATA MANAGEMENT SYSTEM AND PLATFORM

(71) Applicant: Meso Scale Technologies, LLC., Rockville, MD (US)

(72) Inventors: Jennifer Parker, Frederick, MD (US); Slavi Mirtchev, Gaithersburg, MD (US); Manish Kochar, Rockville, MD (US); Robert Causey, Rockville, MD (US)

(73) Assignee: MESO SCALE TECHNOLOGIES, LLC., Rockville, MD (US)

( * ) Notice: Subject to any disclaimer, the term of this patent is extended or adjusted under 35 U.S.C. 154(b) by 267 days.

(21) Appl. No.: 17/321,099

(22) Filed: May 14, 2021

(65) Prior Publication Data

US 2021/0356482 A1 Nov. 18, 2021

Related U.S. Application Data

(60) Provisional application No. 63/025,344, filed on May 15, 2020.

(51) Int. Cl.
| | |
|---|---|
| *G01N 35/00* | (2006.01) |
| *B01L 3/00* | (2006.01) |
| *B65D 43/02* | (2006.01) |
| *B65D 43/26* | (2006.01) |
| *B65D 51/24* | (2006.01) |

(52) U.S. Cl.
CPC ........ *G01N 35/0099* (2013.01); *B01L 3/5055* (2013.01); *B01L 3/50853* (2013.01); *B01L 3/5457* (2013.01); *B65D 43/0214* (2013.01); *B65D 43/26* (2013.01); *B65D 51/243* (2013.01); *B01L 2200/026* (2013.01); *B01L 2300/044* (2013.01); *B65D 2543/00296* (2013.01); *B65D 2543/00333* (2013.01); *B65D 2543/0037* (2013.01); *B65D 2543/00824* (2013.01)

(58) Field of Classification Search
CPC ............... G01N 35/0099; B01L 3/5055; B01L 3/50853; B01L 3/5457
See application file for complete search history.

(56) References Cited

U.S. PATENT DOCUMENTS

| | | | |
|---|---|---|---|
| 2011/0143947 A1* | 6/2011 | Chamberlin | .......... B01L 3/5085 506/7 |
| 2019/0391170 A1* | 12/2019 | Kochar | ................. G06Q 10/10 |

FOREIGN PATENT DOCUMENTS

WO WO-2018017156 A1 * 1/2018 .......... B01L 3/50853

\* cited by examiner

*Primary Examiner* — Jill A Warden
*Assistant Examiner* — Alex Ramirez
(74) *Attorney, Agent, or Firm* — MEDLER FERRO WOODHOUSE & MILLS PLLC

(57) ABSTRACT

The present disclosure relates to an automated assay system adapted to receive consumables in the conduct of an assay. The assay system includes at least one of a loading cart, a door support system, a waste storage unit, and a robotic subsystem. The loading cart is configured to organize and transport consumables necessary for the performance of the assay system. The door support system is configured to maintain stability of doors of the automated assay system. The waste storage unit is configured to provide convenient disposal of consumables associated with the automated assay system. The robotic subsystem is configured to transport consumables within the automated assay system.

4 Claims, 78 Drawing Sheets

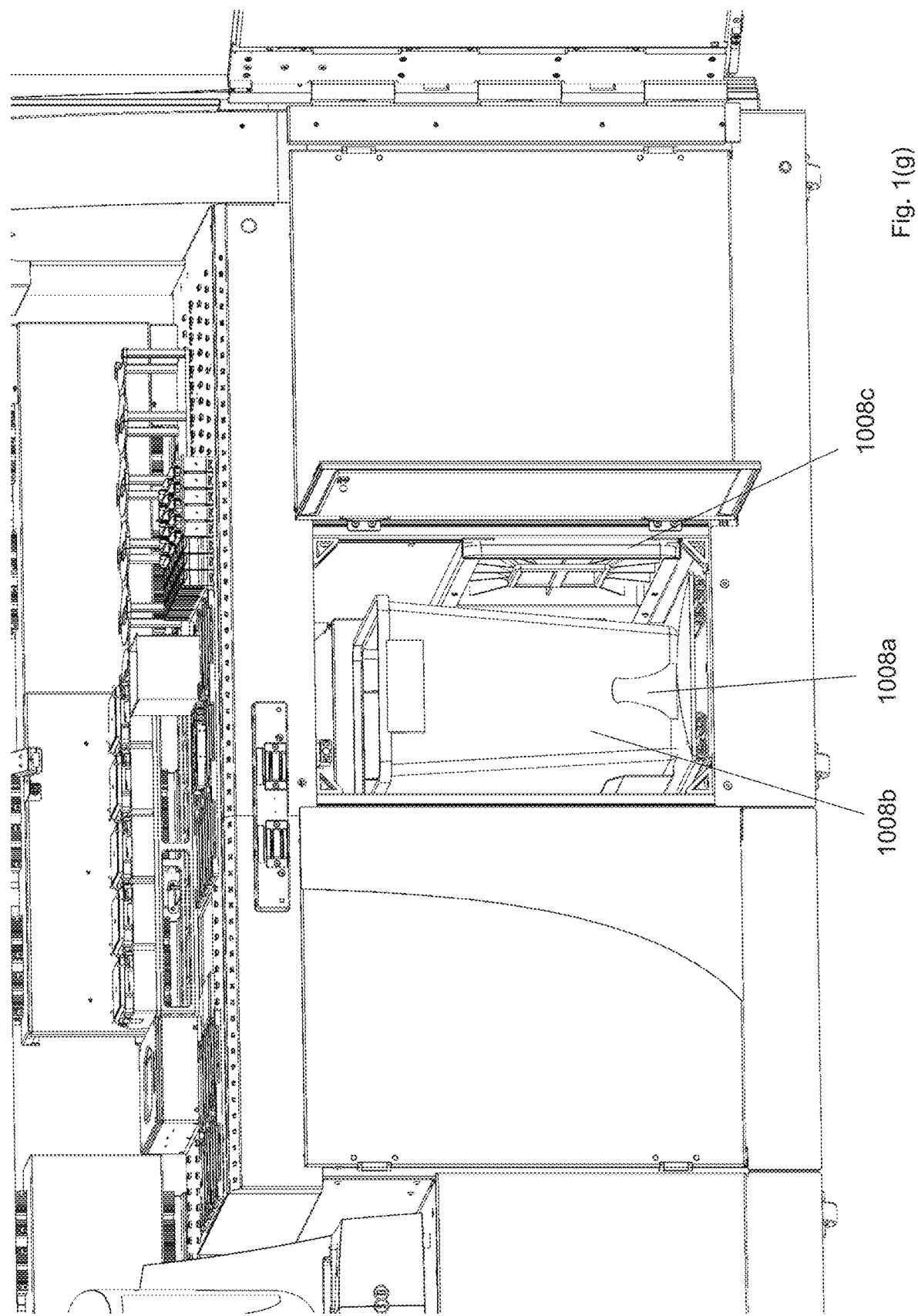

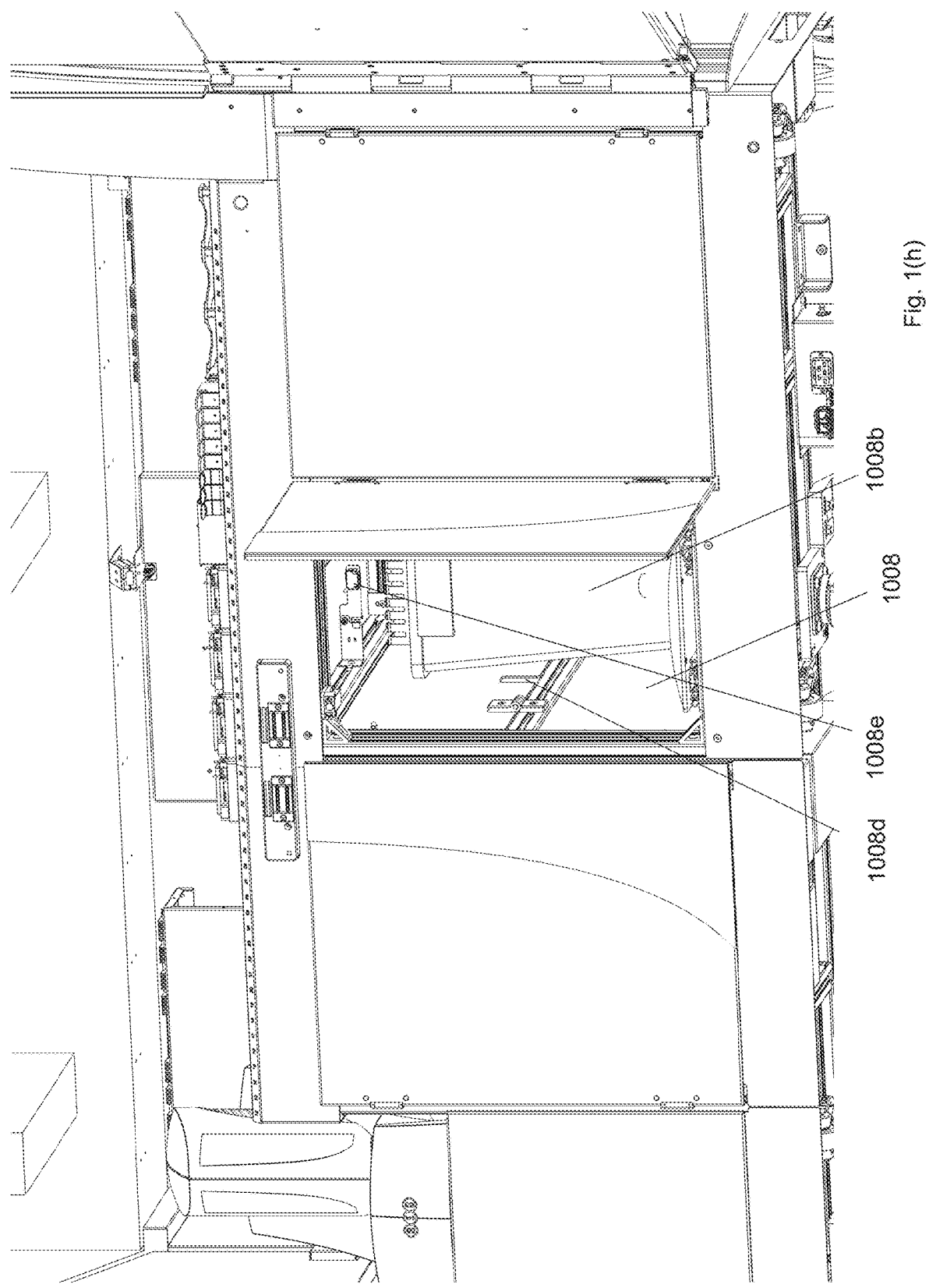

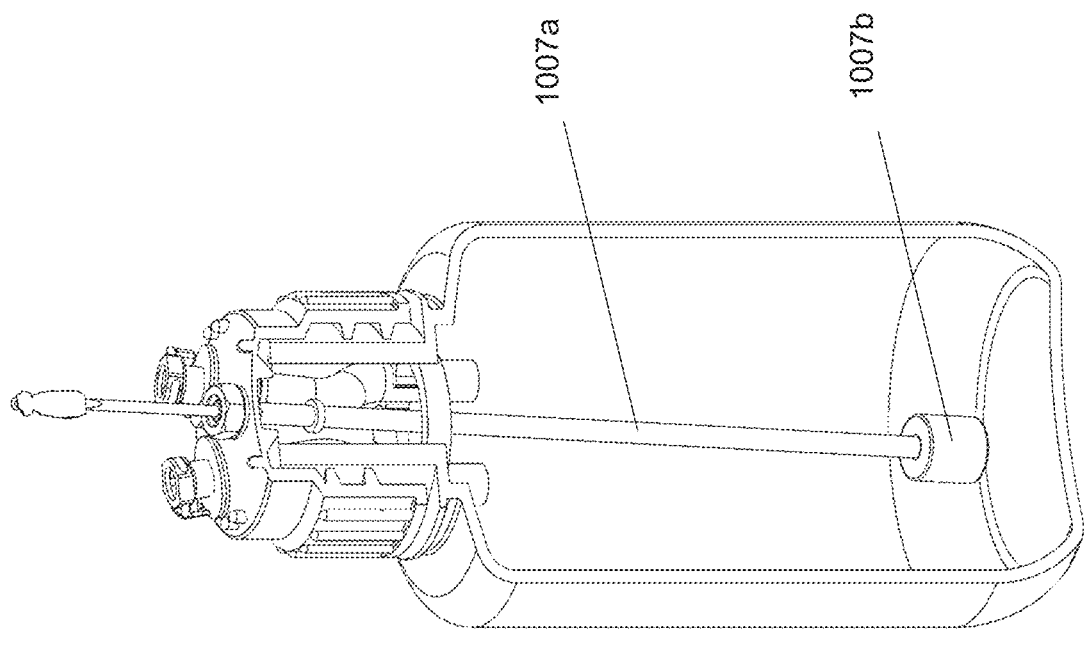

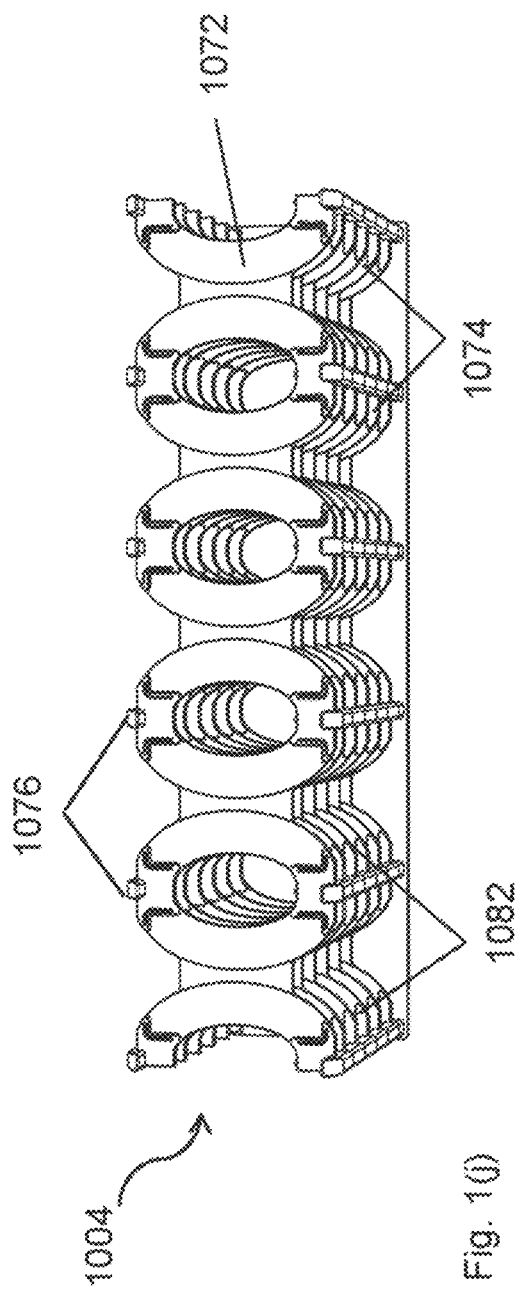

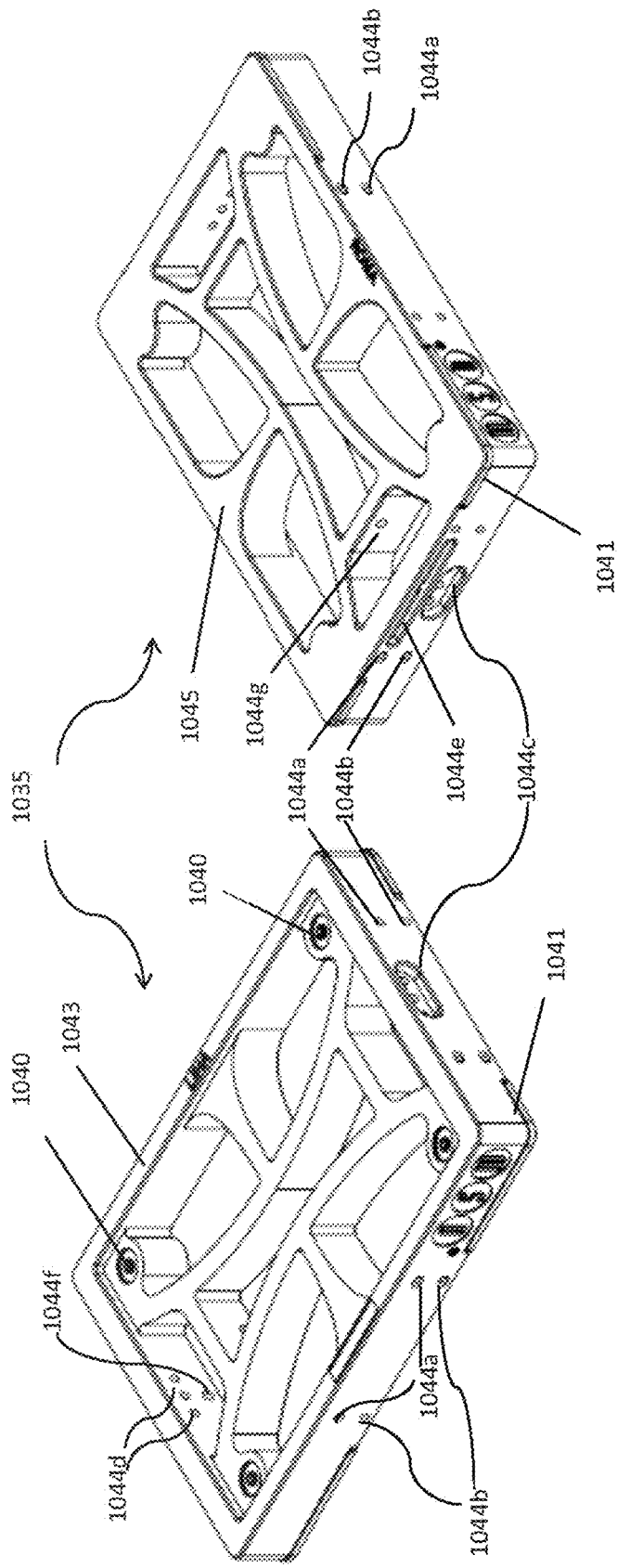

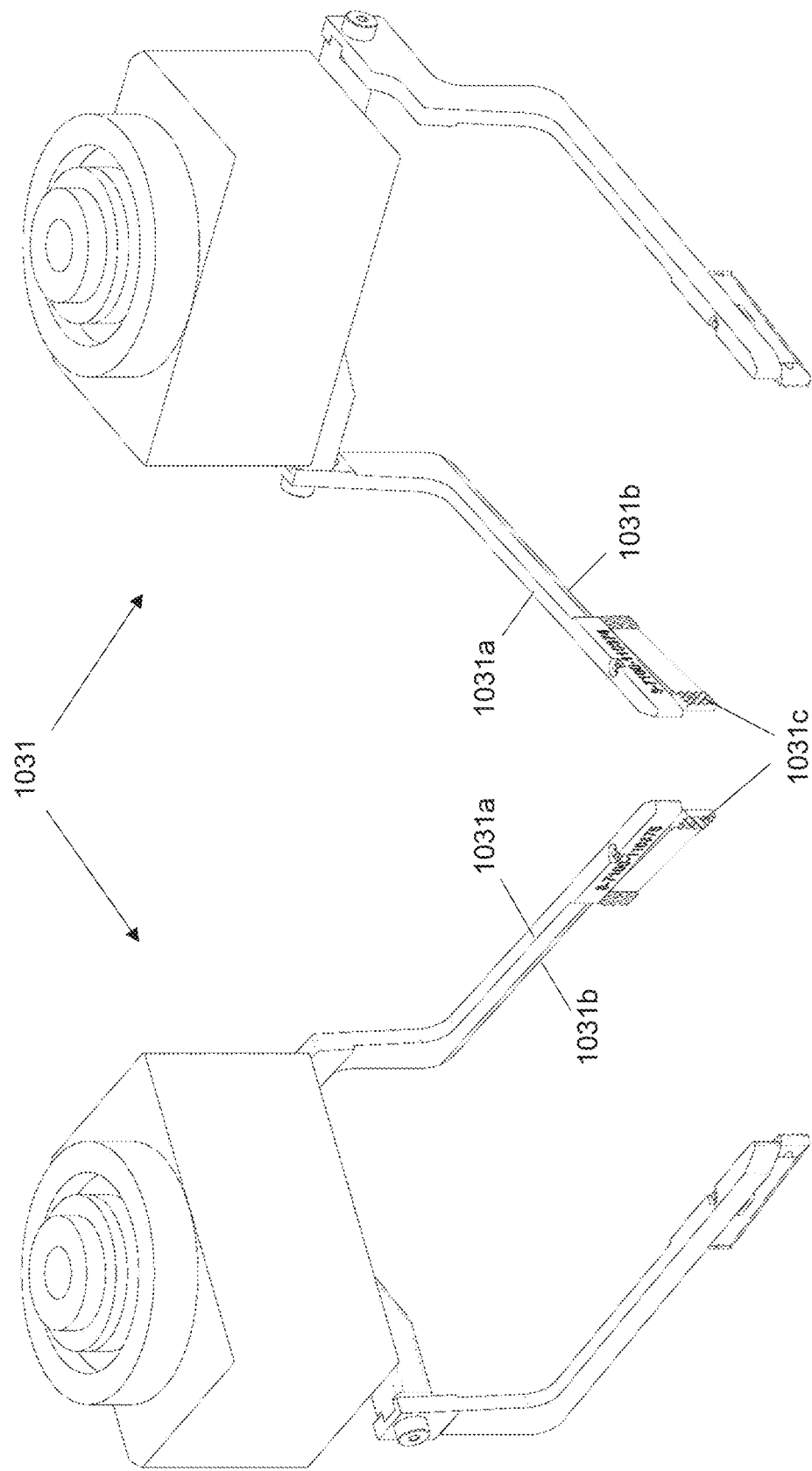

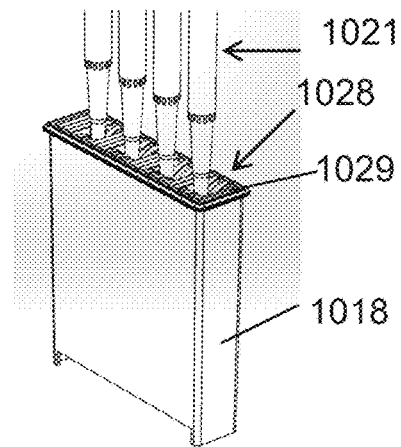
Fig. 5(a)
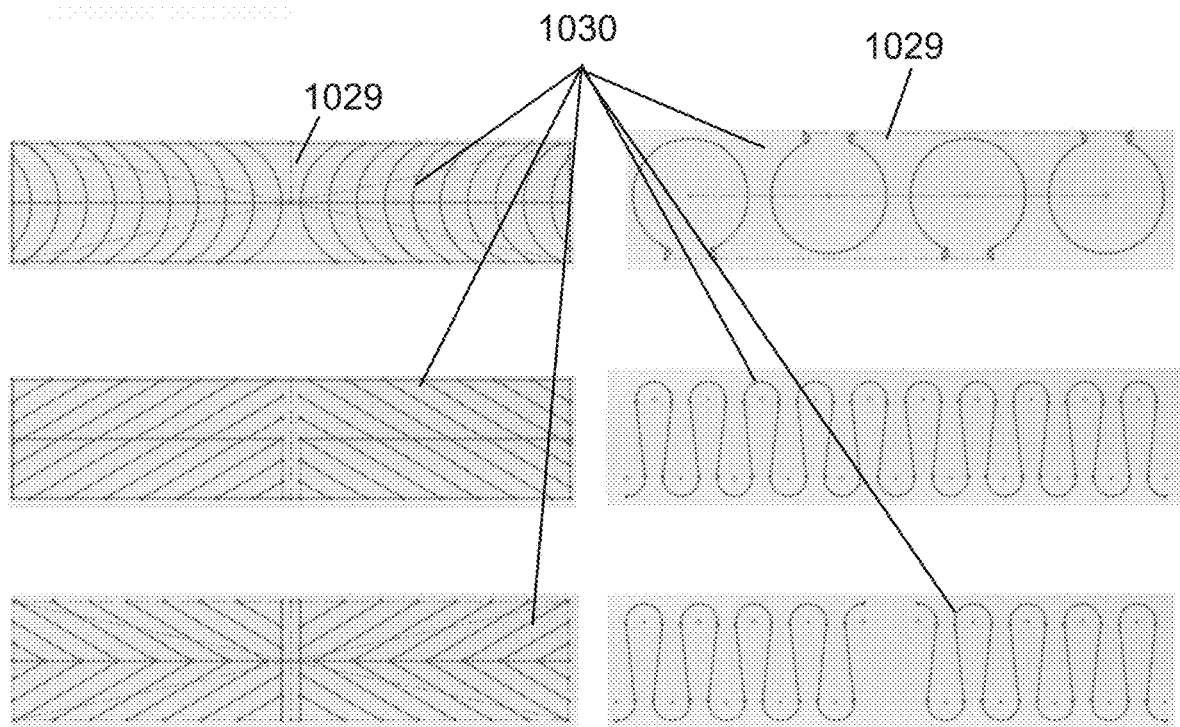
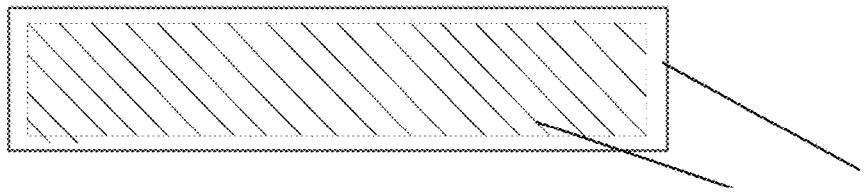
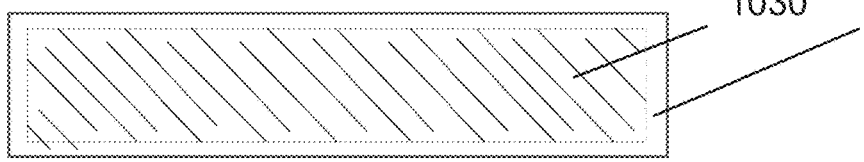
Fig. 5(b)

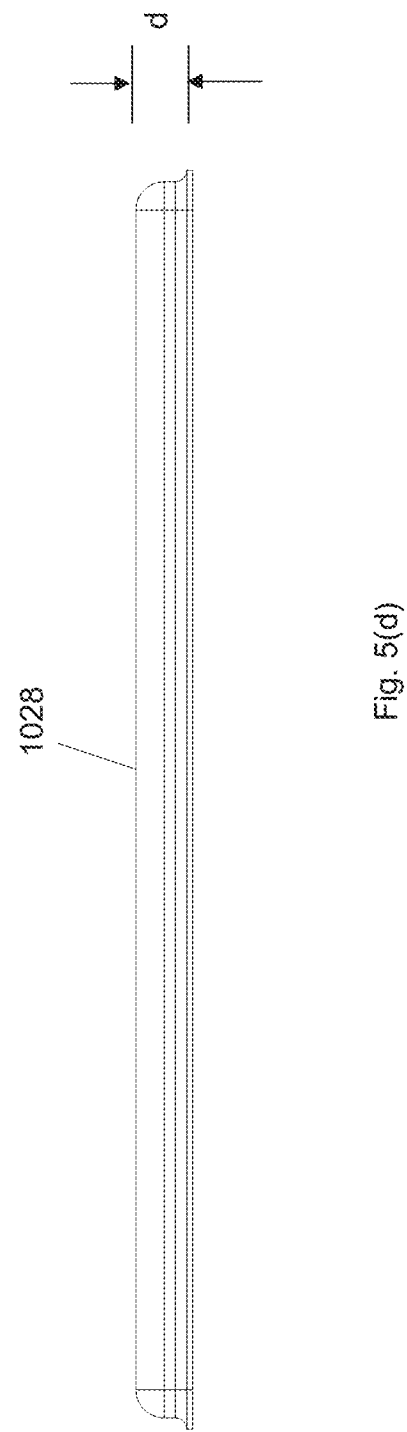

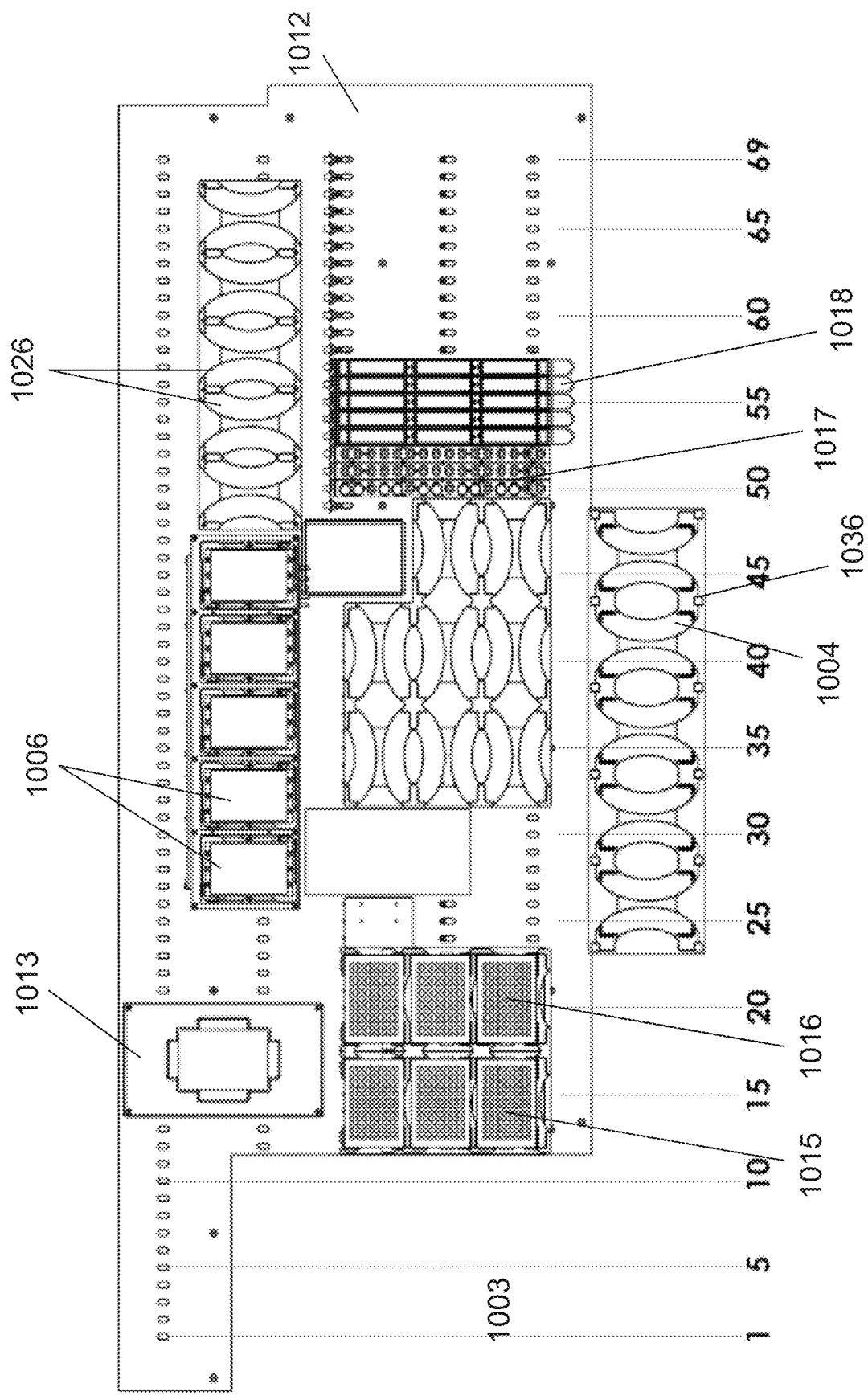
Fig. 7(b)(1)

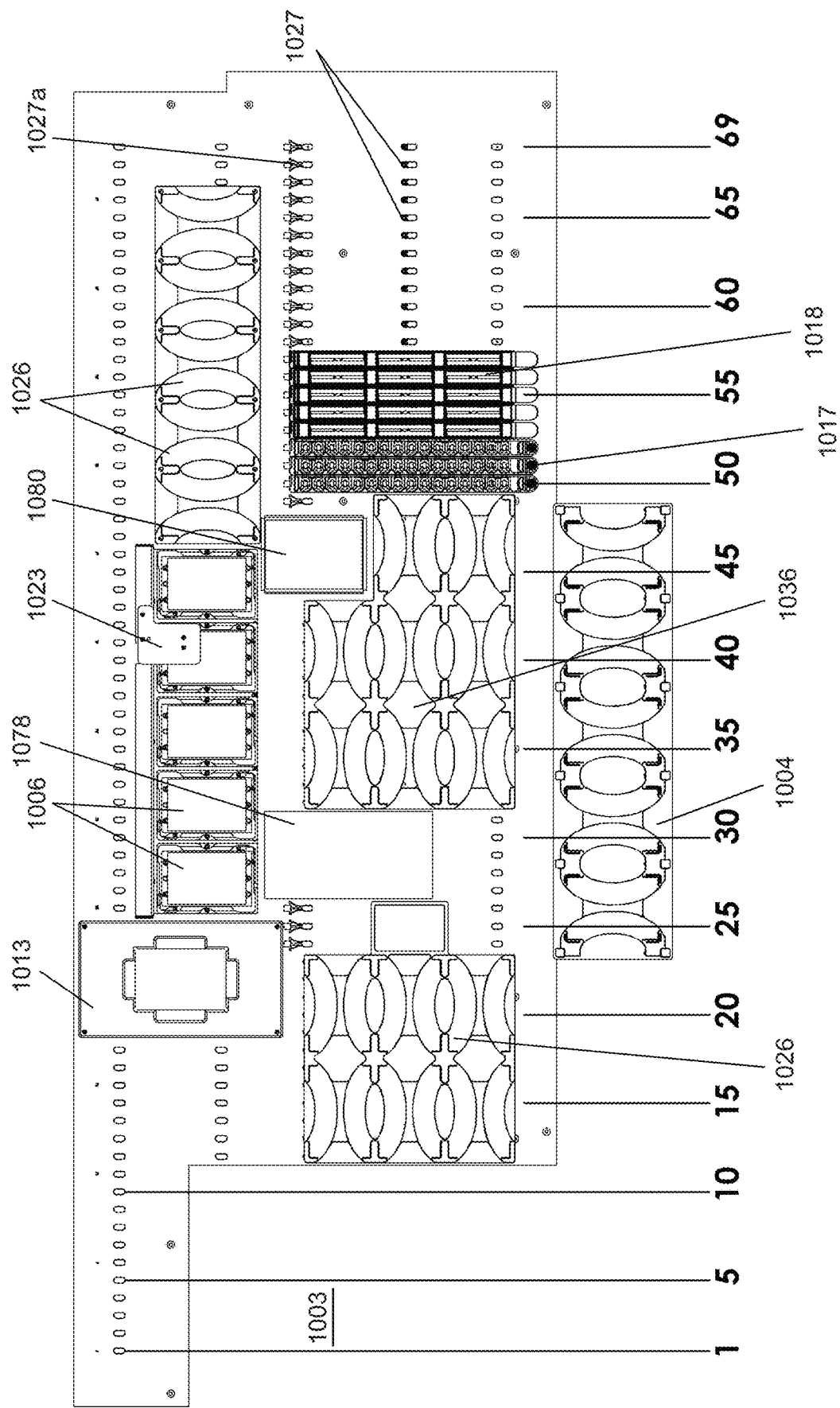
Fig. 7(b)(2)

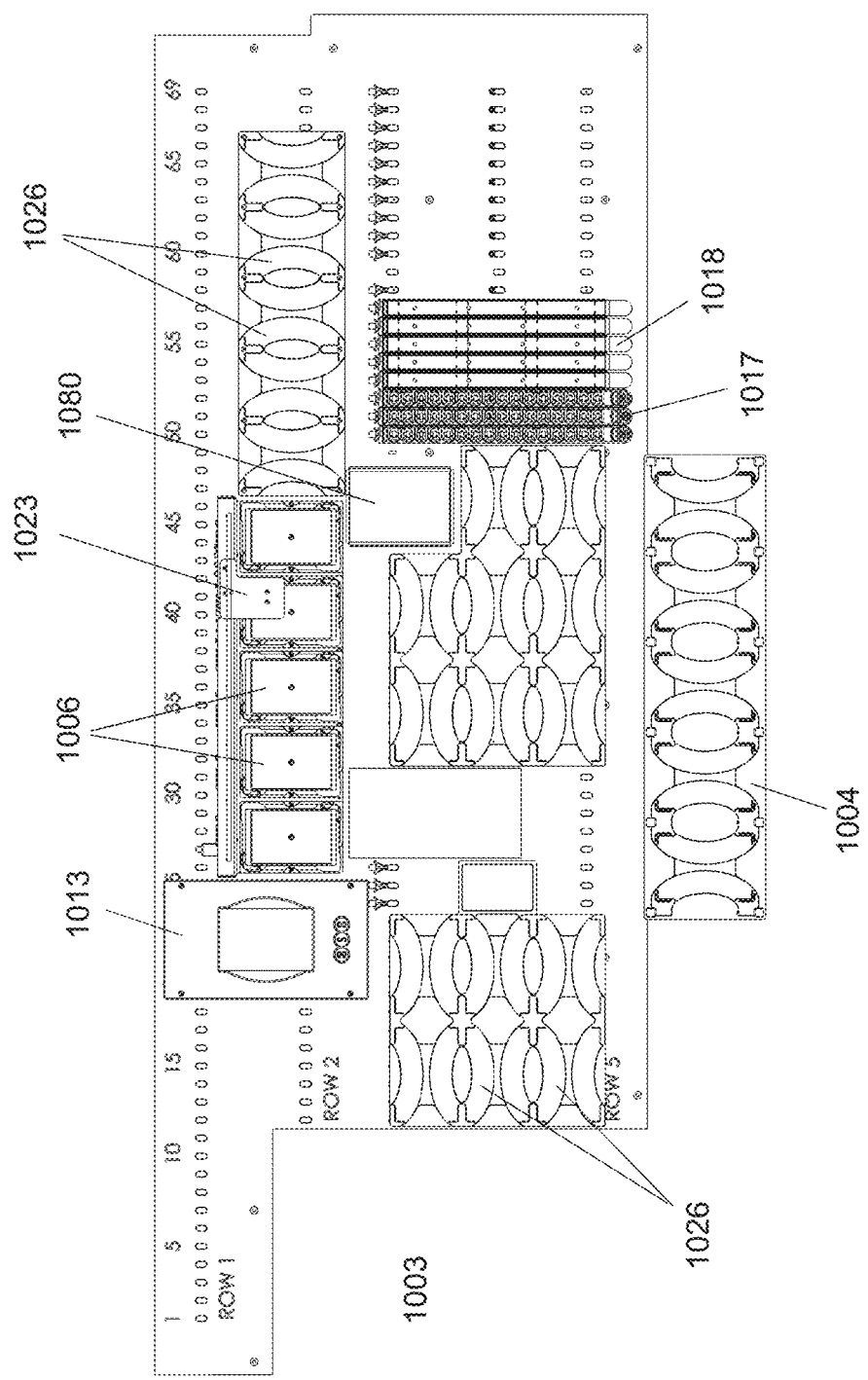
Fig. 7(b)(3)

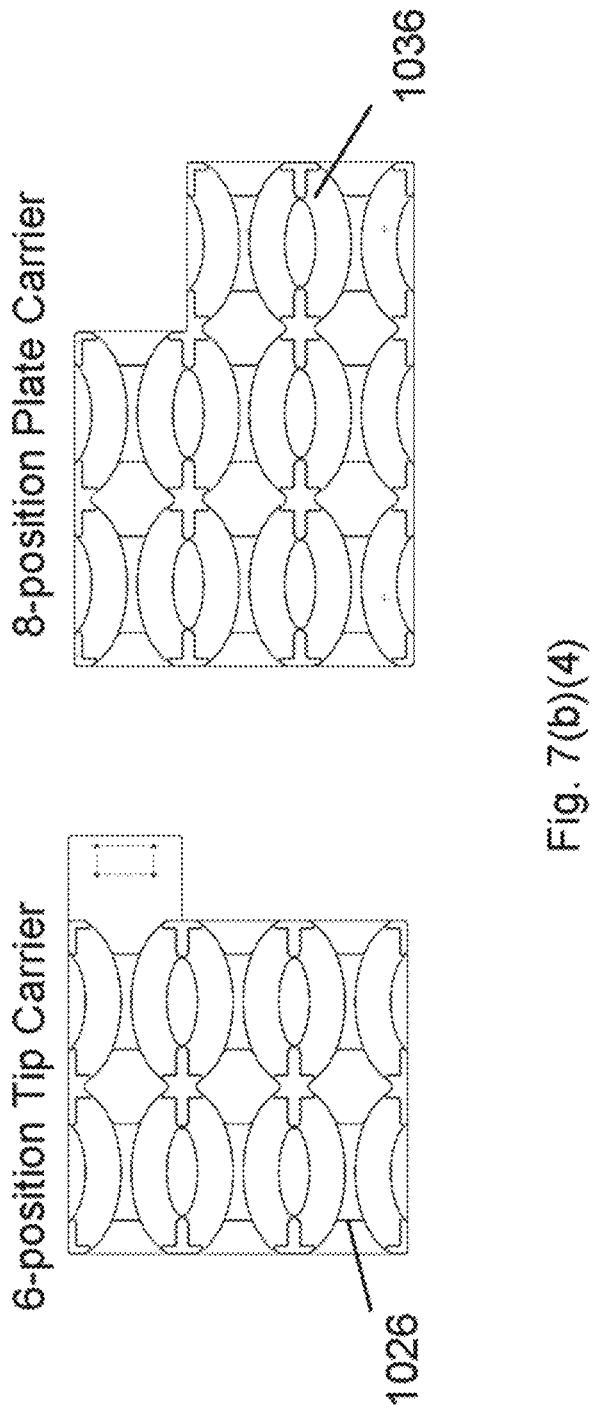
Fig. 7(b)(4)

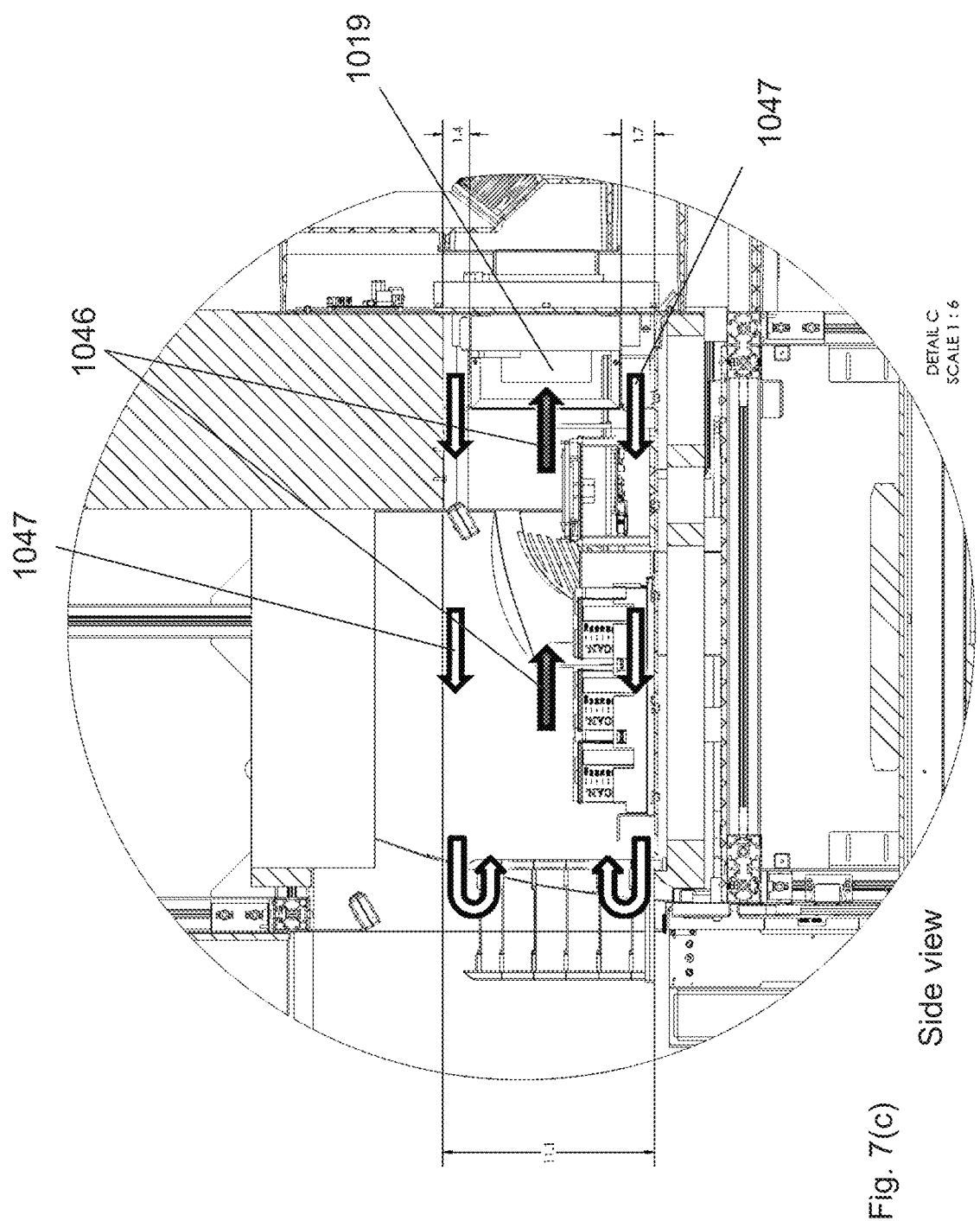
Fig. 7(c) Side view

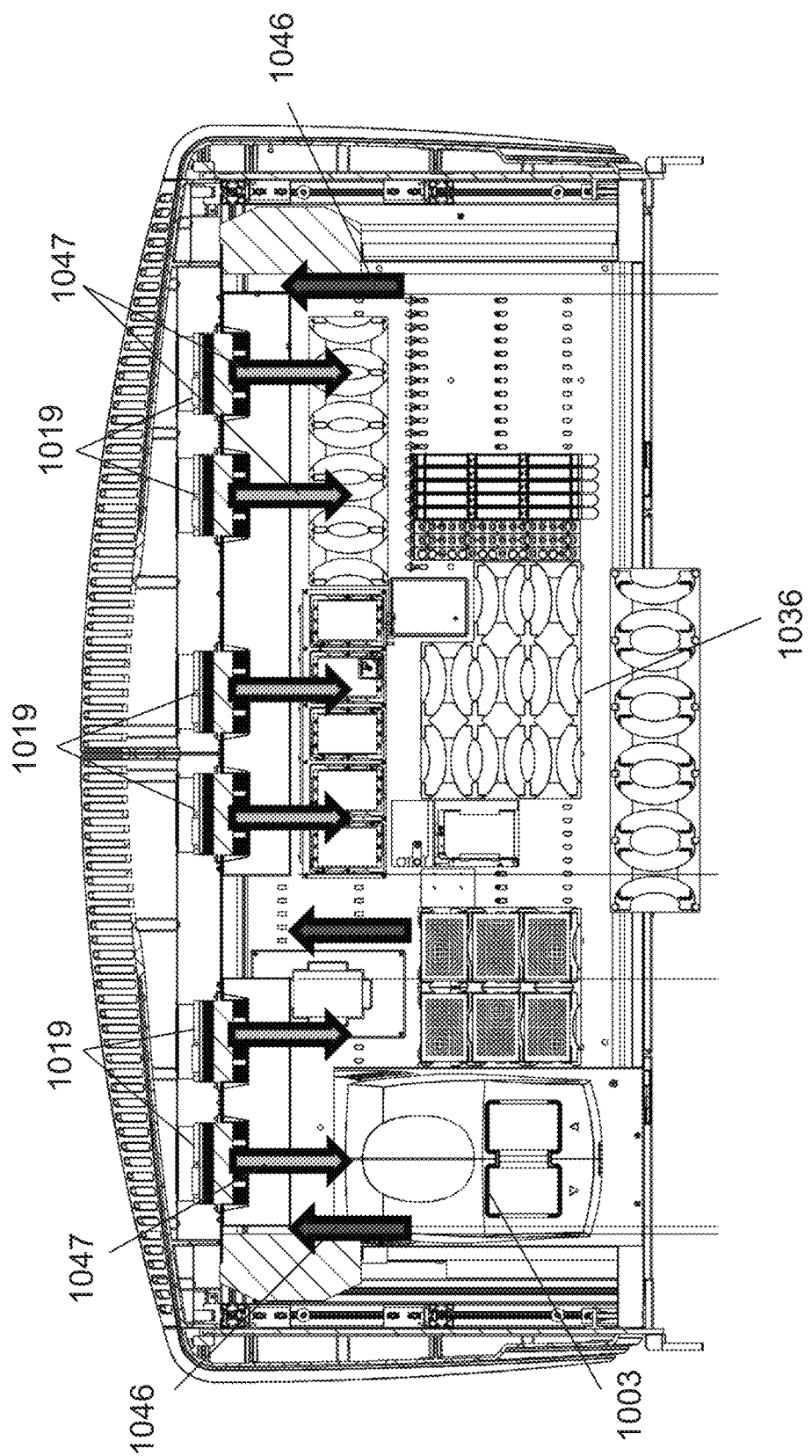

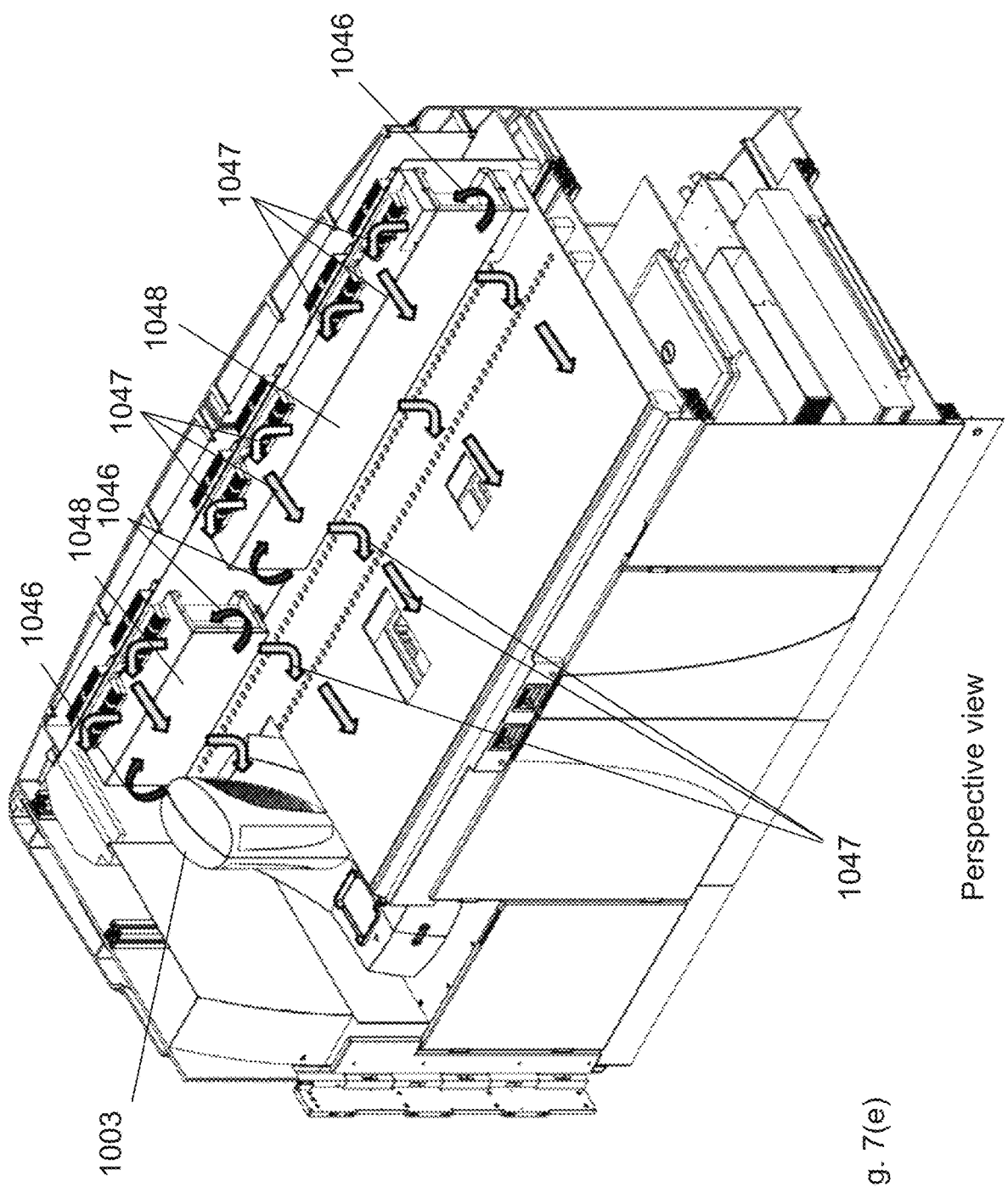
Fig. 7(e) Perspective view

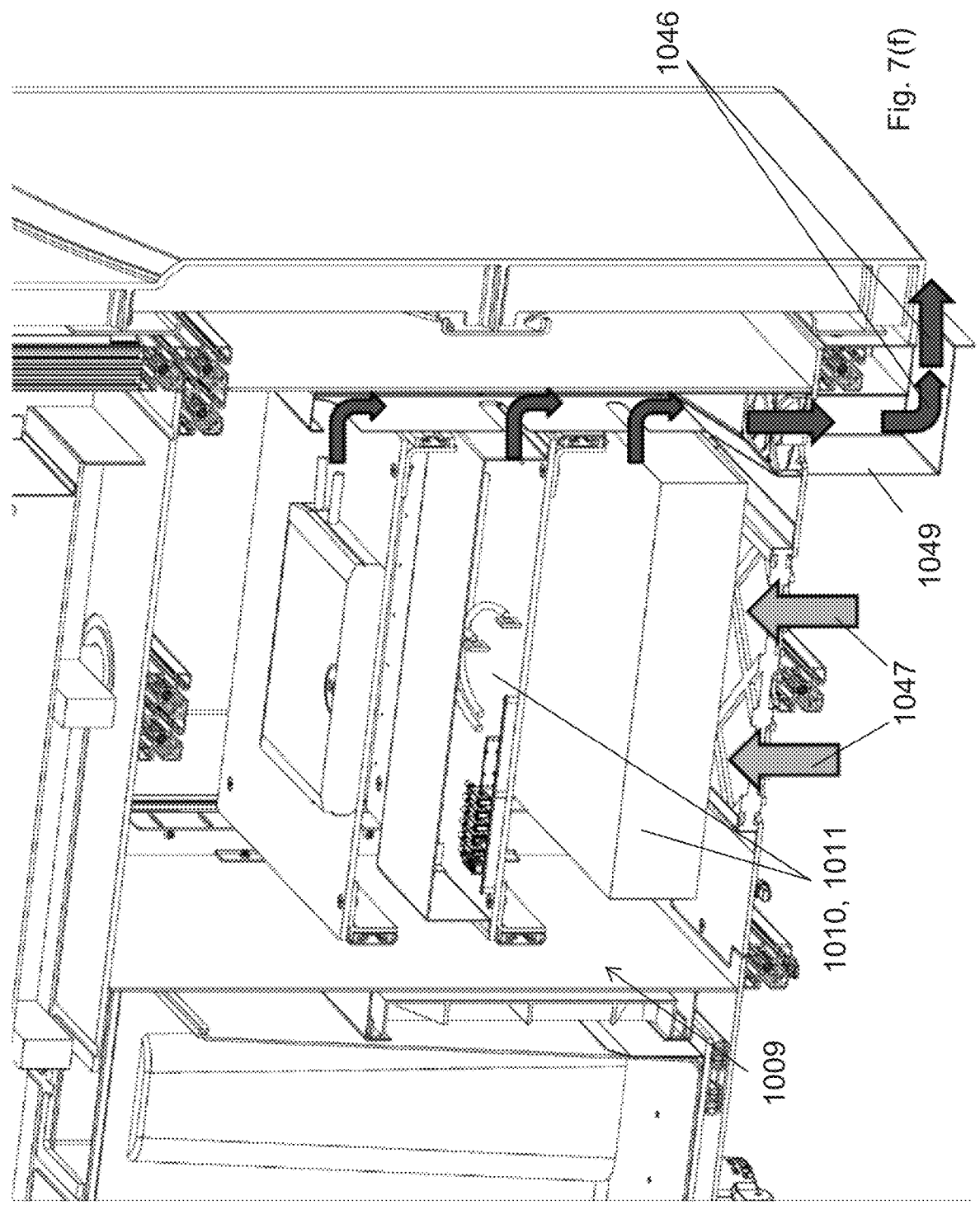

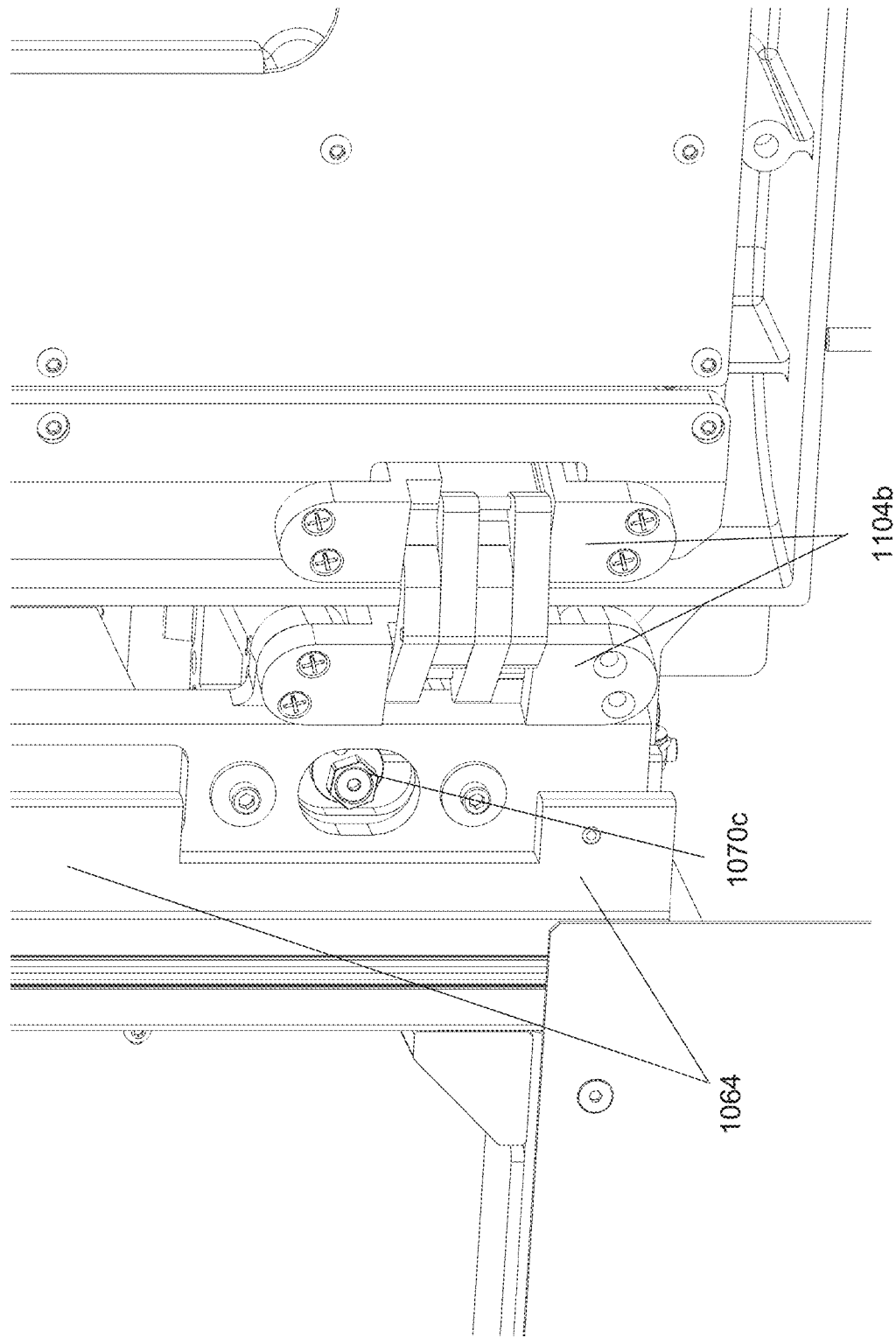

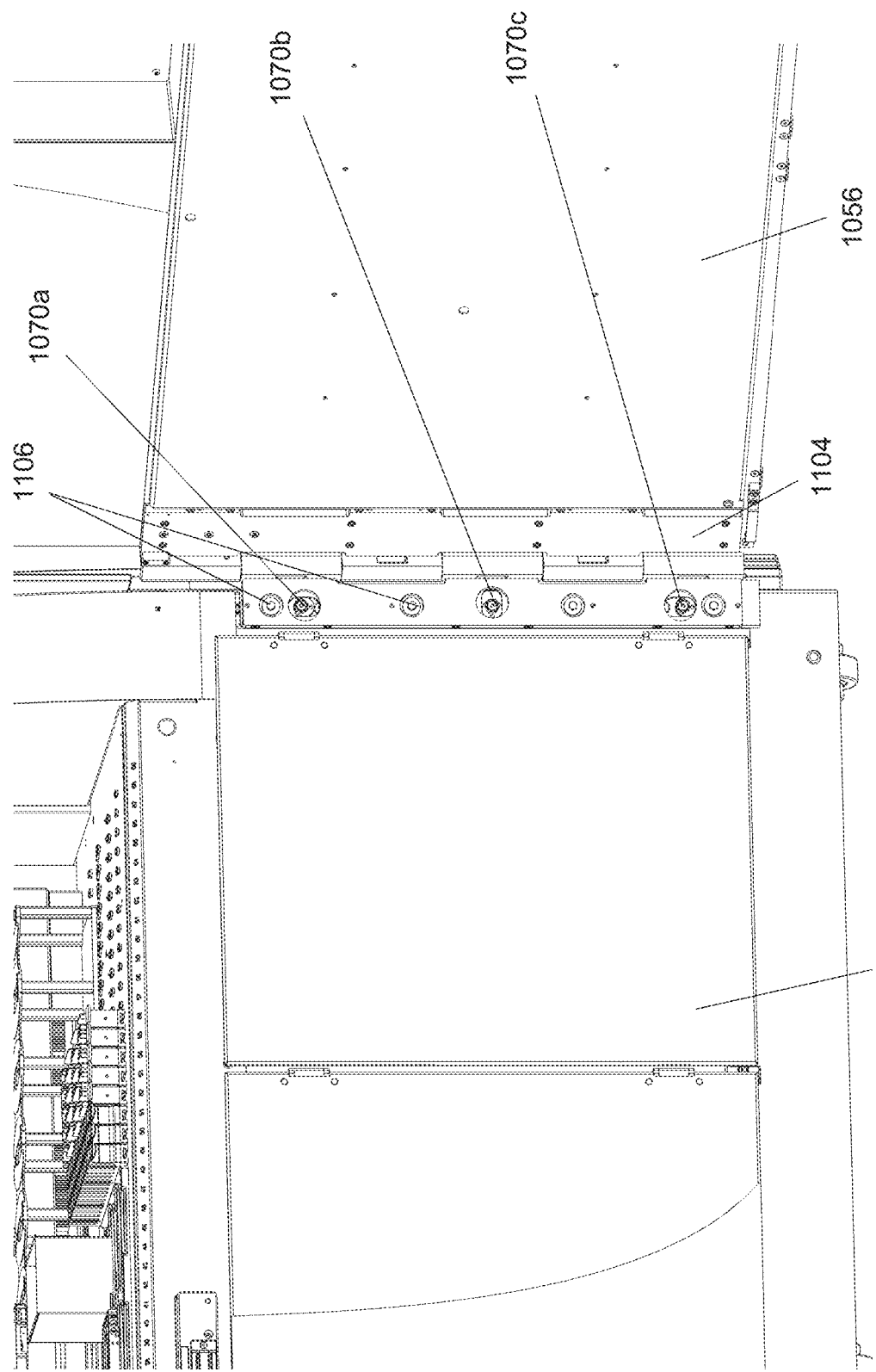

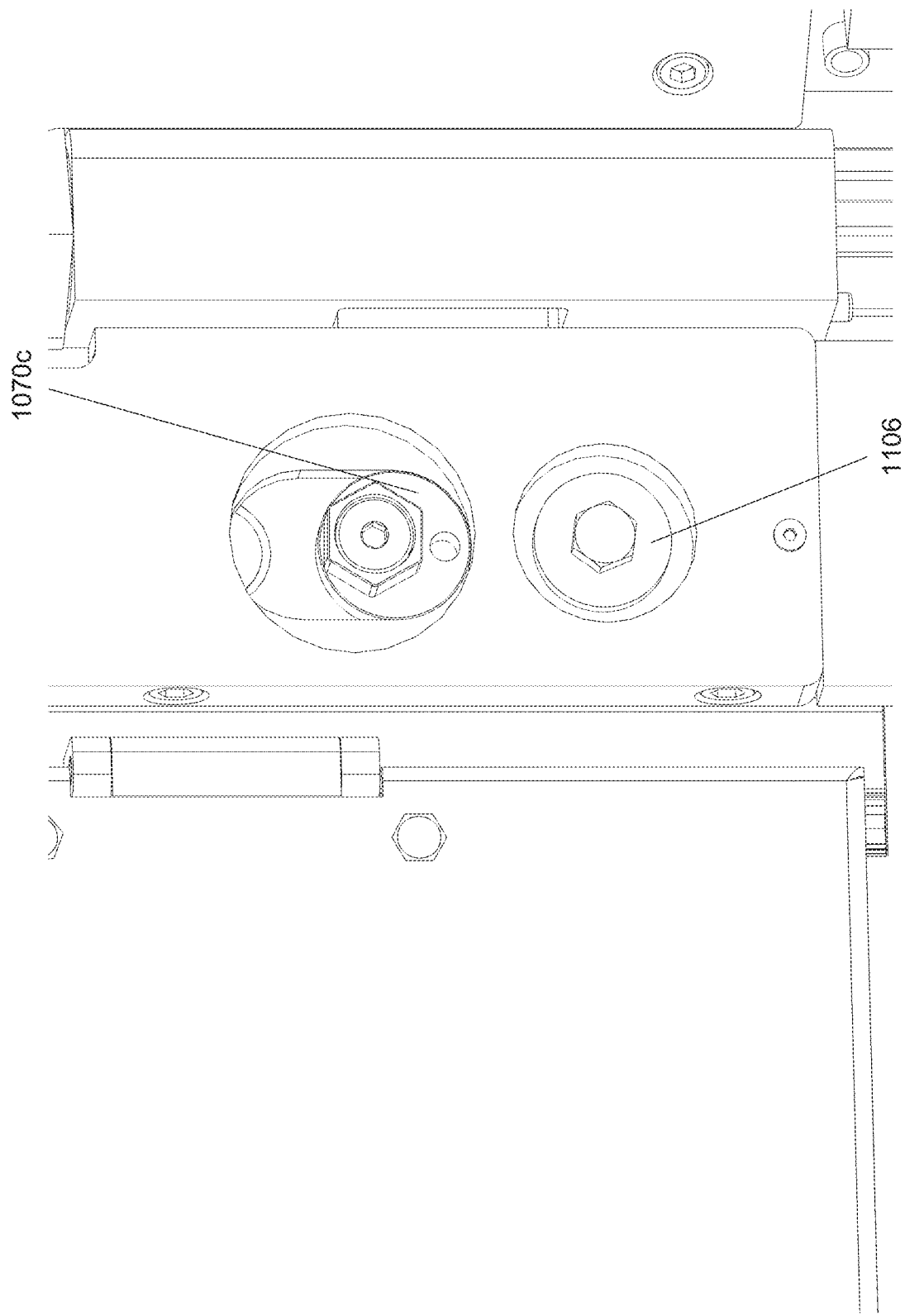

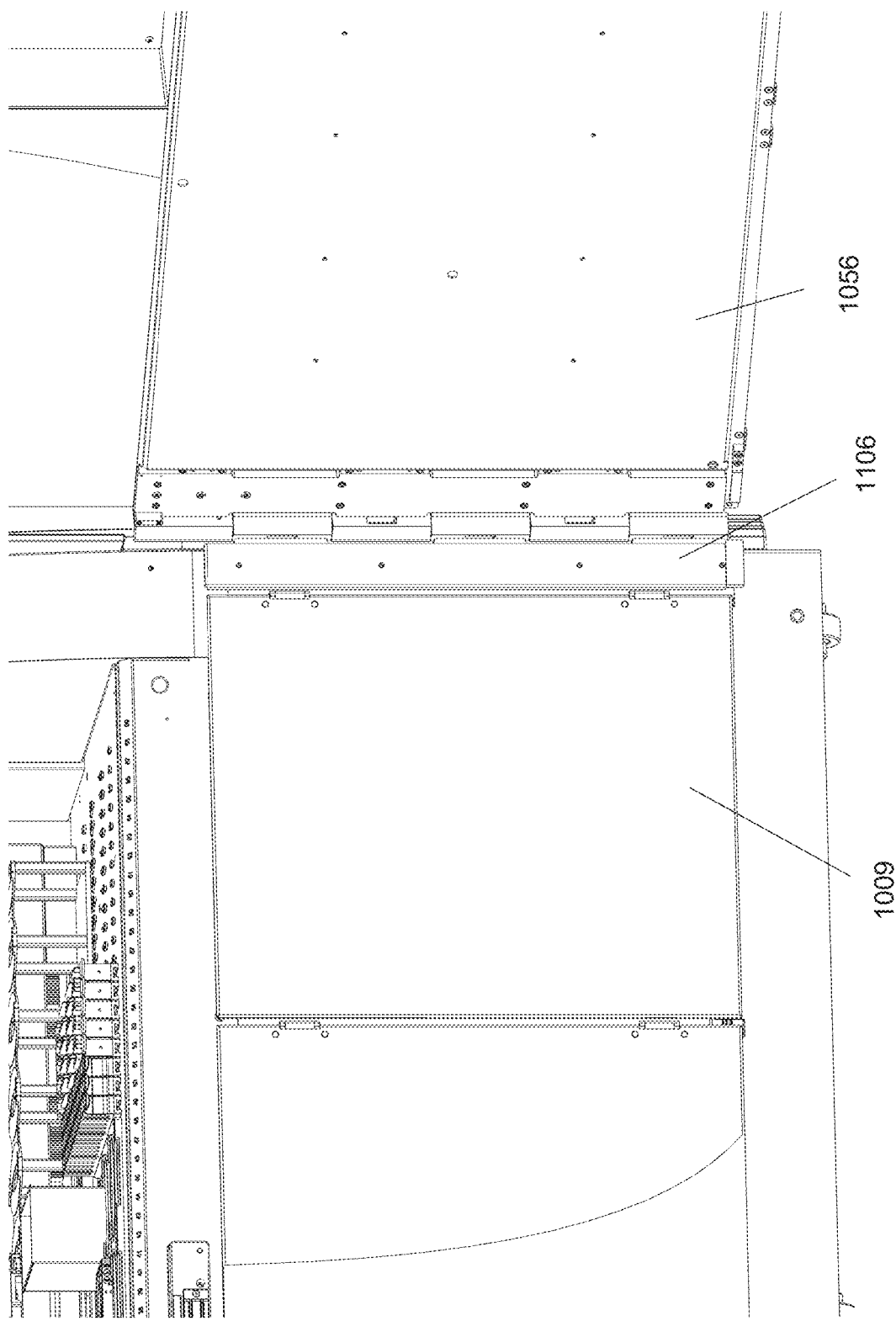

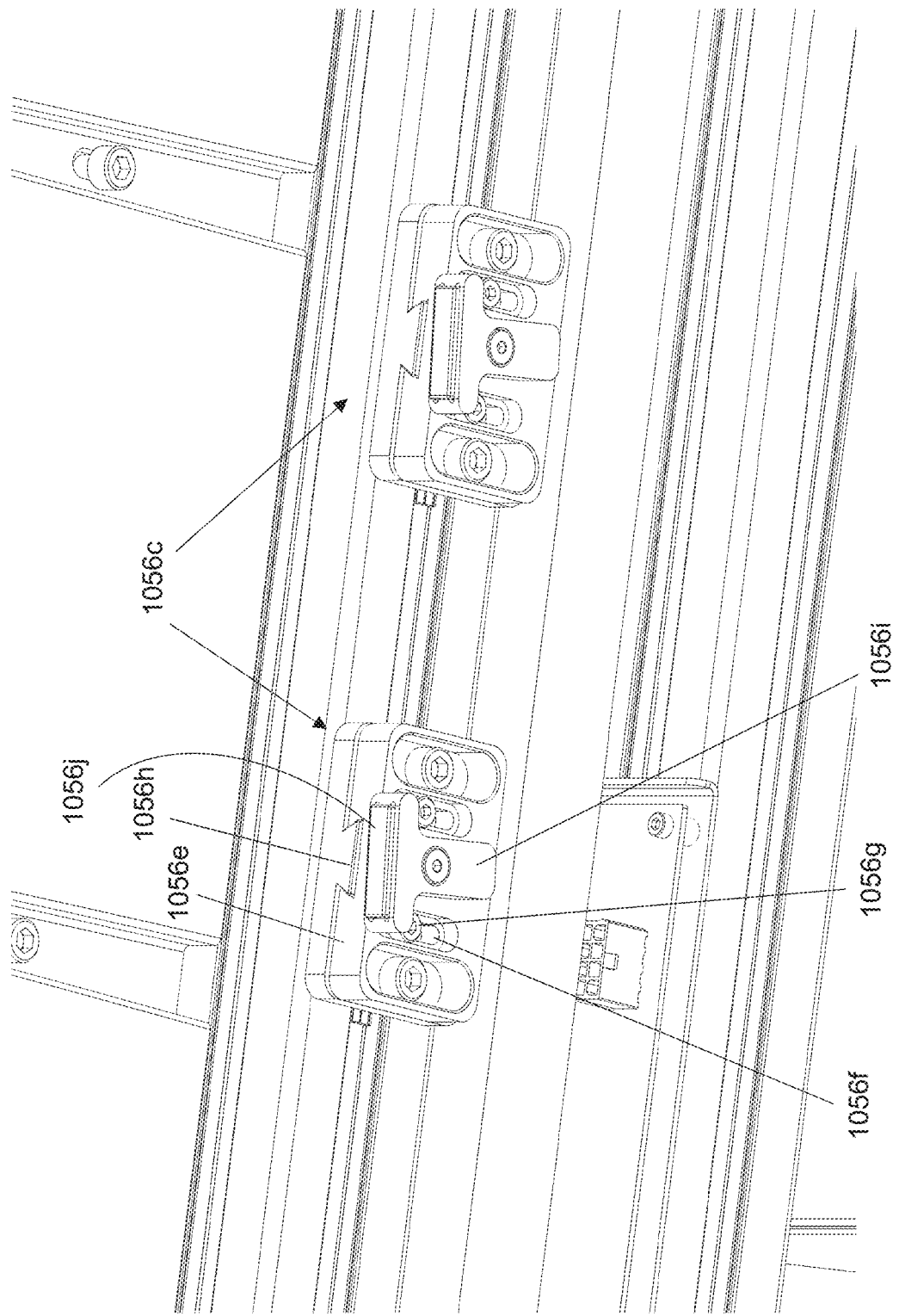

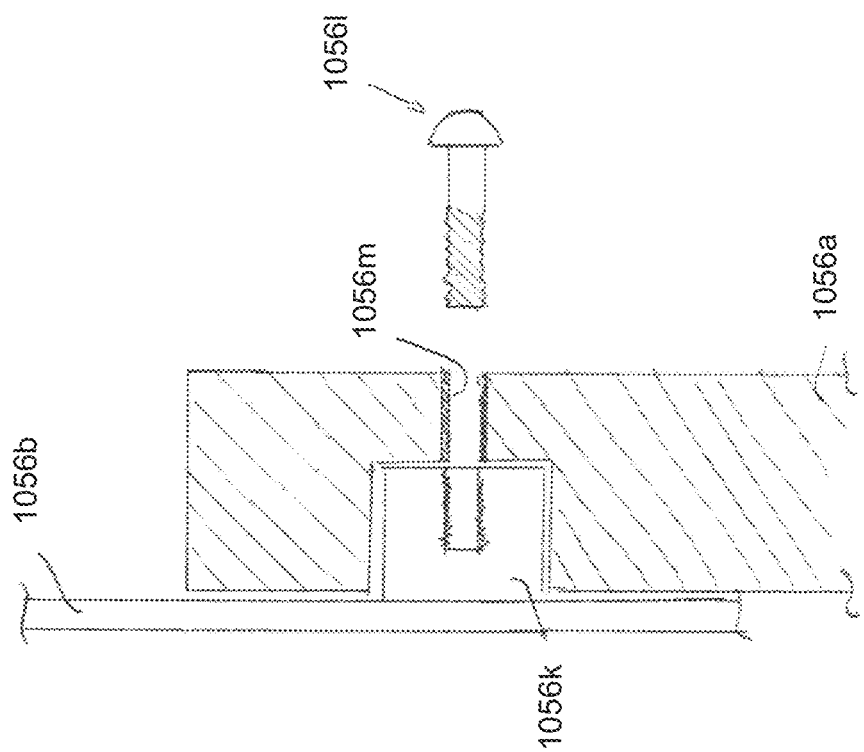

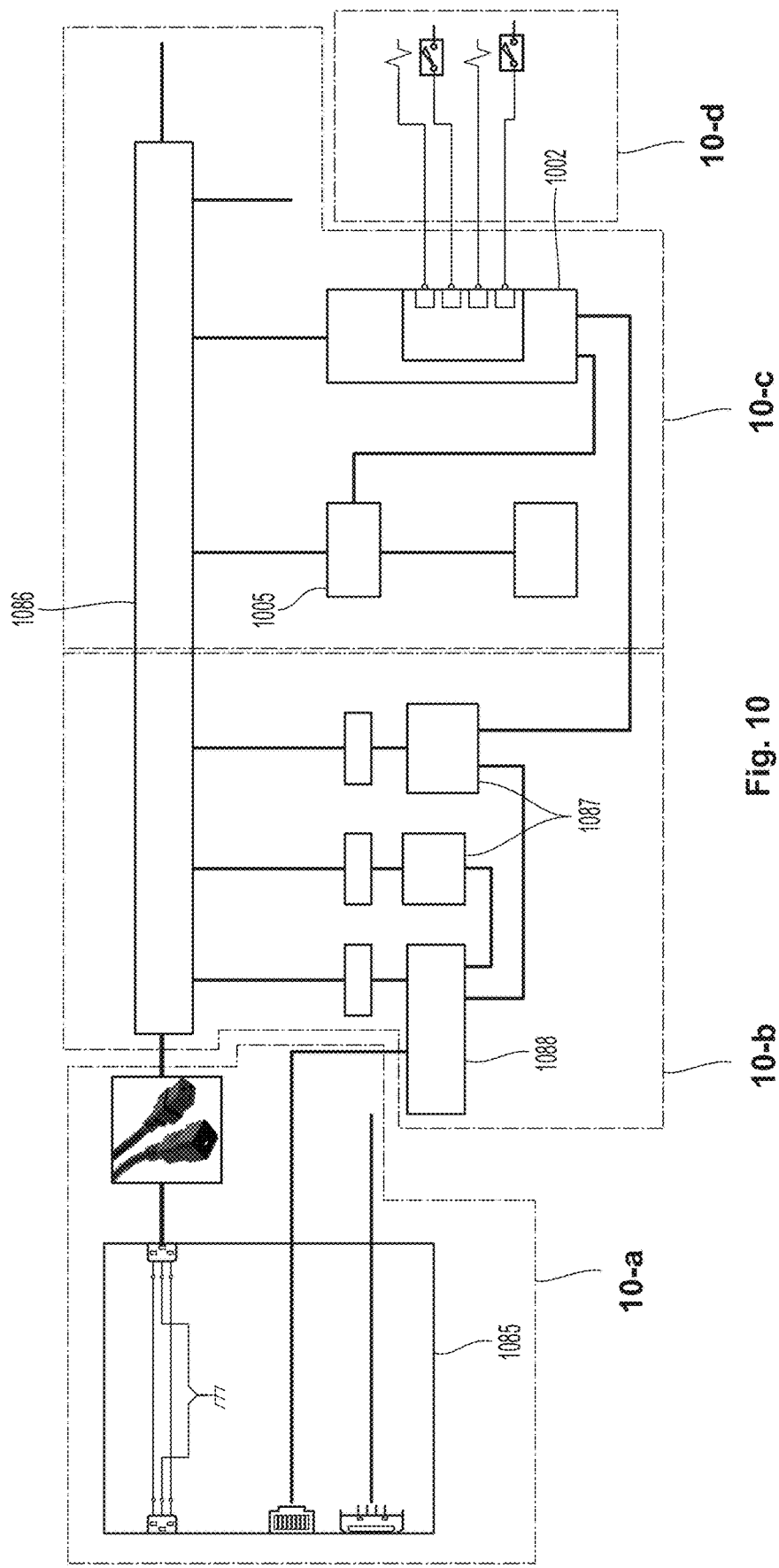

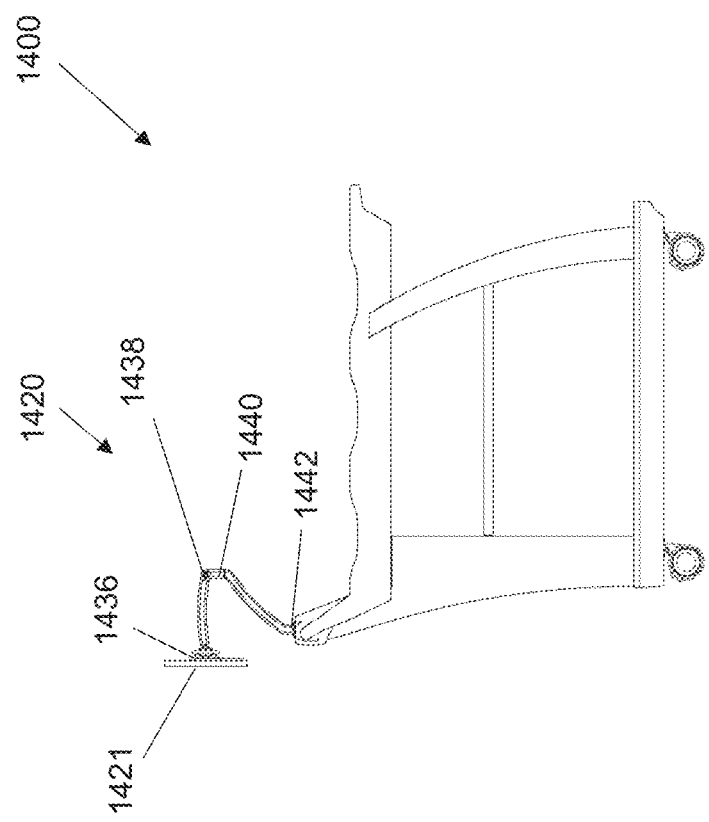

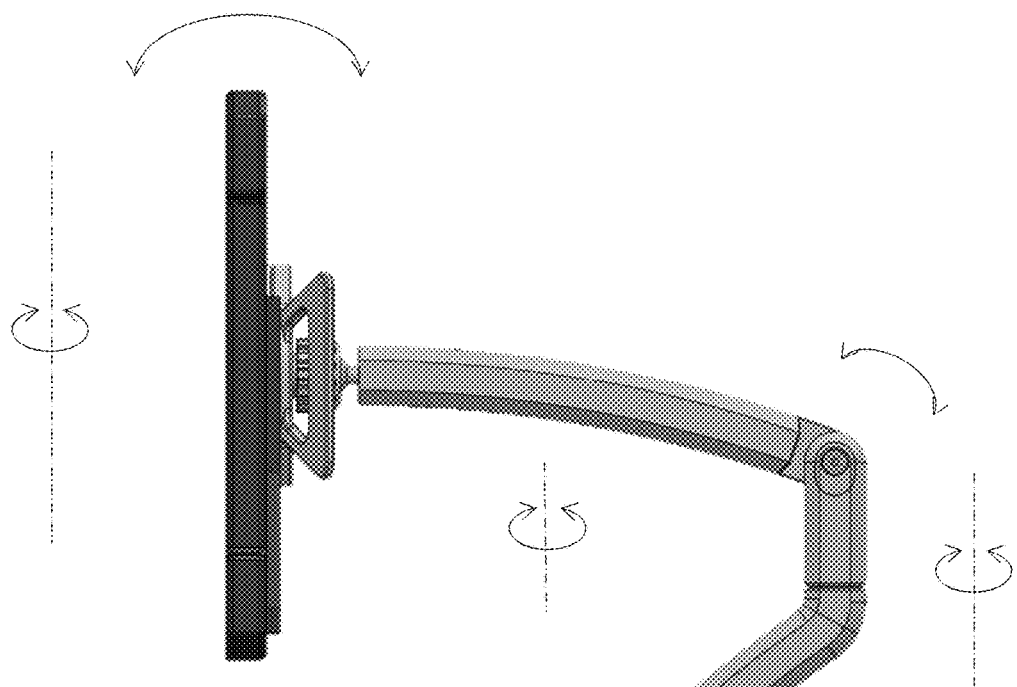
Fig. 15(h)
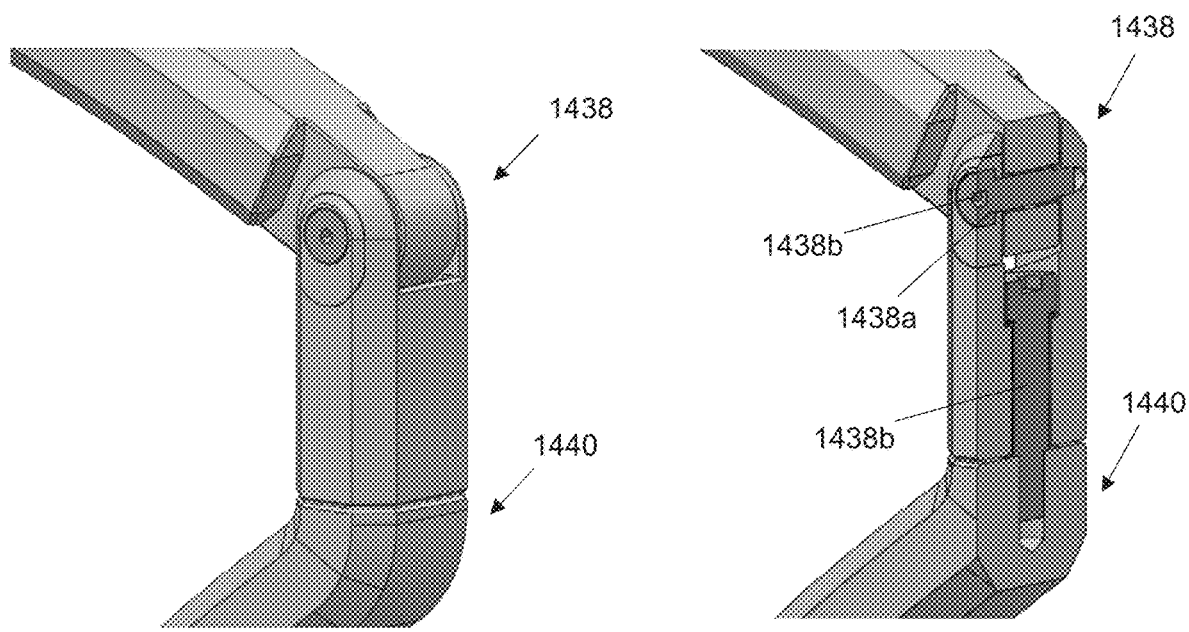
Fig. 15(e)
Fig. 15(f)

INTEGRATED CONSUMABLE DATA MANAGEMENT SYSTEM AND PLATFORM

CROSS-REFERENCE TO RELATED APPLICATION

The present application claims priority to U.S. provisional application 63/025,344, filed May 15, 2020, which is hereby incorporated by reference. The present application relates to U.S. patent application Ser. No. 15/746,688, filed on 22 Jan. 2018, which claims priority under 35 U.S.C. § 371 to Appl. No. PCT/US2016/043755 filed on 22 Jul. 2016, which claims priority under 39 U.S.C. § 119(e) to U.S. provisional patent application No. 62/195,956, filed on 23 Jul. 2015, each of which is incorporated by reference. The present U.S. patent application also relates to international patent application No. PCT/US2017/014360 filed on 20 Jan. 2017, which designates the United States of America and which claims priority to Appl. No. PCT/US2016/043755 filed on 22 Jul. 2016 and is incorporated by reference. The international patent application Nos. PCT/US2017/014360 and PCT/US2016/043755 are referred hereinafter as "the Related International Patent Applications." Reference is also made to U.S. application Ser. No. 12/844,345, filed Jul. 27, 2010, U.S. Provisional application Nos. 61/400,441, filed Jul. 27, 2010, and 61/462,024, filed Jan. 27, 2011. Reference is also made to U.S. application Ser. No. 13/191,000, filed Jul. 26, 2011, now U.S. Pat. No. 8,770,471, and U.S. application Ser. No. 14/719,818, filed May 22, 2015, and U.S. provisional Appl. No. 62/195,956 filed on Jul. 23, 2015. The entire contents of each of these applications are incorporated herein by reference.

FIELD OF THE INVENTION

The present specification relates to methods, devices and systems for associating consumable data with an assay consumable used in a biological assay. It also relates to consumables (e.g., kits and reagent containers), software, data deployable bundles, computer-readable media, loading carts, instruments, systems, and methods, for performing automated biological assays.

BACKGROUND OF THE INVENTION

Numerous methods and systems have been developed for conducting assays. These methods and systems are essential in a variety of applications including medical diagnostics, veterinary testing, food and beverage testing, environmental monitoring, manufacturing quality control, drug discovery, and basic scientific research. During the manufacture and use of reagents and other consumables used in biological assays, the reagents and consumables are typically coded and labeled by the manufacturer in order to track them. In addition, a myriad of analytical parameters must be tracked in order to understand the analytical results of any given assay, often requiring input from various parallel tracking systems supplied by the manufacturer, customer or both.

Automation of immunoassays presents a set of challenges. Repeatability and/or reproducibility remain goals for all automated assay systems. Improvements in the manufacturing of systems are also sought.

SUMMARY OF THE INVENTION

The present patent application includes various embodiments as described below.

In an embodiment, an assay preparation system for preparing assay components is provided. The preparation system comprises an assay system including at least one processor configured to access information about required assay components; a loading cart including at least one of: a support configured to support a mobile computing device including a display and configured to communicate with the at least one processor to access the information and display the information as a graphical guide to placement of the required assay components, and a plurality of shelves including a top shelf configured for assembling the required assay components and a bottom shelf including a plurality of depressions configured to accommodate storage container.

In another embodiment, an automated assay system configured for use with consumable assay components is provided. The automated assay system includes an internal frame configured to support assay system components; a housing including at least one outer door and at least one inner door; and a waste storage unit supported by the internal frame, disposed within the housing, accessed by the at least one inner door, and configured to receive a waste container, the waste storage unit including a first sensor configured to detect a presence of the waste container and to transmit sensing data to at least one processor of the automated assay system.

In still another embodiment, an automated assay system configured for use with consumable assay components is provided. The automated assay system includes an internal frame configured to support assay system components; a housing including at least one outer door and at least one inner door, the at least one outer door including a first hinge element disposed at a first vertical end of the at least one outer door and a second hinge element disposed at a second vertical end of the at least one outer door; and a load distribution element connected to the internal frame and including a first mounting bracket and a second mounting bracket, the first mounting bracket being configured to engage with the first hinge element and the second mounting bracket being configured to engage with the second hinge element.

In a further embodiment, a method for training a plate washer configured to wash a multi-well plate for use in an automated assay system including an ECL reader is provided. The method includes placing a training plate in the plate washer, the training plate having a top surface including a plurality of divots, wherein a height of the top surface corresponds to a height of ECL emitting spots in a multi-well plate and the plurality of divots corresponds to a plurality of aspiration tubes in the plate washer; placing a first shim of a known first thickness on top of the training plate; lowering the plurality of aspiration tubes toward the first shim to secure the first shim through contact with the plurality of aspiration tubes; raising the plurality of aspiration tubes until the plurality of aspiration tubes reaches a first height at which the first shim is unsecure; storing, by at least one processor associated with the plate washer, the first height as a minimum acceptable height of the plurality of aspiration tubes during a washing procedure of the multi-well plate; replacing the first shim with a second shim of a known second thickness different than the first thickness on top of the training plate; lowering the plurality of aspiration tubes toward the second shim to secure the second shim through contact with the plurality of aspiration tubes; raising the plurality of aspiration tubes until the plurality of aspiration tubes reaches a second height at which the second shim is unsecure; and storing, by at least one processor associated with the plate washer, the second height as a maximum acceptable height of the plurality of aspiration tubes during the washing procedure of the multi-well plate.

In another embodiment, an assay system is provided. The assay system includes a processing system including at least one processor configured to access information about required assay components; an internal frame configured to support assay system components; a housing surrounding the inner frame and including at least one outer door and at least one inner door; and at least one feature selected from the group comprising: (a) a loading cart including: a support configured to support a mobile computing device including a display and configured to communicate with the at least one processor to access the information and display the information as a graphical guide to placement of the required assay components, and a plurality of shelves including a top shelf configured for assembling the required assay components and a bottom shelf including a plurality of depressions configured to accommodate storage container; (b) a door support system including: a first hinge element disposed at a first vertical end of the at least one outer door and a second hinge element disposed at a second vertical end of the at least one outer door, and a load distribution element connected to the internal frame and including a first mounting bracket and a second mounting bracket, the first mounting bracket being configured to engage with the first hinge element and the second mounting bracket being configured to engage with the second hinge element, (c) a waste storage unit supported by the internal frame, disposed within the housing, accessed by the at least one inner door, and configured to receive a waste container, the waste storage unit including a first sensor configured to detect a presence of the waste container and to transmit sensing data to at least one processor of the automated assay system, and (d) a robotic subsystem configured to transport consumables within the assay system, the robotic subsystem including a gantry supporting gripper pads configured to grip assay consumables, wherein the gripper pads include a plurality of gripper arms, each gripper arm having a bottom chamfered surface and at least one roughened inside surface.

One aspect of the present disclosure is an automated assay system for conducting biological assays, e.g., immunoassays, and more particularly electrochemiluminescent (ECL) immunoassays. The inventive automated assay system is capable of performing assay runs with reproducible results. Probable human or machine errors that may occur in preparing for an assay run (e.g., sample or calibrator dilution), the loading of the assay consumables onto an instrument, and during an assay run have been identified and minimized. Other aspects include consumables, instruments, loading carts, software, data deployable bundles, computer-readable media, and methods, for performing biological assays.

Variables that have been minimized in the different aspects of the invention include one or more of the following. Variations in sample concentration among the wells within multi-well assay trays caused by evaporation of liquid during incubation are minimized. The positions and locations of a robotic system's gripper pads and pipettor for a particular assay system are trained by a precision training plate. Heat exchangers are provided to maintain a selected operating temperature in the assay system. Identical assay runs may be completed by the system substantially within the expected time period to ensure reproducibility. Consumables for specific assays are provided in kits to ensure that the proper consumables and amounts thereof are available for the assay runs. The loading of consumables to the assay system is standardized to minimized errors. Specialized assay consumable storage units on an assay instrument (e.g., a plate hotel, a plate carrier, a reserve pipet tip container carrier, a trough carrier) minimize loading and assay execution errors. For example, the configuration and position of the plate hotel minimize loading errors due to user safety, ergonomic, or consumable handling considerations. A user interface guides the users through the loading of the consumables and selection of the assay protocol to run. A loading cart is provided to serve as an intermediate consumable loading station to assist the users to properly load the consumables into the assay system. The inventive assay system's operational and performance qualifications have been automated and a validation kit is provided to ensure that the qualifications are properly executed and reproducible. Automated assay steps are carried out with tight timing tolerances to ensure run-to-run and plate-to-plate reproducibility. A specialized plate reader is configured to read the assay plates in an order that minimizes differences in timing between the addition of read buffer to the time of reading the signal from one well to another even within in a single plate. Various background signal noises in the ECL reader are measured and offset from the actual ECL readings. The ability of the pipettor and plate washer to dispense and/or aspirate is calibrated.

The present disclosure is further related to a lid configured to cover a top surface of a multi-well plate, comprising a skirt dependent on a top portion of the lid, wherein the skirt is adapted to fit around an outer perimeter of the top surface of the multi-well plate, wherein the top surface of the plate is sized and dimensioned to contact the outer perimeter of the multi-well plate, and the lid may also have a plurality of dimples extending from the top portion of the lid toward the multi-well plate. The plurality of dimples may correspond to the plurality of wells in the multi-well plate and is configured to extend into the plurality of wells. The top surface of the lid may be adapted to contact at least one upper lip of the plurality of wells.

The present disclosure is further related to a lid configured to cover a top surface of a multi-well plate, comprising a skirt dependent on a top portion of the lid, wherein the skirt is adapted to fit around an outer perimeter of the top surface of the multi-well plate, wherein the top surface of the plate is sized and dimensioned to contact the outer perimeter of the multi-well plate. The lid is optionally hydrophobic. The lid may be made from a hydrophobic polymer, or the bottom surface of the top portion of the lid may be rendered hydrophobic. The bottom surface may be microetched to create a roughened surface to trap air, such that the bottom surface exhibits Cassie-Baxter behavior as a barrier against moisture.

Alternatively, the bottom surface may be coated with a hydrophobic coating or a surfactant. The lid may also have a plurality of dimples extending from the top portion of the lid toward the multi-well plate. The plurality of dimples can correspond to the plurality of wells in the multi-well plate, and the plurality of dimples is configured to extend into the plurality of wells.

The lids covering the multi-well plates may be not made of conformable plastic or elastomeric material. These lids may be made of hard plastic and/or polystyrene.

The present disclosure is further related to another lid configured to be attached to a reagent container and adapted to allow a probe to enter and exit, comprising a top surface, wherein the top surface comprises a pattern of cuts separating the top surface into segments, wherein the segments flex downward when the probe enters the reagent container and substantially return their original orientation when the probe exits. The probe may be at least one pipette tip.

The pattern of cuts may comprise at least one curvilinear line, at least one serpentine line, at least one substantially circular line or parallel linear lines. The cut pattern may comprise at least one cross mark, and may include two cross marks. The probes may be inserted into the cross marks to lift and remove the lid from the reagent container. The lid may be made from non-elastomeric material or an elastomeric material. The lid may be used for covering a reagent trough.

The present disclosure is further related to a loading cart adapted to be used with an assay system, the loading cart comprising a computer screen and a mobile body comprising at least one shelf and a support for said computer screen, wherein said shelf comprises at least one tray, wherein a plurality of slots are defined on the tray and wherein the slots are sized and dimensioned to receive a plurality of consumables to conduct an assay. The computer screen is adapted to display a user interface that shows a first arrangement of the plurality of containers of consumables on the at least one tray.

The computer screen may be a screen of a tablet computer or be connected to a personal computer or a laptop computer. The computer screen may be controlled by a processor on the assay machine. The computer screen may be connected to the processor on the assay machine by WiFi or Bluetooth connection. In one embodiment, a mobile computer device is associated with the computer screen.

The plurality of slots on the loading cart may be defined on a top surface of the at least one tray or on both surfaces, i.e., the tray is reversible. The slots may be slots of different sizes adapted to receive the plurality of consumables of different sizes. At least one slot may be sized and dimensioned to receive a holster for a handheld identification scanner, such as a bar-code scanner. The holster may be electrically connected to charge or recharge the scanner.

The support for the computer screen may be an adjustable support. The adjustable support may be rotatable substantially about a vertical axis and/or tiltable about an axis that is substantially orthogonal to the vertical axis. The adjustable support may have multiple degrees of freedom and may comprise a ball-socket joint and multiple rotational joints oriented at various angles. The at least one shelf is a top shelf. The cart may also have a bottom shelf and/or a middle shelf. The cart may have a compartment under the at least one tray or top tray and the compartment is adapted to store a coolant. The compartment may also have a drainage port, and the compartment's bottom surface may be concave. The mobile body of the cart should be supported by at least one caster wheel, and the caster wheel may be a hubless caster wheel.

The loading cart may hold a plurality of consumables, such as at least one multi-well plate, and the at least one multi-well plate may comprise at least one assay plate or at least one dilution plate. The plurality of consumables may comprise at least one container of a reagent. The plurality of consumables may comprise at least one tube or at least one trough.

The present disclosure is further related to an assay preparation system for preparing assay components, the preparation system comprising:
 (a) an assay system with a processor comprising information about the components needed to carry out an assay run;
 (b) a loading cart comprising a shelf for assembling components that will be used in an assay and a support for holding a mobile computing device;
 (c) a mobile computing device, which includes a computer screen;
 wherein said mobile computing device includes networking capability to access said information on said processor and a graphical user interface to present that information on the computer screen to a user and guide the placement of assay components on the loading cart.

The loading cart may be the loading cart described above and/or hereinafter. The loading cart may also comprise a consumable identifier reader, and the processor is configured to receive identifier information provided by the user using the reader when placing assay components on the cart and to use that information to confirm the validity of the components and to transfer said identifier information to the processor.

The present disclosure is further related to a method of instructing a user to load consumables onto an assay system comprising using the loading cart discussed above and/or hereinafter. The method may comprise arranging a plurality of consumables on the loading station in accordance to a first arrangement displayed by a user interface on the screen.

The present disclosure is further related to a method for loading consumables to conduct an assay into an assay system, comprising steps of:
 a. receiving a plurality of consumables,
 b. arranging the plurality of consumable on an intermediate consumable loading station in accordance to a first arrangement displayed by a user interface on a screen positioned on the intermediate consumable loading station,
 c. moving the intermediate consumable loading station to the assay system,
 d. transferring the plurality of consumables to the assay system in accordance with a second arrangement, wherein the first arrangement is substantially the same as the second arrangement.

The intermediate consumable loading station may comprise a mobile cart and the screen is a computer screen. The computer screen may be movably attached to the cart, or is rotatable substantially about a vertical axis and/or tiltable relative to the vertical axis. This method may also comprise the step of cooling at least one consumable of the plurality of consumables. Step (b) may comprise the step of depositing the plurality of consumables into a plurality of slots defined on a top surface of the mobile cart. The plurality of consumables may comprise at least one multi-well plate or at least one container of reagent.

This method for loading consumables may be used with the loading cart discussed above and/or hereinafter.

The present disclosure is further related to a plate sized and dimensioned to the size and dimensions of an ANSI-SLAS-format assay plate and comprising an outer rectangular perimeter and at least one support member connecting a first side of the rectangular perimeter to a second side of the perimeter, wherein at least one reference pad is located on a first major surface of the plate and corresponds to a location of at least one well in the ANSI-SLAS-format assay plate, wherein a location of the at least one reference pad in one dimension of a three-dimensional coordinate system is measurable by a probe of an assay system when the plate is positioned in a plate carrier in the assay system. The plate may also have a plurality of reference pads that correspond to a plurality of pipette tips.

The probe is configured to measure a capacitance between the probe and the at least one reference pad. The plate may be conductive. The ANSI-SLAS-format assay plate is a 8×12 multi-well plate and the at least one reference pad corresponds to a corner well on the ANSI-SLAS-format assay plate.

The plate may also have at least two opposite gripping areas located on the sides connecting the plate's two major surfaces, wherein the gripping areas are adapted to be gripped by a gripper arm of a robotic system. The outer rectangular perimeter proximate the first major surface is smaller than the outer rectangular perimeter proximate the second major surface, wherein the first and second major surfaces are substantially parallel.

The at least two opposite gripping areas in one embodiment are bordered by raised lines. In another embodiment, the at least two opposite areas comprises at least a pair of divots that are sized and dimensioned to receive a corresponding pair of protrusions on the gripper arm. The pair of protrusions may comprise distal ends of removable screws attached to the gripper arm. The at least a pair of divots may comprise an upper pair and a lower pair. When the gripper arm grips the upper pair, a top surface of the gripper arm is substantially flush with the first major surface of the plate. When the gripper arm grips the lower pair, a bottom surface of the gripper arm is substantially flush with a surface opposite to the first major surface of the plate.

The plate may be made of cast aluminum and/or is machined from cast aluminum, and may be anodized. The plate may be made from a dimensionally stable plastic such as PEEK, glass filled PEEK, or other suitable plastic.

A further embodiment relates to a plate for teaching or training an automated instrument, the plate being sized and dimensioned to the size and dimensions of an ANSI-SLAS-format assay plate and comprising an outer rectangular perimeter and at least one support member connecting a first side of the rectangular perimeter to a second side of the perimeter, wherein at least one reference pad is located on a first major surface of the plate and corresponds to a location of at least one well in the ANSI-SLAS-format assay plate, wherein a location of the at least one reference pad in one dimension of a three-dimensional coordinate system is measurable by a probe of an assay system when the plate is positioned in a plate carrier in the assay system.

A further aspect relates to a method of training or teaching a robotic gripper or pipettor comprising using the plate described above. The method of training or teaching a robotic gripper using the plate described above comprises at least one of the following steps: instructing the robotic gripper arm to move to a specific location in X,Y,Z space that corresponds with an area on the plate; instructing the robotic gripper arm to rotate to a specific location that corresponds with an area on the plate; instructing the robotic gripper arm to open or close its gripper to a specific width or length that corresponds with an area on the plate; using the specific location of a gripper arm relative to the plate to extrapolate fixed locations across an automated setup; and using the specific location of a gripper arm relative to the plate to calculate the locations and robotic training positions for other relevant pieces of labware.

The method of training or teaching an automated pipetting arm using the plate described above comprises at least one of the following steps: instructing the automated pipetting arm to move to a specific location in X,Y,Z space that corresponds with an area on the plate; using the specific location of an automated pipetting arm relative to the plate to extrapolate fixed locations across an automated setup; and using the specific location of an automated pipetting arm relative to the plate to calculate the locations and robotic training positions for other relevant pieces of labware.

Another aspect of the present disclosure relates to a method for training a robotic-controlled probe of an assay system comprising the steps of: positioning a plate sized and dimensioned to the size and dimensions of an ANSI-SLAS format assay plate in a plate carrier inside the assay system, wherein the position of said plate is known in a three-dimensional coordinate system; moving the robotic-controlled probe toward a reference pad on said plate, wherein said reference pad corresponds to a well in said ANSI-SLAS plate; obtaining a first location of said reference pad using a capacitance between the probe and said reference pad in said three-dimensional coordinate system; and assigning said first location as one dimension in said three-dimensional coordinate system for the robotic-controlled probe.

Another aspect of the present disclosure relates to a plate sized and dimensioned to train aspiration tubes in a plate washer. This plate has a number of holes or divots that correspond to the number of wells in a multi-well plate. A first shim having a known first thickness is laid on top of the plate and the aspiration tubes are lowered onto the first shim until the first shim is unmovable due to the fact that the aspiration tubes pinch the first shim to the holes or divots. The first shim may be made of plastic, stainless steel, and/or any other suitable material. The aspiration tubes are then move upward until the first shim is slightly movable to indicate that the distance in the Z-direction from the distal tips of the aspiration tubes to the top of this plate is the same as the first thickness. This process is repeated for a second shim having a known second thickness. The thickness of this plate is controlled so that the top of this plate is at substantially the same height as the ECL emitting spots on the multi-well plates. In one non-limiting example, the first known thickness of the first shim corresponds to the minimum acceptable distance of the aspiration tubes from the ECL emitting spots and the height of the second known thickness is the maximum acceptable distance from the ECL emitting spots of the aspiration tubes for the plate washer.

Also relating to an aspect of the invention is an assay consumable storage unit adapted to be attached to a platform in an assay system comprising a bottom base and a shelving assembly having a plurality of sets of vertically aligned storage units, wherein each storage unit is sized and dimensioned to receive a consumable for the conduct of an assay by the assay system, wherein the shelving assembly comprises a plurality of horizontal members connected by a plurality of upstanding vertical supports, wherein the bottom base is affixed in a cantilevered manner to the platform and the shelving assembly is removably attached to the bottom base by at least two locating pins and by at least one threaded connector with a finger-actuatable head.

The shelving assembly may comprise an M×N rectilinear array of sets of vertically aligned storage units, wherein M and N are integers. A top horizontal member of the shelving assembly may comprise alignment features for an ANSI SLAS compliant container bottom. The top horizontal member may also comprise alignment features for a lid of an assay reagent holder that is larger than an ANSI SLAS compliant container bottom.

Additional assay systems include an assay system comprising a housing, wherein the housing includes a continuous glass member, wherein a touch screen for a computer screen is formed by a first portion of the continuous glass member and an array of pressure transducers, and wherein a sound emitter is formed by a second portion of the continuous glass member and at least one sound exciter. The housing includes outer and inner front doors that are supported and aligned by a system of hinges and cam members.

This system may also distribute the weight of the doors to lower the load on individual hinges.

The present disclosure further includes an automated assay system adapted to receive consumables in the conduct of an assay, the automated assay system comprising a robotic-controlled pipettor and a robotic-controlled gripper arm, an assay reader, a plate washer and at least one optionally heatable shaker, at least one heat exchanger and at least one processor adapted to execute at least one instruction to minimize potential errors in loading of the consumables and in running the assay. The at least one processor may be a processor associated with the assay system and/or may be a processor associated with a loading cart as disclosed herein. The consumables may comprise at least one assay test plate, at least one dilution plate, at least one set of pipette tips, at least one sample plate, and a plurality of containers containing at least one of calibrator, diluent, and antibody. The at least one instruction may include an instruction to a user interface, e.g., a user interface associated with a loading cart as discussed herein, to guide a user to load the consumables into the assay system. In further embodiments, the at least one instruction may include an instruction by a processor of the automated assay system to the robotic gripper arm to place a lid on the at least one assay test plate when the at least one assay test plate is placed on the shaker, an instruction by a processor of the automated assay system to the at least one heat exchanger to maintain a selected temperature within the assay system, and an instruction by a processor of the automated assay system to run the assay for the at least one assay test plate, wherein the at least one assay plate comprises multiple assay test plates, wherein each assay test plate is completed in substantially a same time period. In embodiments, the automated assay system may be adapted to receive manual user inputs, manual user controls, and/or any other manual user interventions that may be suitable during assay performance.

The instruction to the user interface of a mobile device associated with the loading cart may further include an instruction to load consumables from a kit, and/or an instruction to load consumables to an intermediate consumable loading station, which may comprise a mobile cart. The instruction from a processor of the automated assay system may further comprise an instruction to the robotic-controlled pipettor to obtain its vertical position using a training plate, which may include an instruction to obtain its horizontal position. The instruction from a processor of the automated assay system may further includes an instruction to the robotic-controlled gripper arm to obtain its vertical position using a training plate, which may include an instruction to obtain its horizontal position.

The instruction to the user interface of a mobile device associated with the loading cart in this method may further include an instruction to load consumables from a kit, and/or an instruction to load consumables to an intermediate consumable loading station, which may comprise a mobile cart. The instruction from a processor of the automated assay system may further comprise an instruction to the robotic controlled-pipettor to obtain its vertical position using a training plate, which may include an instruction to obtain its horizontal position. The instruction from a processor of the automated assay system may further include an instruction to the robotic-controlled gripper arm to obtain its vertical position using a training plate, which may include an instruction to obtain its horizontal position.

Further aspects include an automated assay system comprising a robotic gripper arm and a robotic pipettor, and comprising at least the following additional components: (a) a plate carrier, (b) a tip box carrier, (c) five optionally heatable shakers, (d) an air cooling and handling system, (e) an assay consumable storage unit for assay reagents, (0 an assay consumable storage unit for immediate-use tips, (g) an assay consumable storage unit for reserve tips, (h) an assay consumable storage unit for plates, (i) positions for affixing assay consumable storage units for tubes and troughs, and (j) a platform or table or both; wherein said components (a)-(c) and (e)-(h) are located on said platform or table within the system in substantially the same position in relation to each other as shown in FIG. 1(b), 1(c), 1(d), 1(f), 7(a), or 7(d), and wherein component (d) is located on the back panel of the instrument substantially as shown in FIG. 7(a), 7(b), or 7(c).

This assay system may further comprise a plate washer located below the platform and/or table, and the platform or table has an opening for accessing said plate washer. The platform may be attached to and be supported by the table. The assay system may further comprise an assay reader, for example an ECL reader, located below said platform or table. The platform or table also has an opening for disposing of waste, and a chute for solid waste extending from above said waste opening, through said waste opening, and below said waste opening. The waste compartment may have a sensor to ascertain the presence of a waste container. The waste compartment may have a sensor to indicate the fill level of the waste container.

The assay system may also comprise a plurality of liquid containers, such as reagent container(s), washing fluid container(s), liquid waste container(s) and the like. One or more liquid containers may have a liquid level sensor.

A laptop computer may be provided to control said robotic gripper, said robotic pipettor, and said components (c) and (d). The assay system may also comprise containers for wash buffer and liquid waste below said plate washer.

Additional automated assay systems relate to an automated assays system comprising
- (a) a processing deck for holding assay components providing a roughly rectangular surface with a front edge, a first side edge, a second side edge and a back edge; said deck supporting
  - (i) an assay consumable hotel roughly centered and cantilevered over the front edge of the deck having a plurality of consumable slots sized to hold consumables with the meet the ANSI-SLAS specifications for width and length of 96-well assay plates,
  - (ii) a plurality of pipette tip locations for holding pipette tip containers located on a first side of the deck,
  - (iii) a plurality of plate shaker locations located along the back edge of the deck,
  - (iv) a set of processing locations located roughly in the center of the deck between the hotel and the shakers that are configured to hold consumables with ANSI-SLAS compliant dimensions,
  - (v) a barcode scanner located on the first side of the deck behind the pipette tip locations, the barcode scanner having a scanning surface large enough to scan the bottom surface of a consumable with ANSI-SLAS compliant dimensions,
- (b) a plate washer located under the deck and accessible through an aperture in the deck between the pipette locations and the assay plate processing locations
- (c) a gantry located above the deck movably supporting a robotic plate gripper such that the gripper can move to access locations (i) through (v) and movable supporting a robotic 8 channel pipettor such that the pipettor can access locations (ii) and (iv)

(d) an assay reader located next to the first side of the deck on a platform that is at a lower vertical elevation than the deck, wherein the highest point on the reader is lower than the lowest point that the robotic grabber can move (e) an enclosure surrounding components (a) to (d) with a temperature controller for maintaining the components under temperature control and with a door providing user access to the front side of the deck and the consumable hotel located thereon.

BRIEF DESCRIPTION OF THE FIGS

FIG. 1(a) is a perspective view of an inventive assay system with its outer doors opened showing some of the major components of the assay system.

FIGS. 1(b)-(c) illustrate one embodiment of the assay system and various subsystems within the system without the outer and inner doors. The assay system illustrated in FIGS. 1(b)-(c) is configured to conduct all sample processing steps on-board as well as all assay processing steps required in the conduct of an assay, and it is also operatively connected to a user-interface configured to display to the user stepwise instructions for appropriate sample/reagent preparation steps that should be performed manually before the system conducts the assay.

FIGS. 1(d) and 1(f) illustrate further iterations of the assay system shown in FIGS. 1(b)-(c), consistent with embodiments hereof.

FIGS. 1(g)-(h) show details of a solid waste storage unit consistent with embodiments hereof.

FIG. 1(i) shows an exemplary liquid reagent container or liquid waste container or washing liquid container that has a liquid level gauge, consistent with embodiments hereof.

FIG. 1(j) is a top perspective view of the assay consumable storage unit.

FIGS. 2(a)-(e) are perspective views a training plate for a pipetting assembly consistent with embodiments hereof.

FIGS. 3(a)-(b) are perspective views of a gripping assembly.

Figure 4:
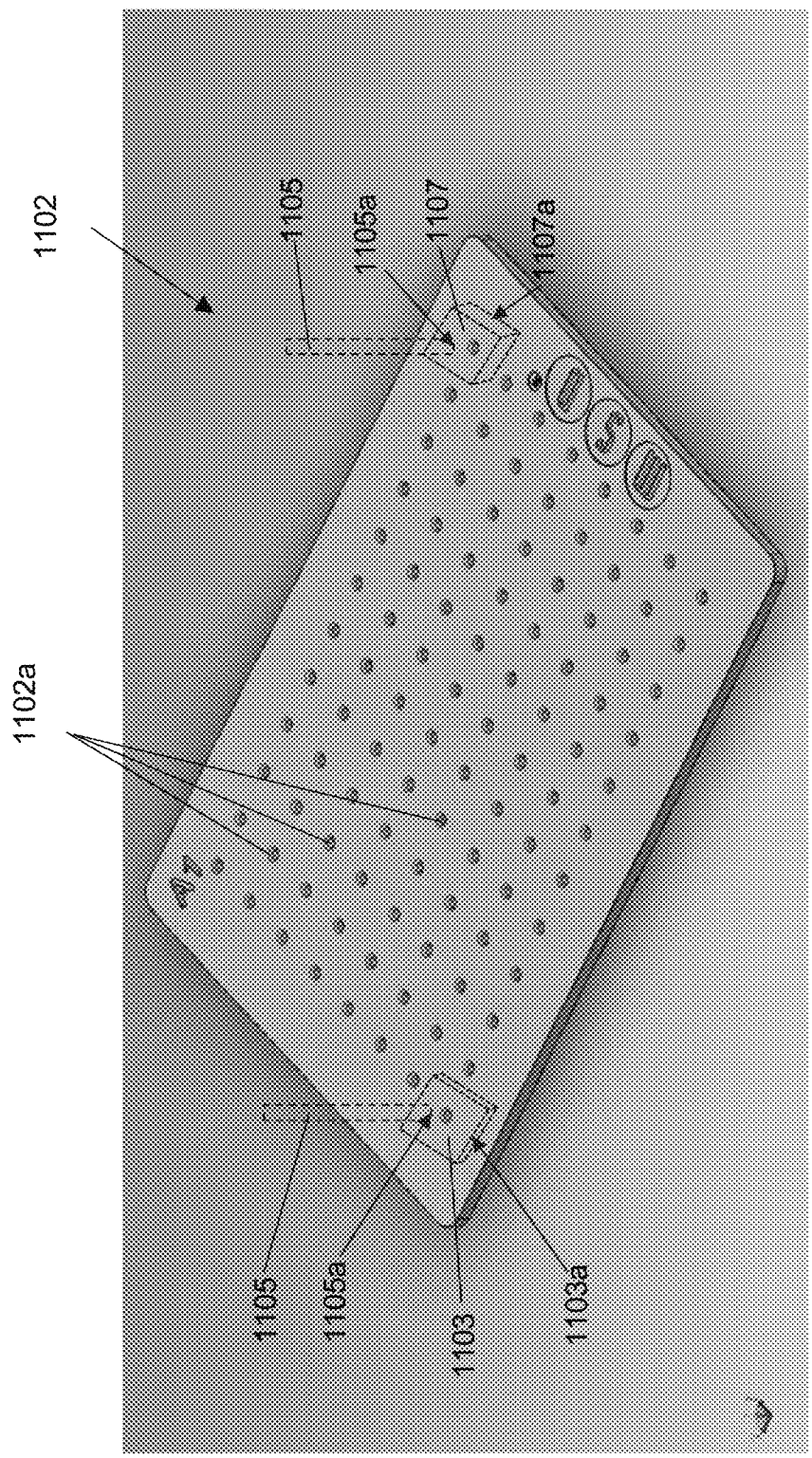

FIG. 4 is a perspective view of a training plate for the plate washing assembly consistent with embodiments hereof.

FIG. 5(a) is a perspective view showing pipette tips entering a lid of a reagent trough consistent with embodiments hereof.

FIG. 5(b) shows top views of various cut patterns of the lid shown in FIG. 5(a) consistent with embodiments hereof.

Figure 5C:
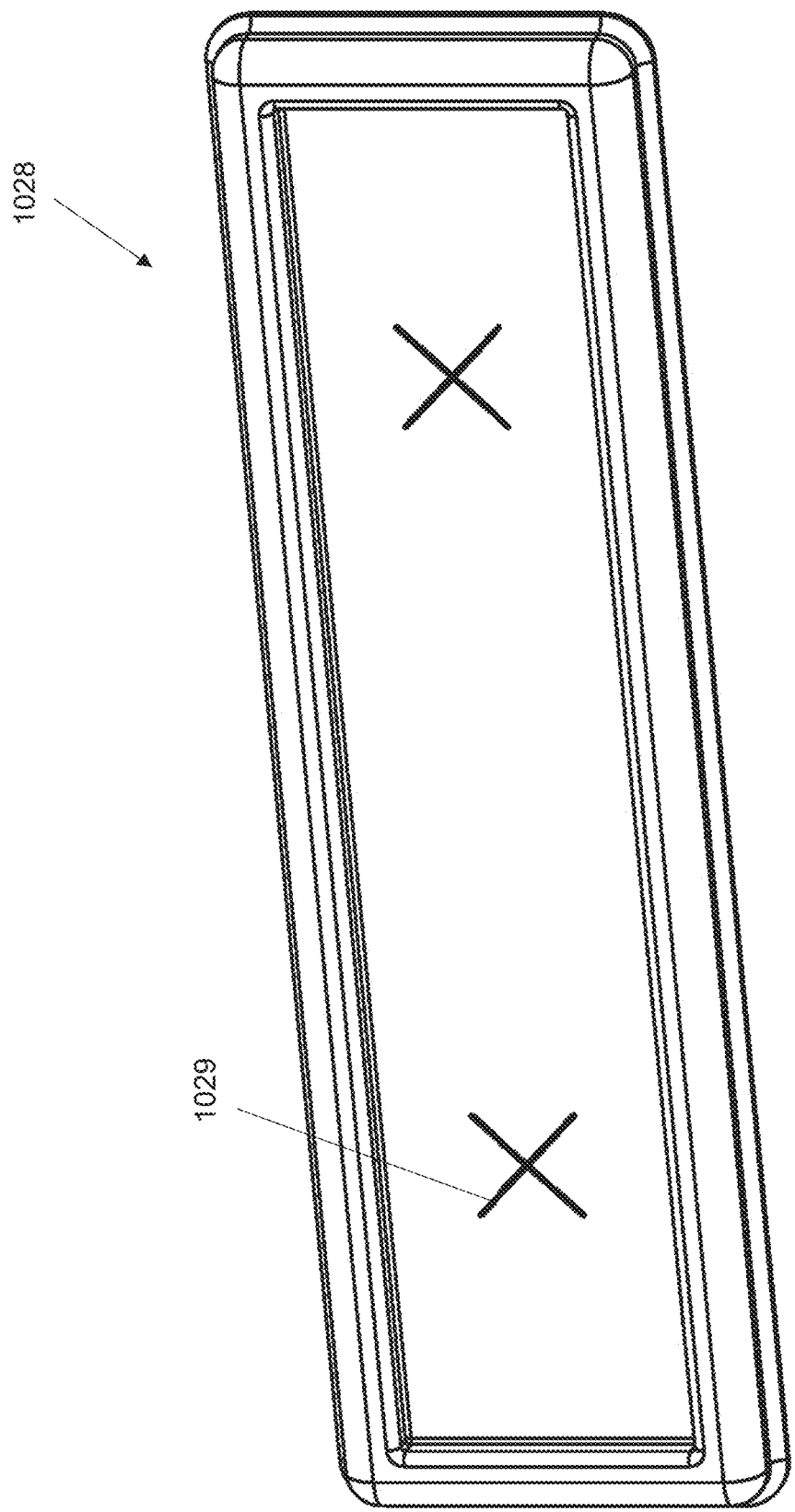

FIGS. 5(c)-(d) are perspective and side views of another lid consistent with embodiments hereof.

Figure 6A:
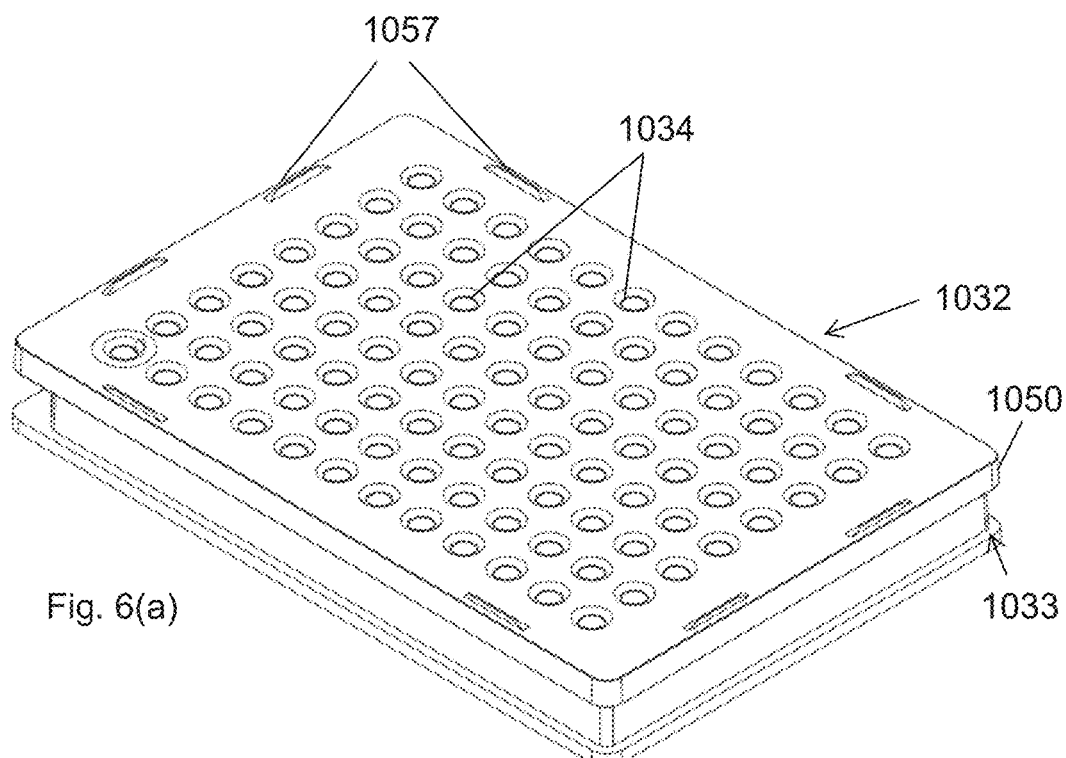

FIG. 6(a) is a perspective view of a lid and assay plate consistent with embodiments hereof.

Figure 6B:
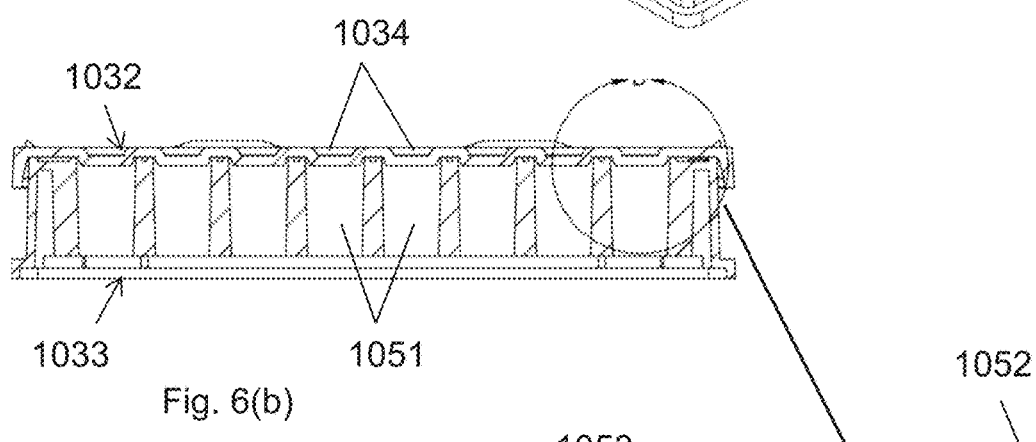

FIG. 6(b) is a cross-sectional view of the lid and assay plate in FIG. 6(a) consistent with embodiments hereof.

Figure 6C:
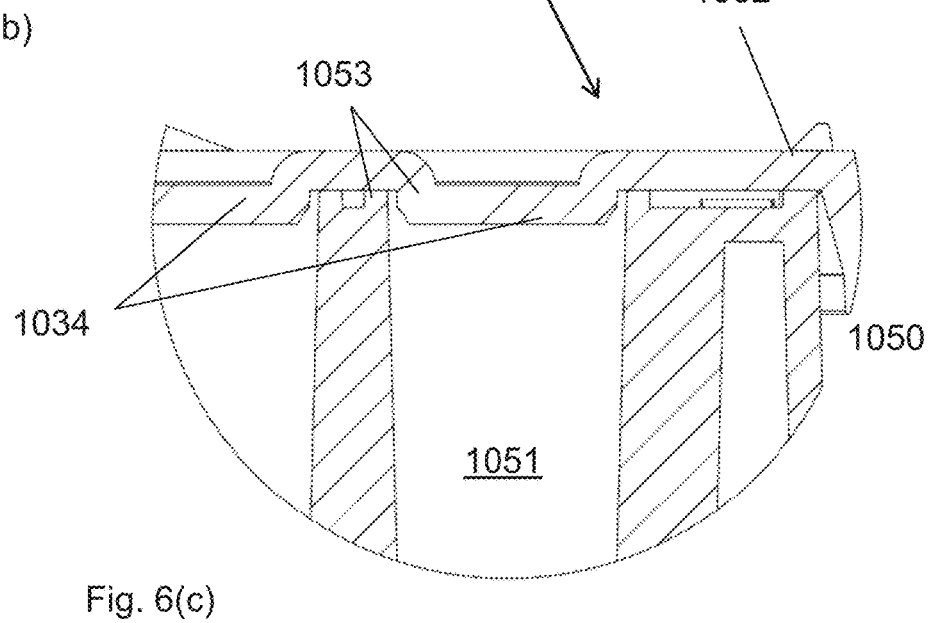
Figure 7A:
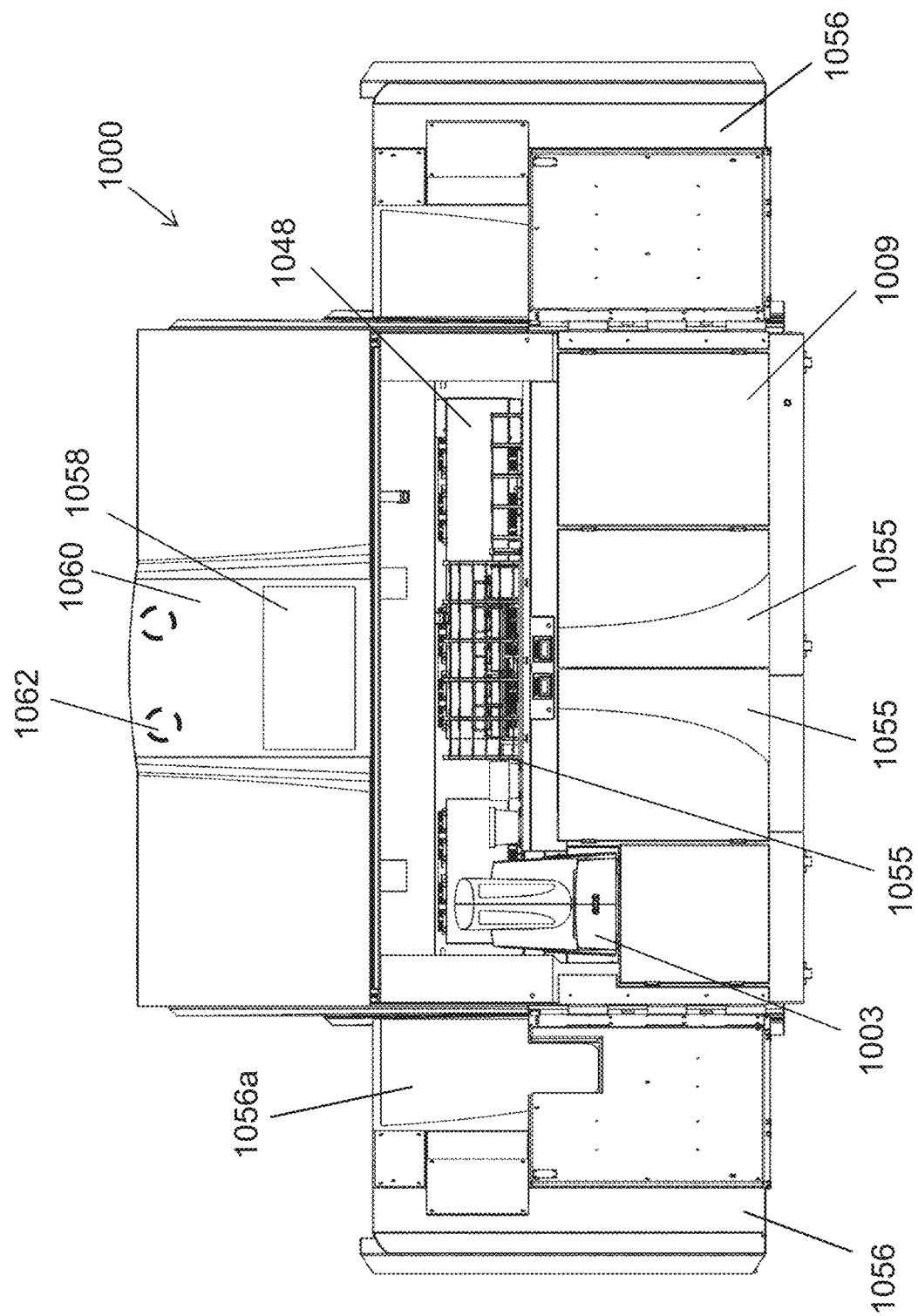

FIG. 6(c) is an enlarged portion of FIG. 6(b) consistent with embodiments hereof FIG. 7(a) is a front view of the assay system shown in FIGS. 1(b)-(f) with its interior doors closed consistent with embodiments hereof.

FIGS. 7(b)(1)-(3) are top views of the platform.

FIG. 7(b)(4) is a top view showing a plate carrier (1036) and tip carrier (1026) mountable on the platform consistent with embodiments hereof.

FIGS. 7(c)-(e) shows a cooling pattern within the assay system consistent with embodiments hereof.

FIG. 7(f) shows a cooling pattern of the electronic enclosure consistent with embodiments hereof.

Figure 8A:
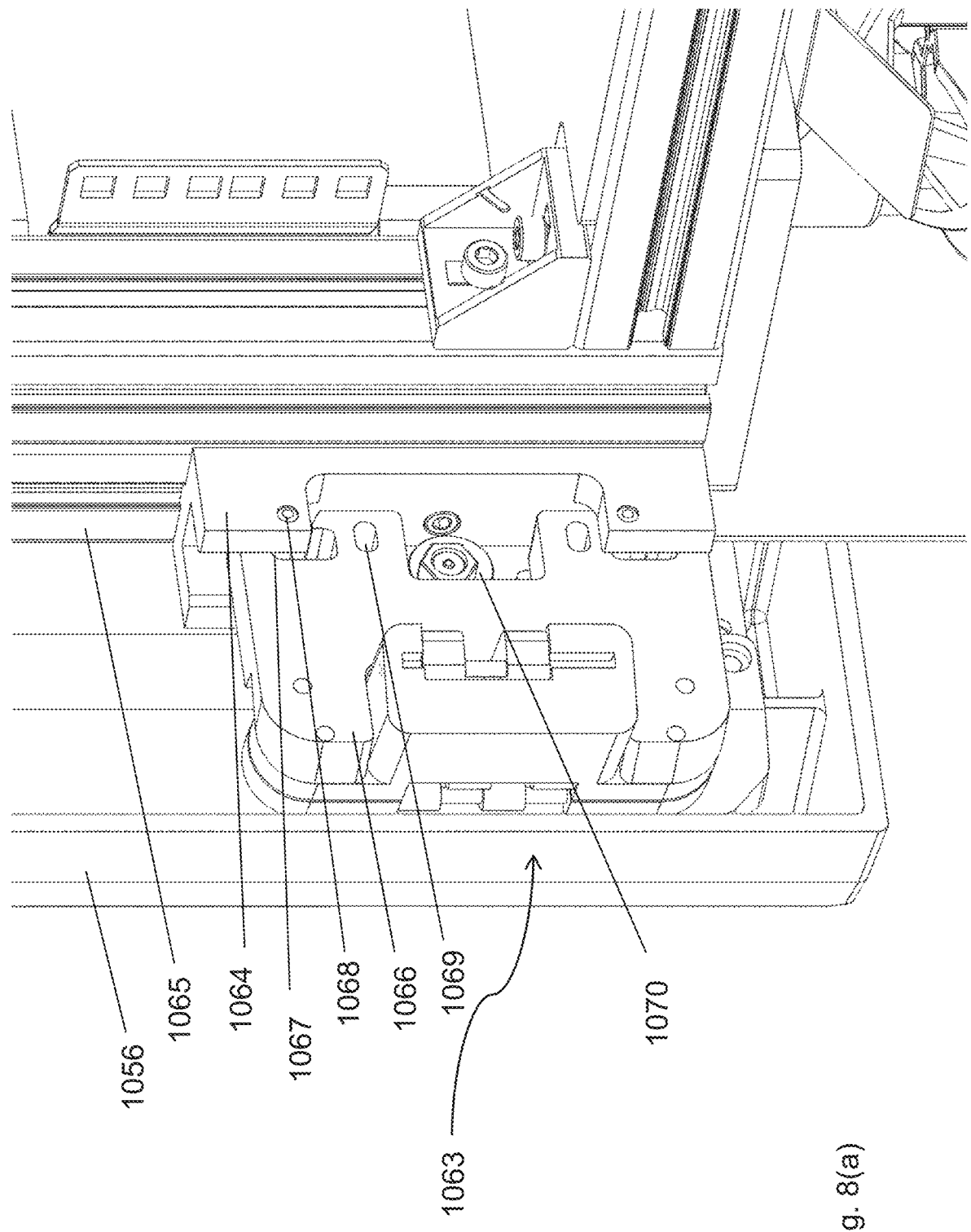

FIG. 8(a) shows an adjustable hinge to the door of the assay system that has two degrees of freedom consistent with embodiments hereof.

Figure 8B:
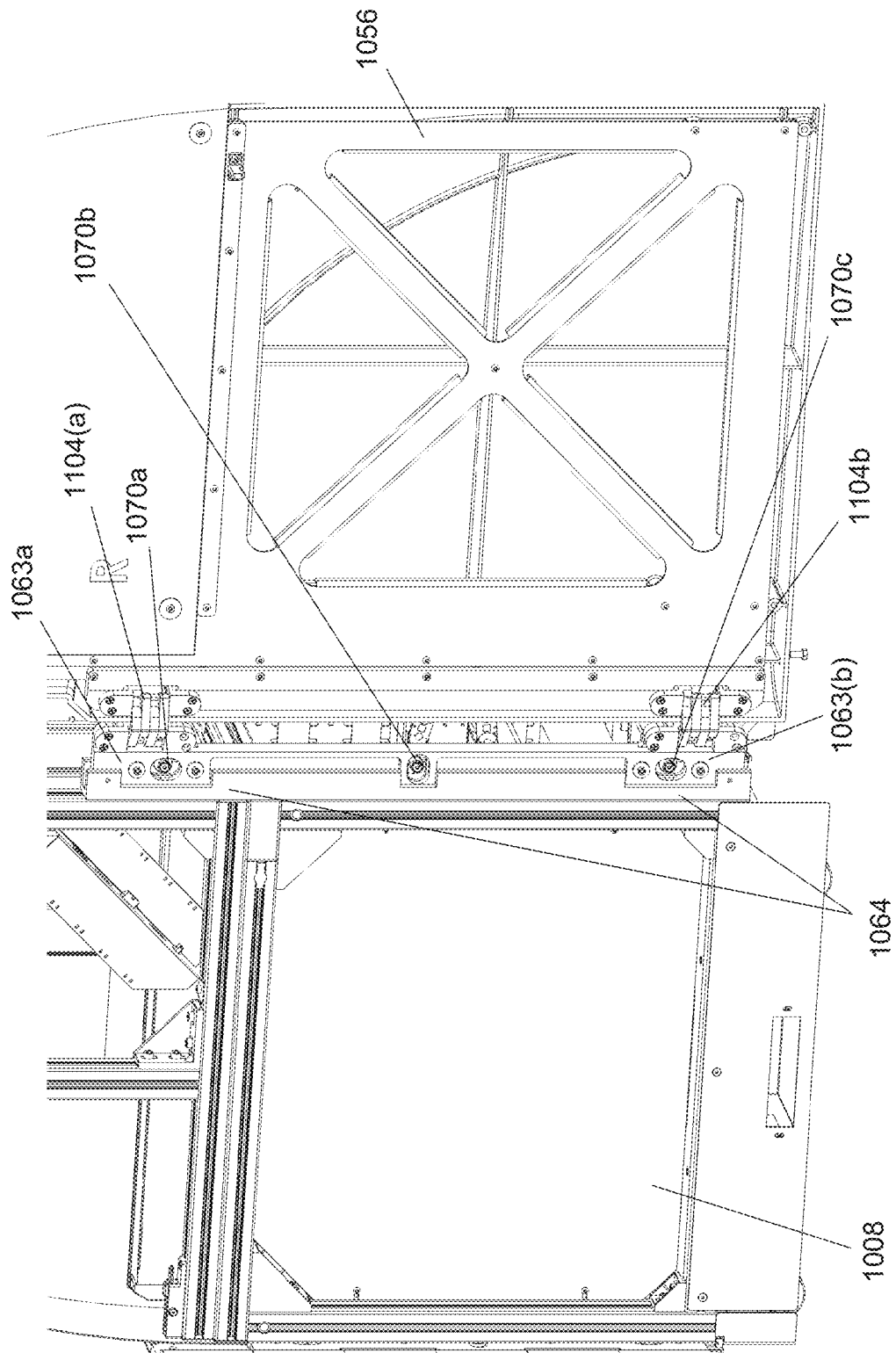

FIGS. 8(b)-(c) show an adjustable hinge consistent with embodiments hereof.

FIGS. 8(d)-(f) show an adjustable hinge consistent with embodiments hereof.

FIG. 8(g) shows exemplary magnetic latches for the outer doors consistent with embodiments hereof consistent with embodiments hereof.

FIG. 8(h) is a partial cross-sectional side view of an attachment of the glass portion to the outer door consistent with embodiments hereof.

Figure 9A:
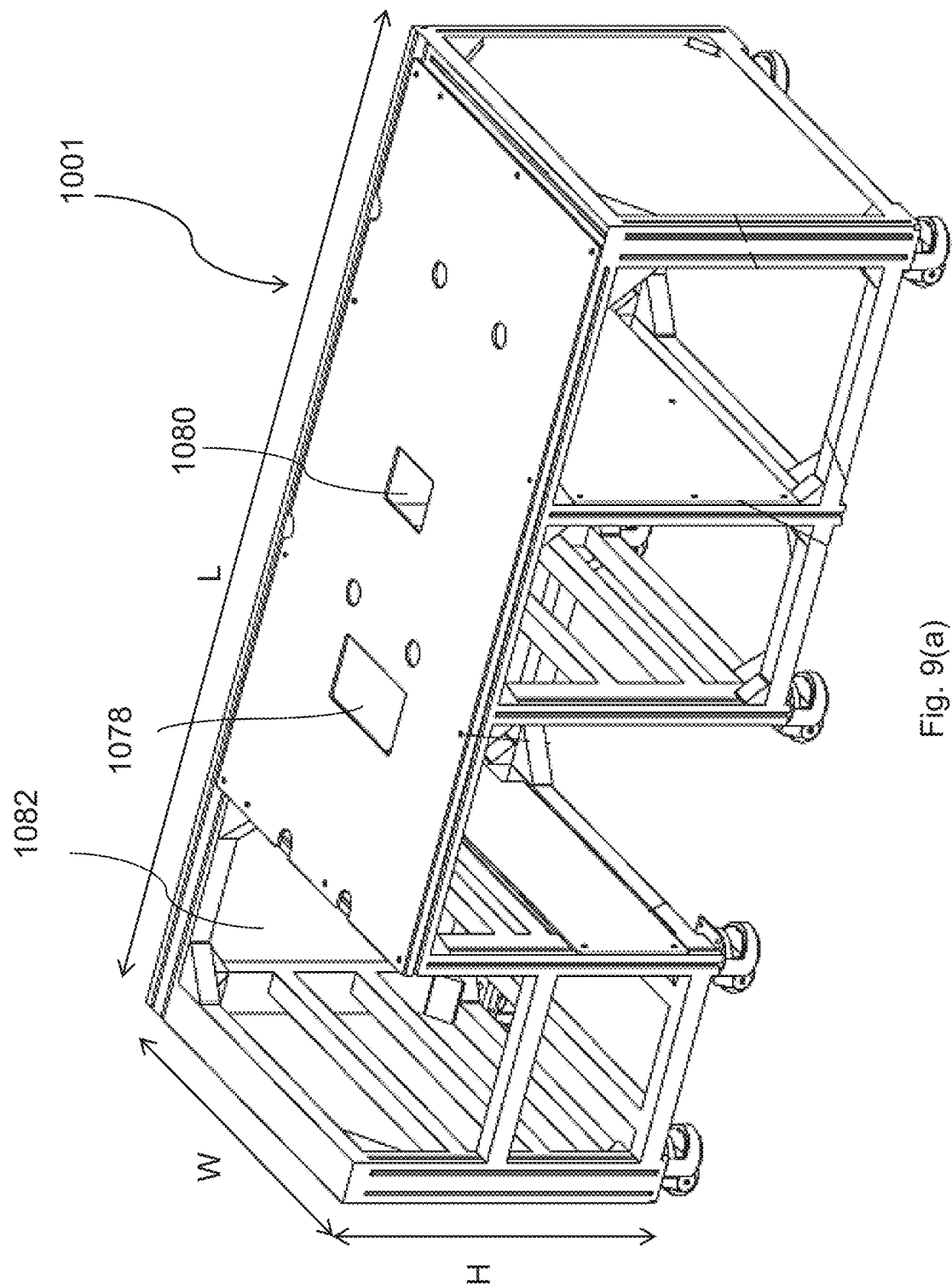
Figure 9B:
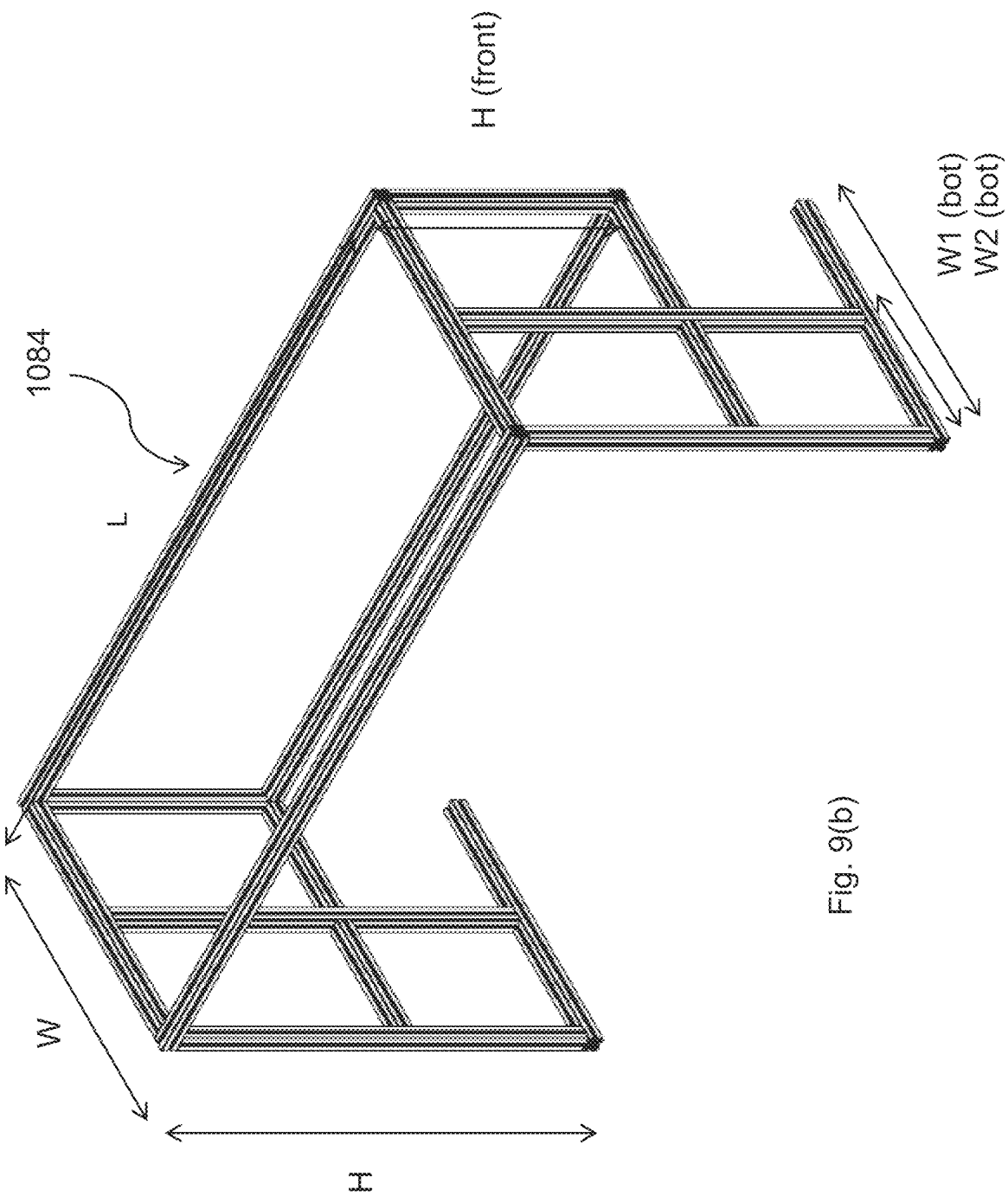

FIGS. 9(a)-(b) show the dimensions of the frames of the assay system consistent with embodiments hereof.

Figure 10A:
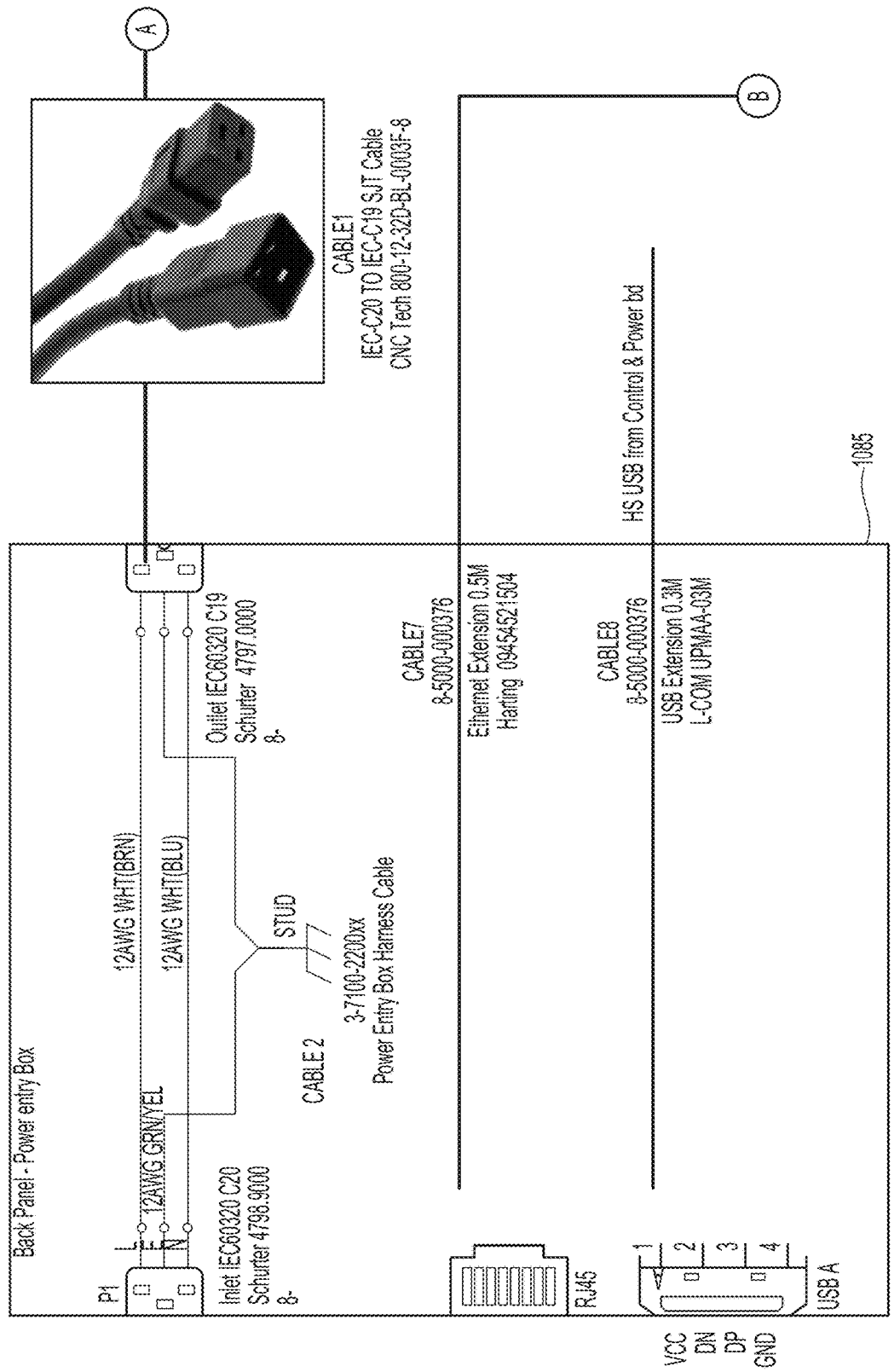
Figure 10B:
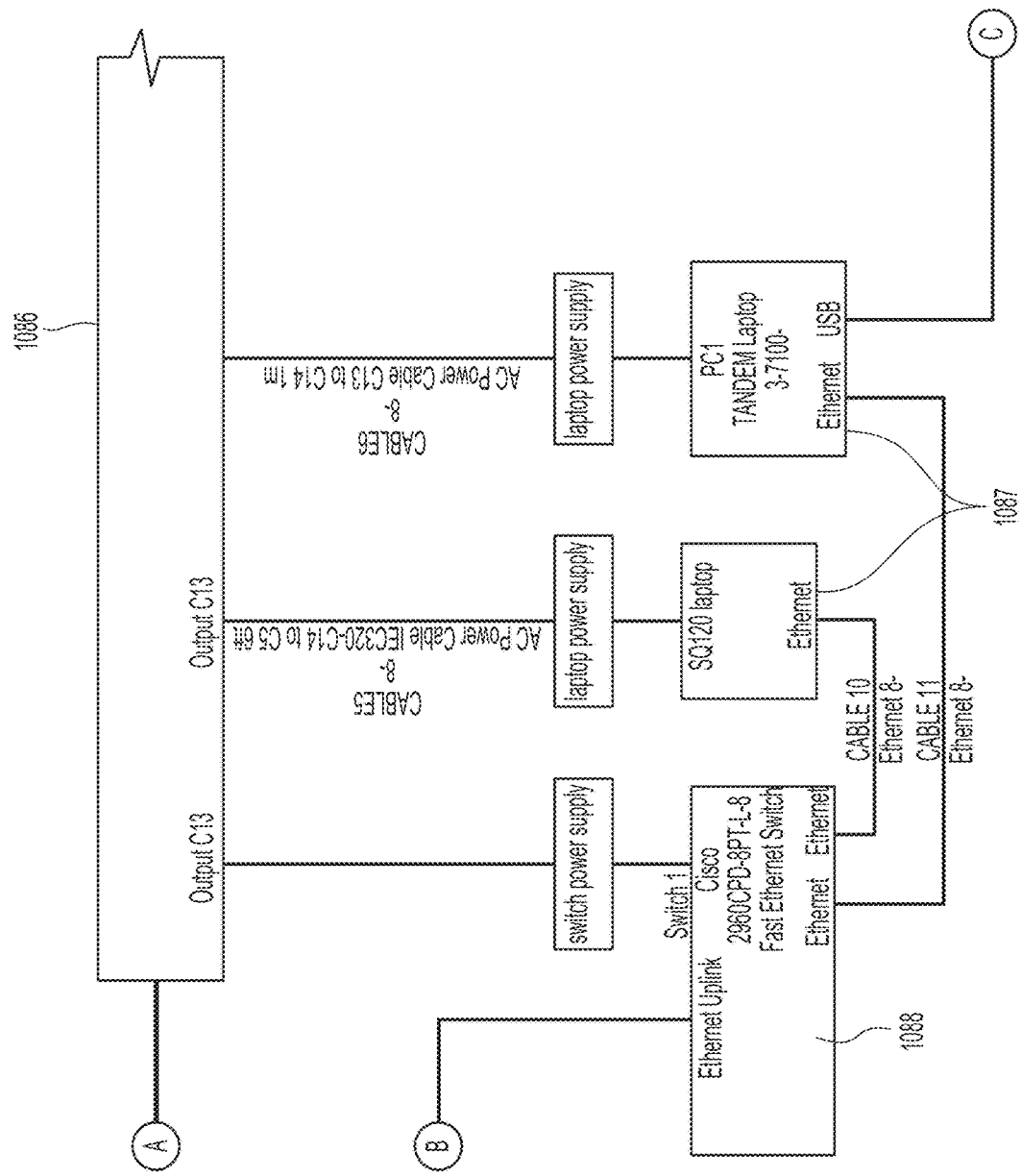
Figure 10C:
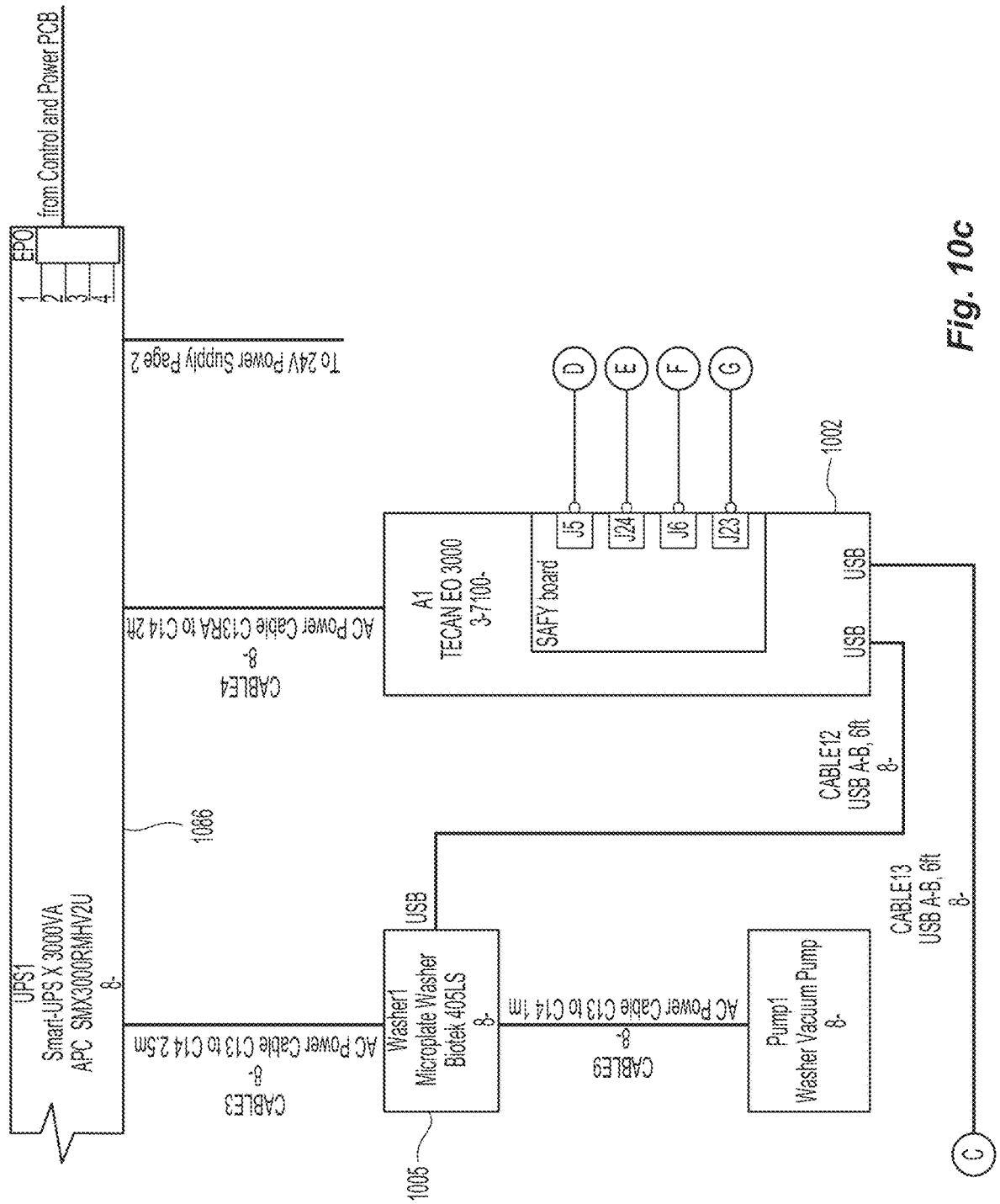
Figure 10D:
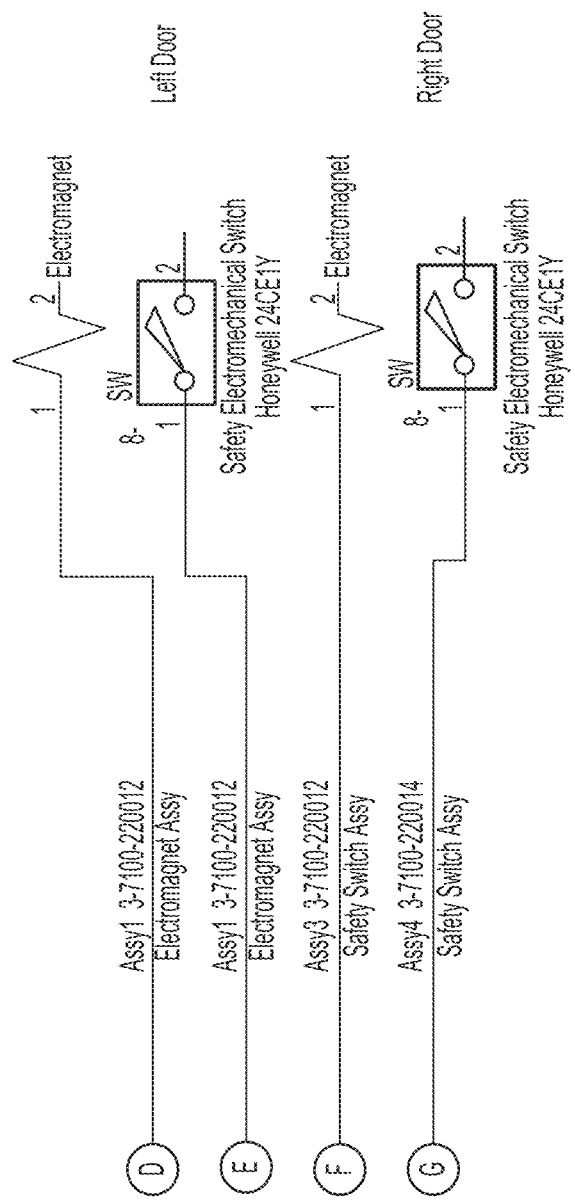

FIGS. 10-10d show aspects of a wiring diagram of an assay system, consistent with embodiments hereof.

Figure 11:
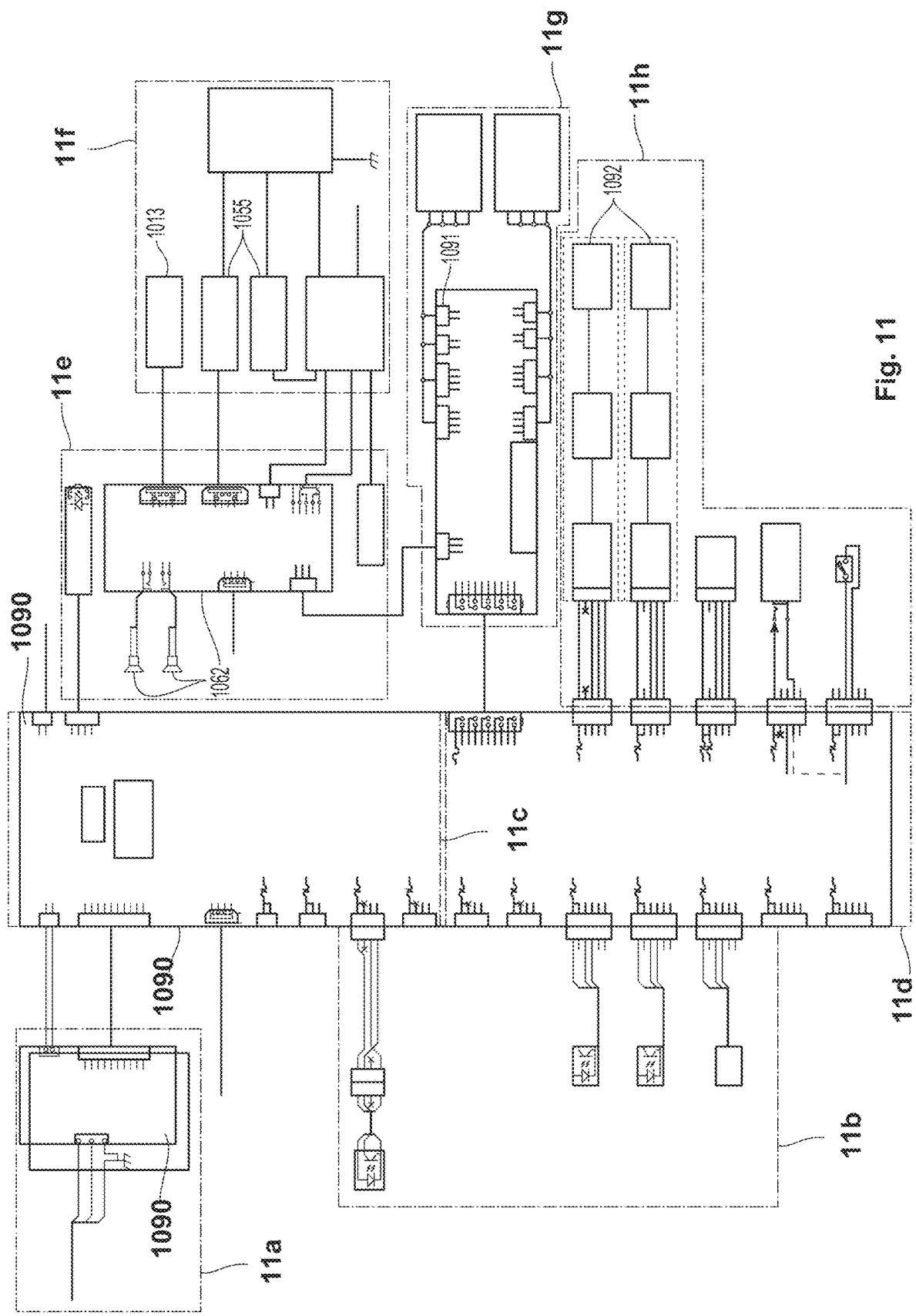
Figure 11A:
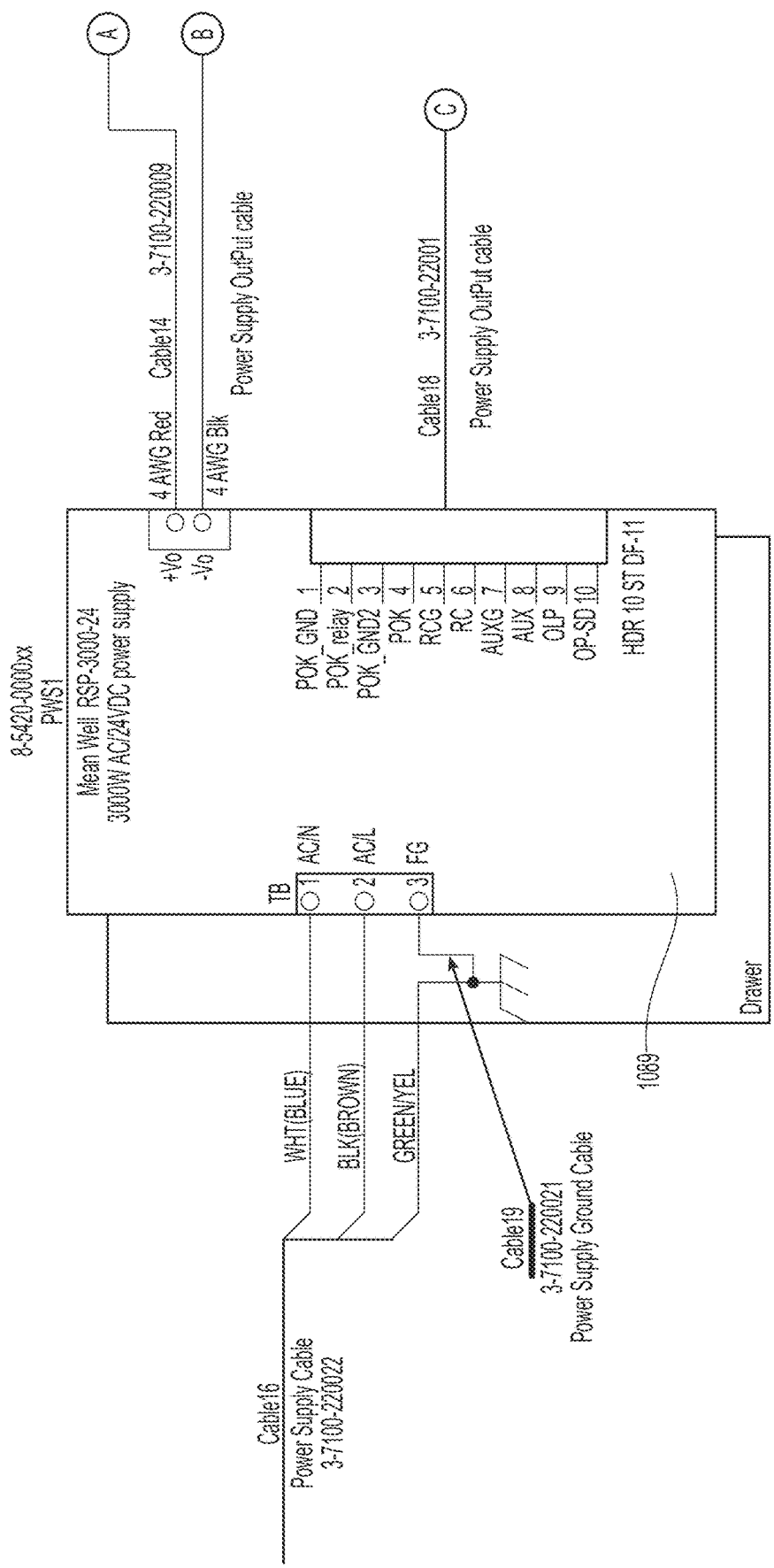
Figure 11B:
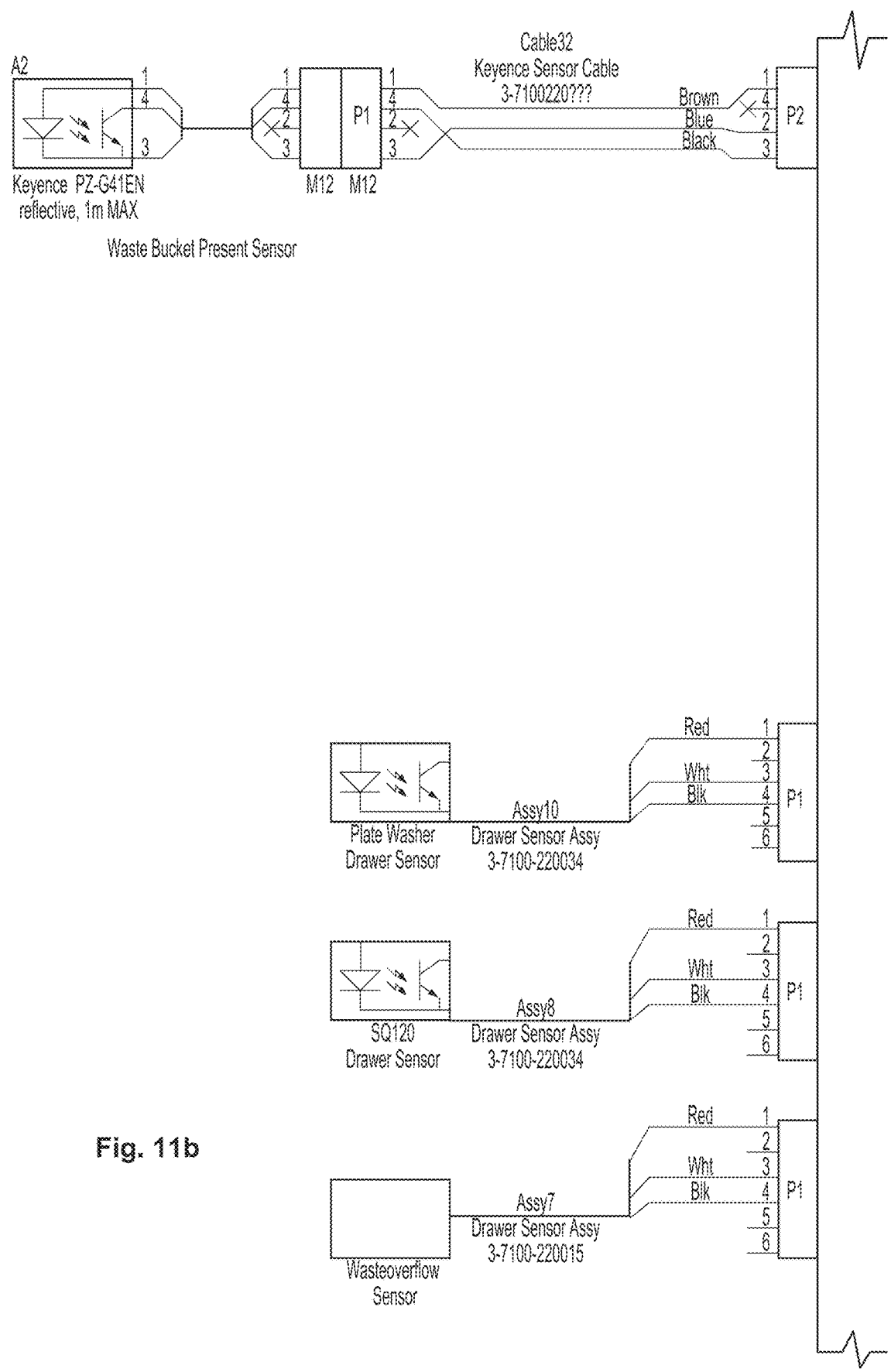
Figure 11C:
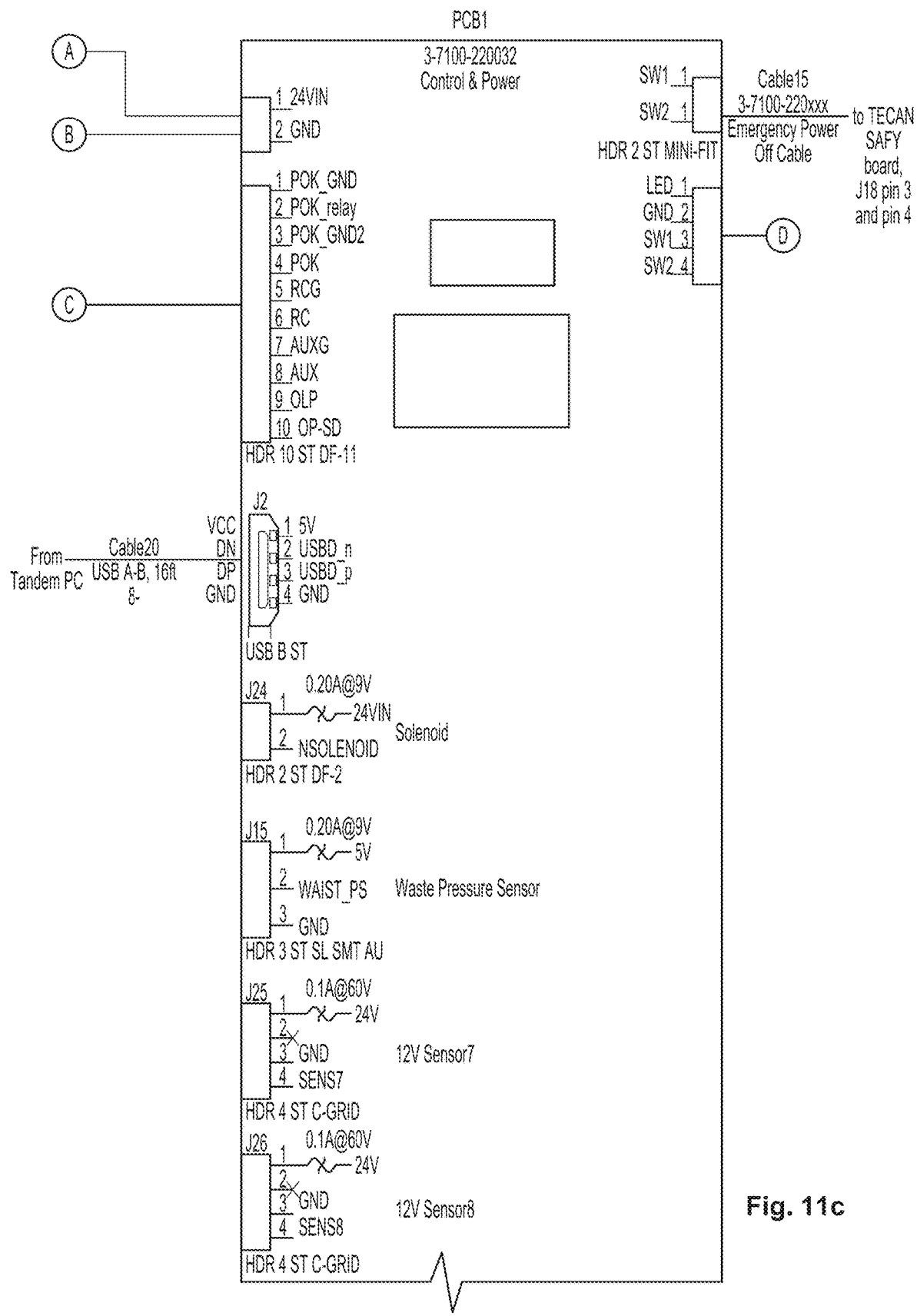
Figure 11D:
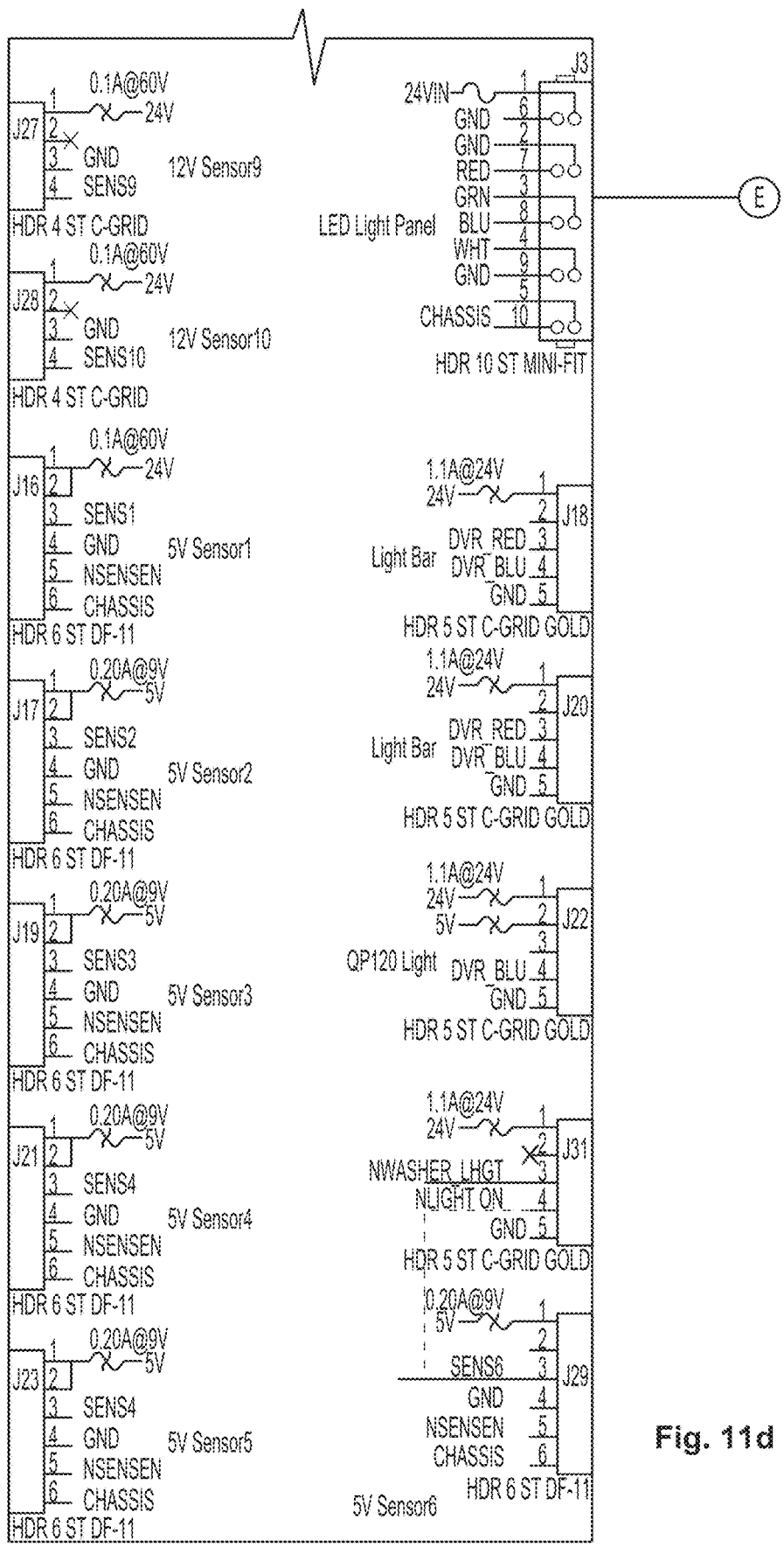
Figure 11E:
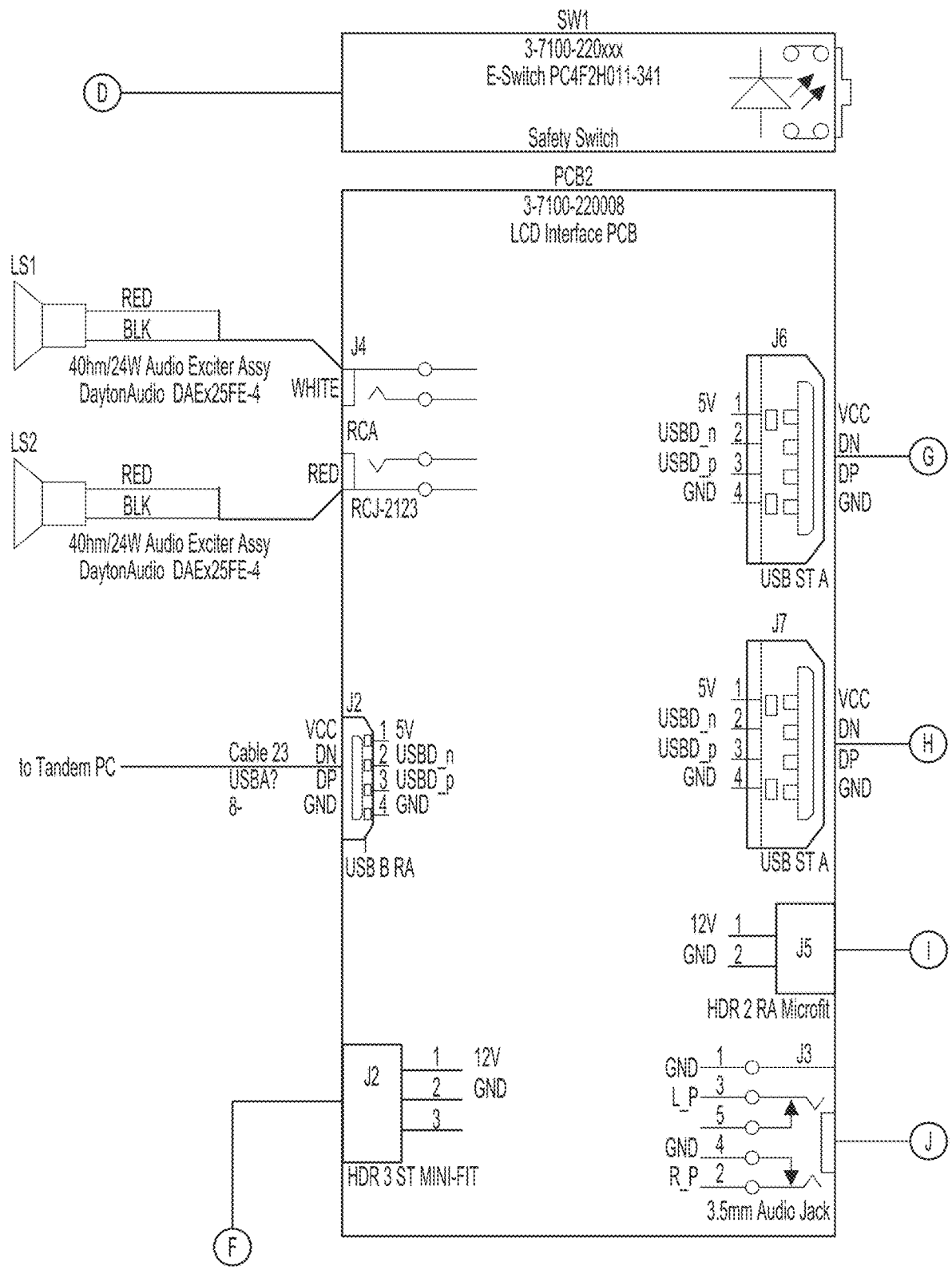
Figure 11F:
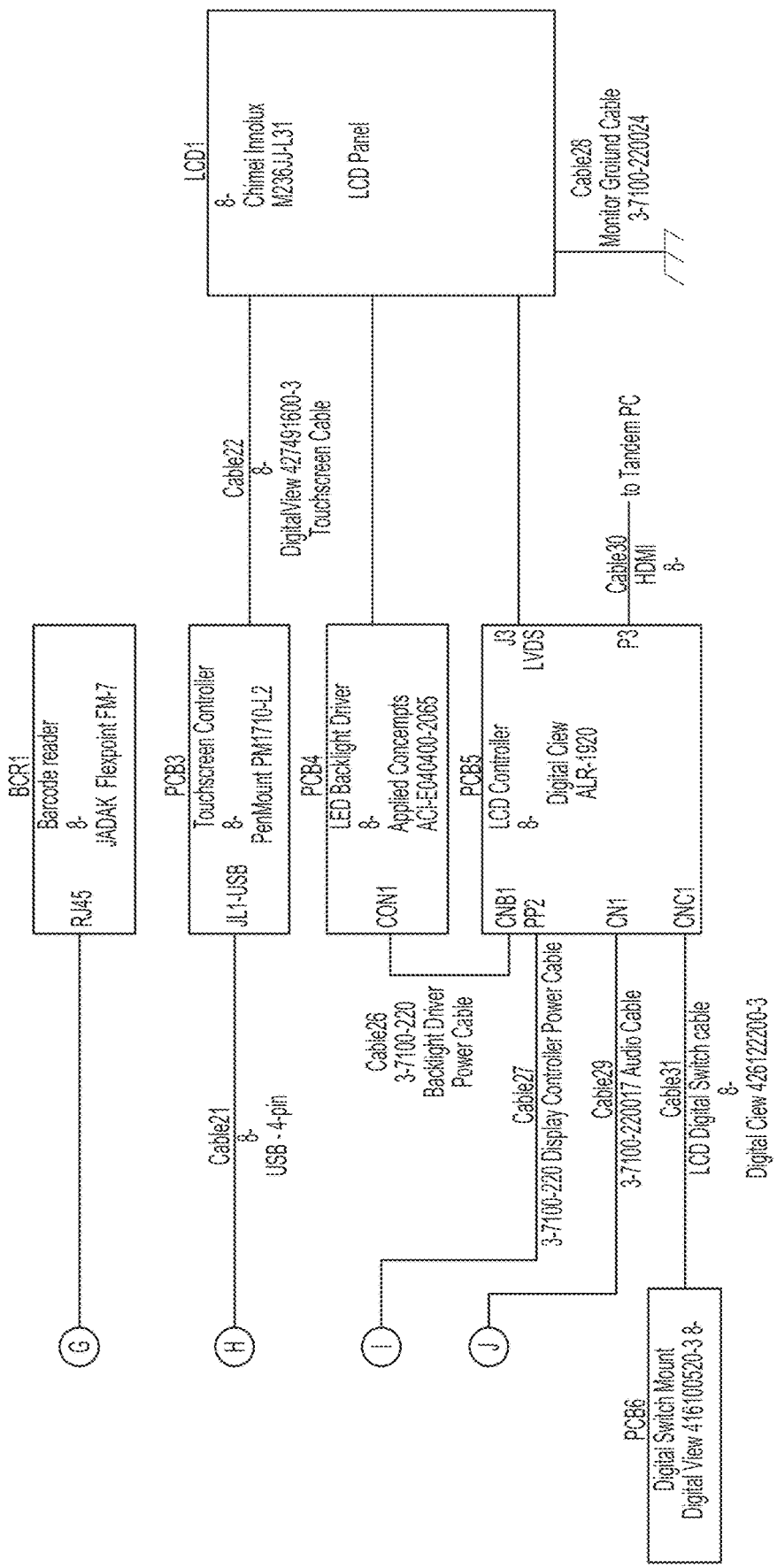
Figure 11G:
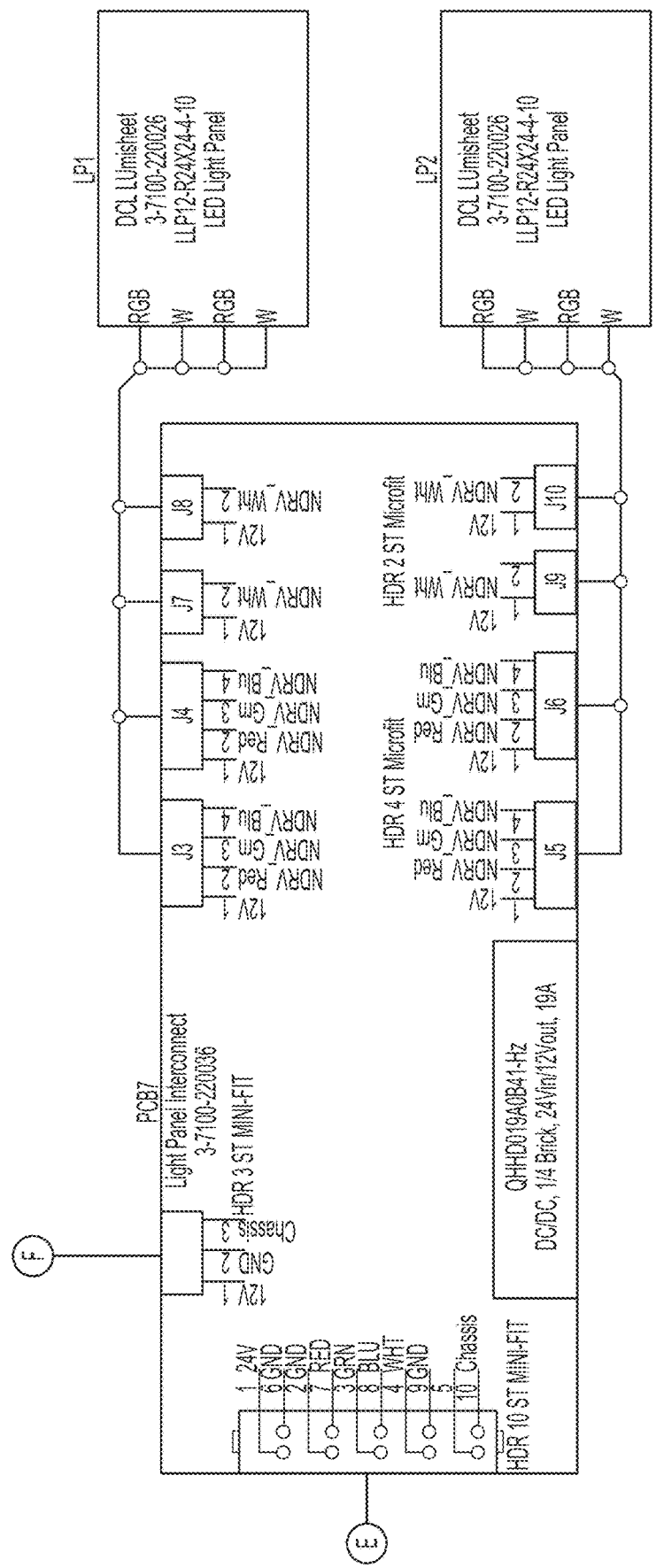
Figure 11H:
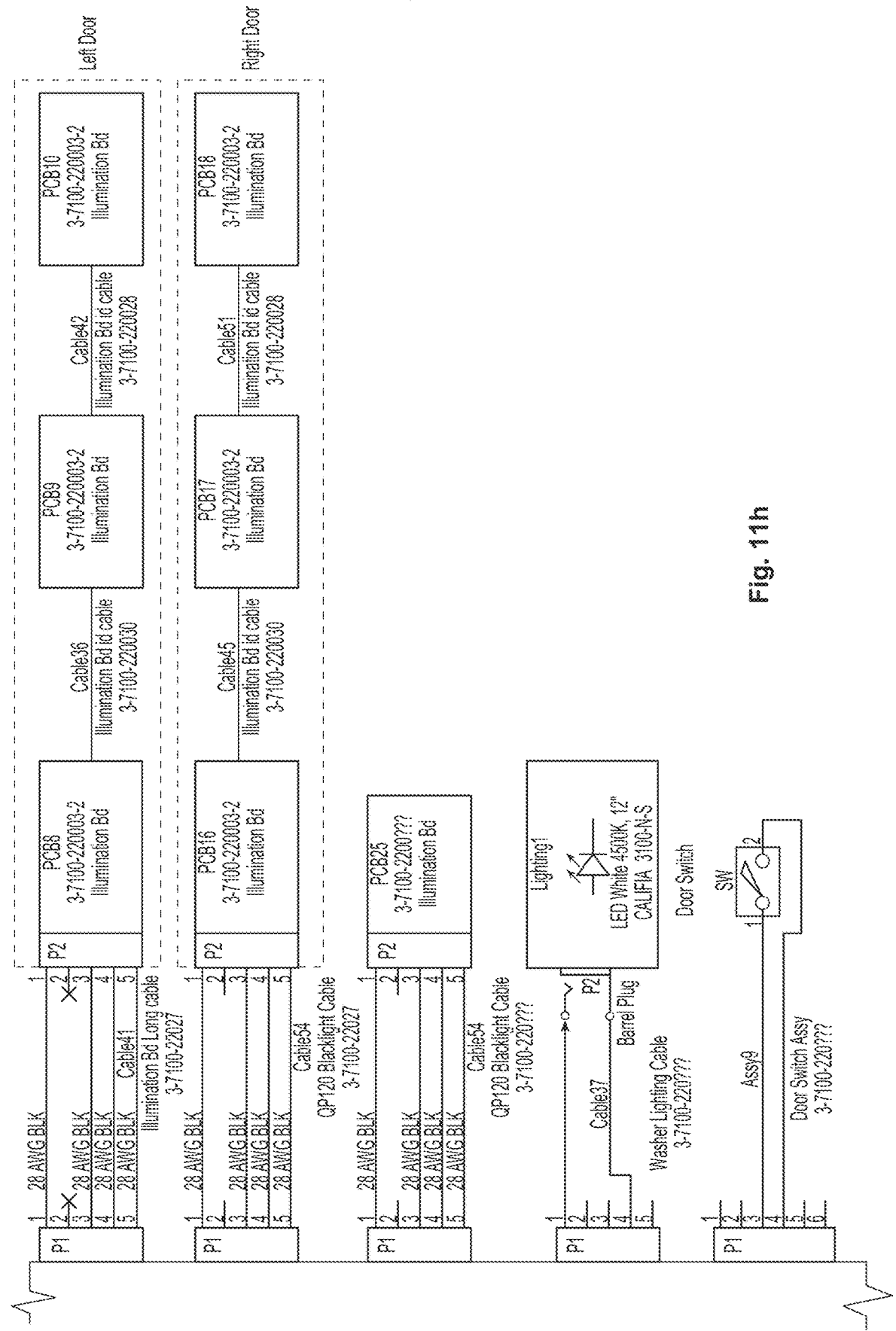

FIGS. 11-11h show aspects of a wiring diagram of an assay system, consistent with embodiments hereof.

Figure 12:
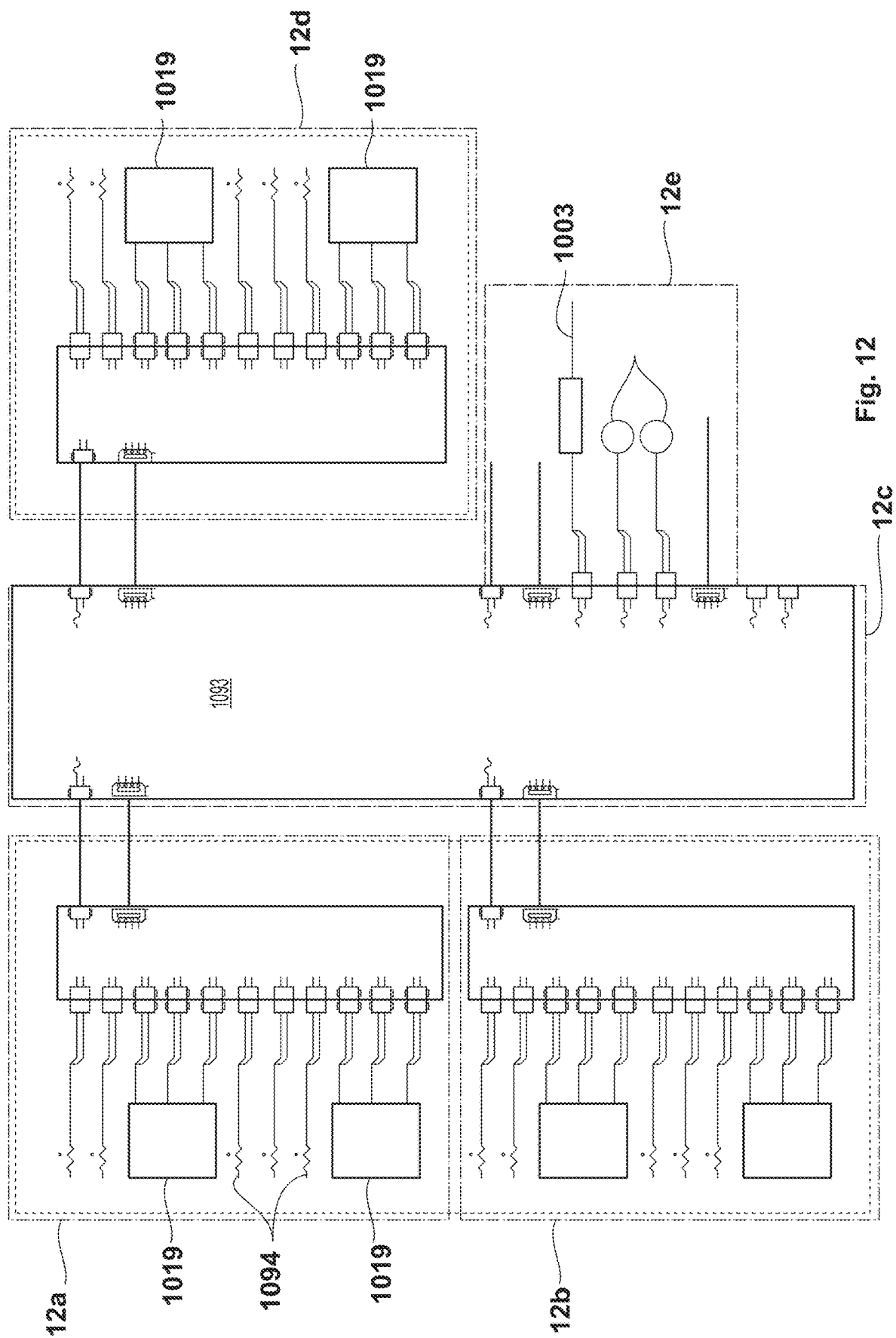
Figure 12A:
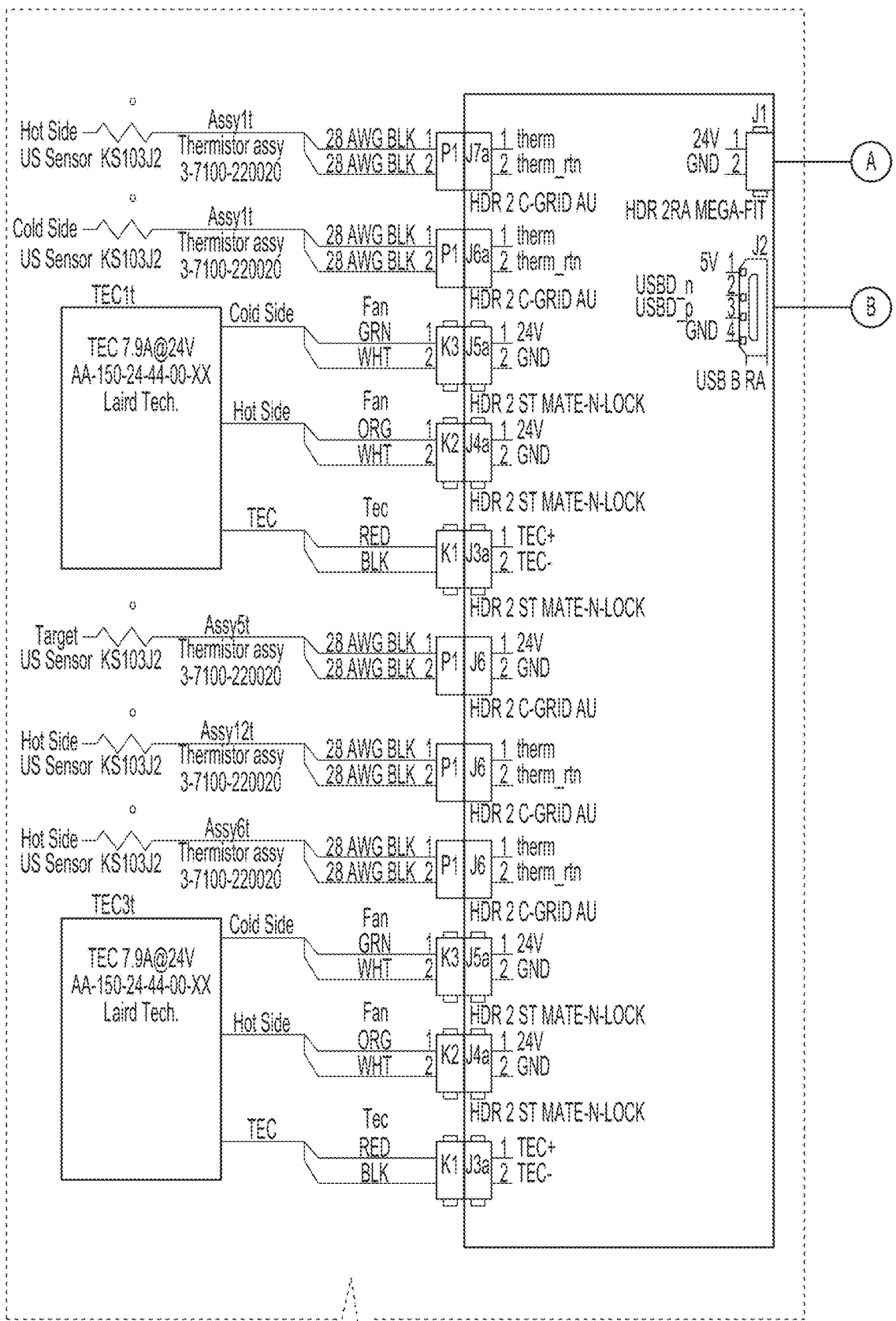
Figure 12B:
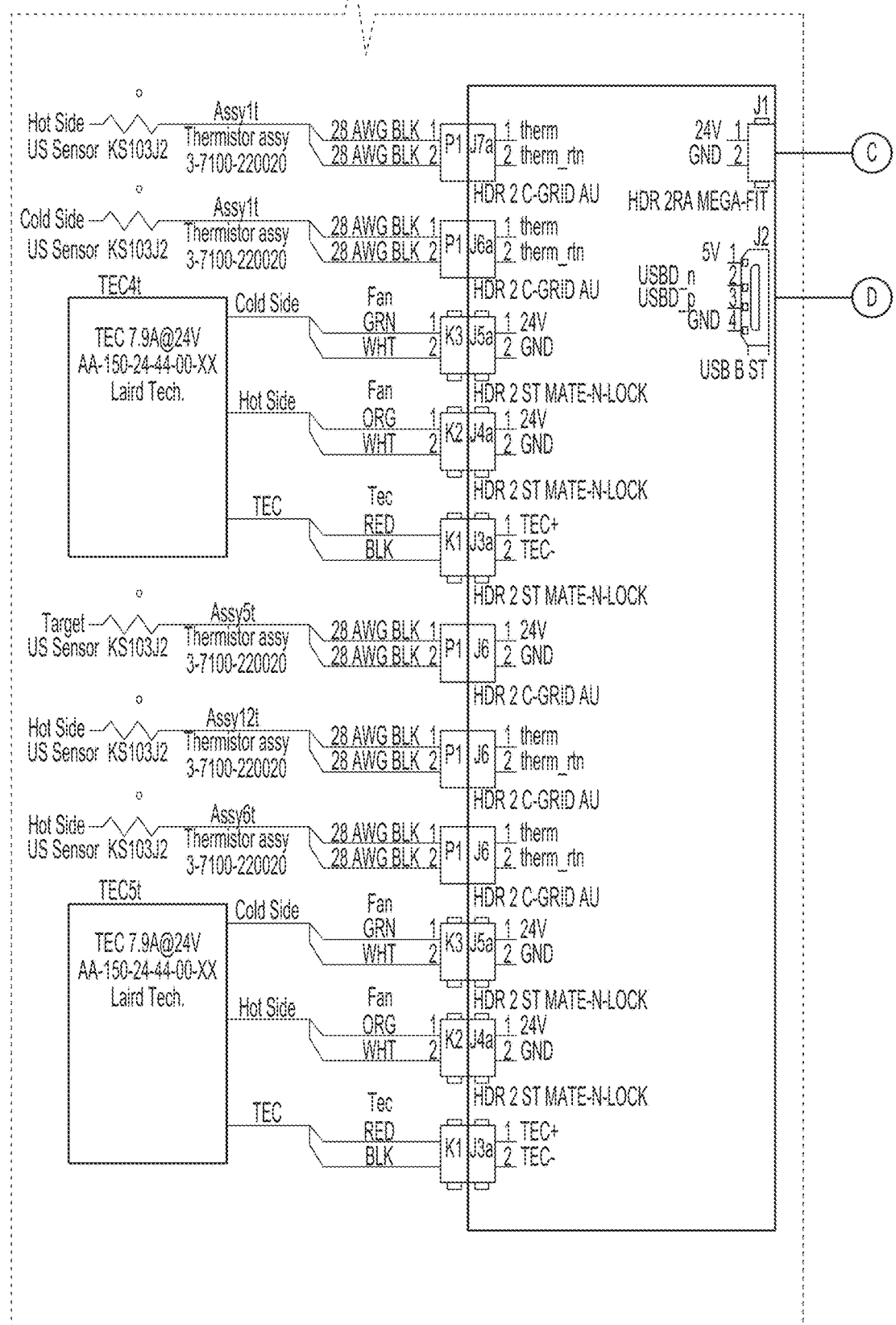
Figure 12C:
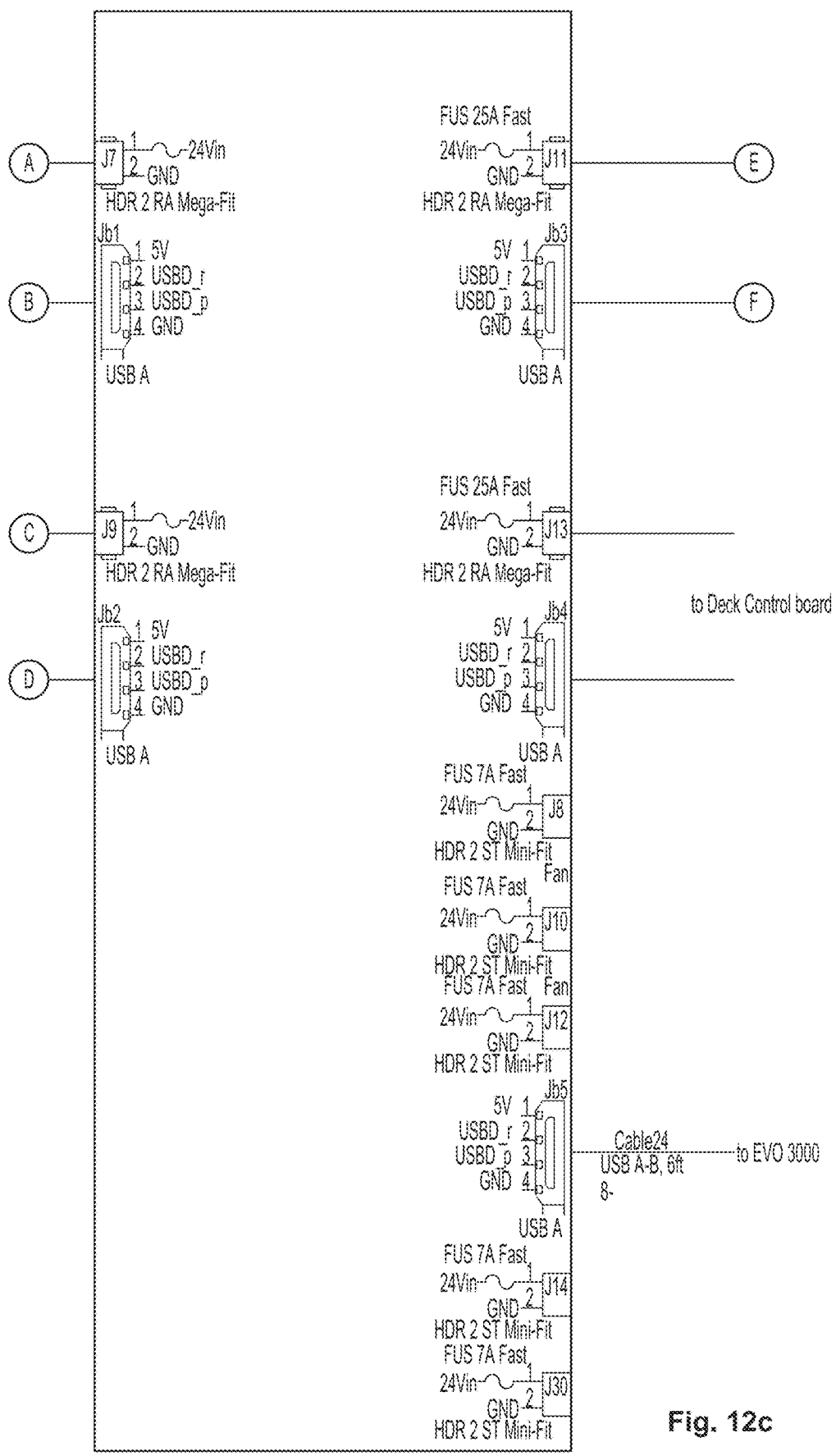
Figure 12D:
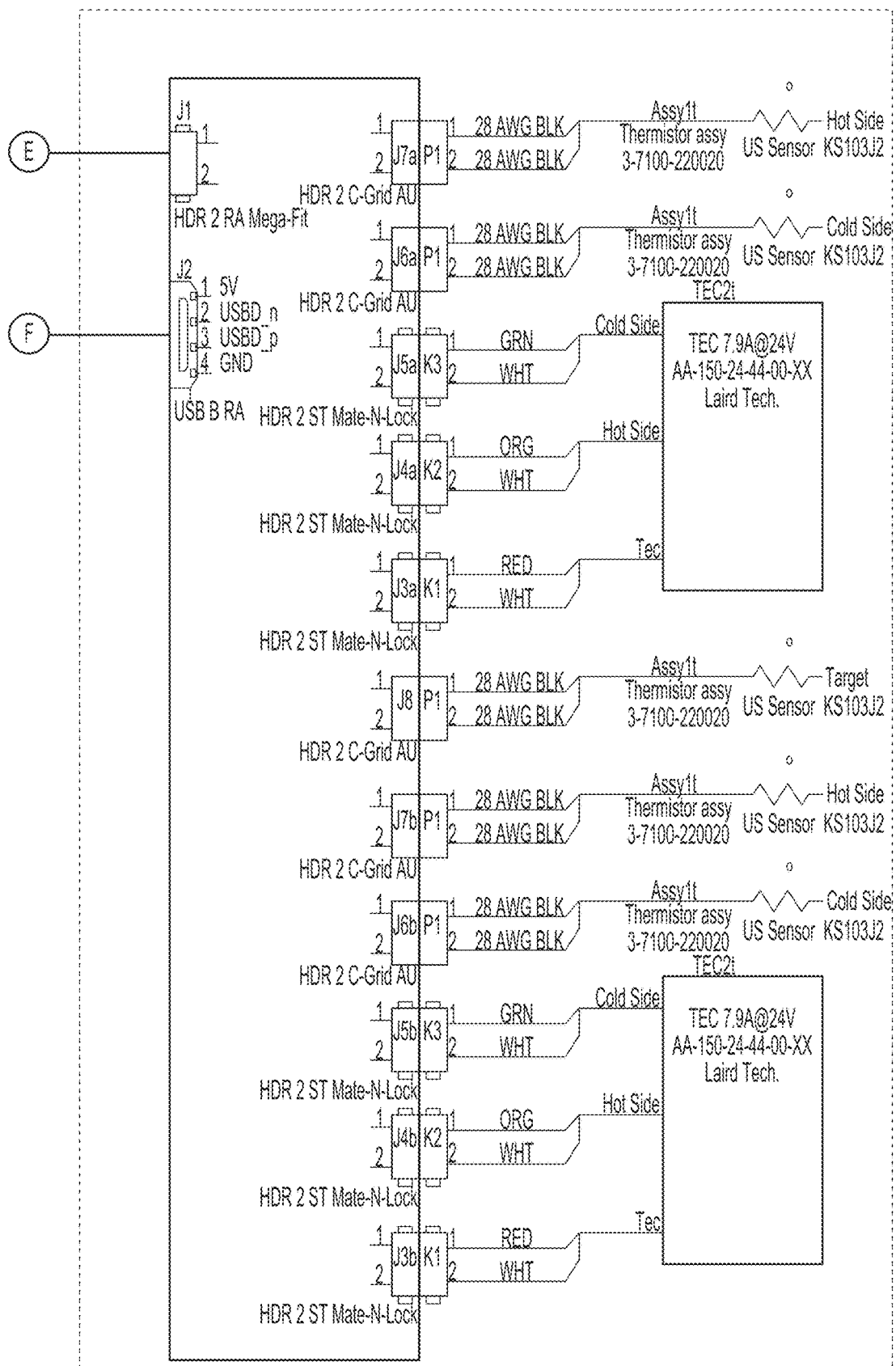
Figure 12E:
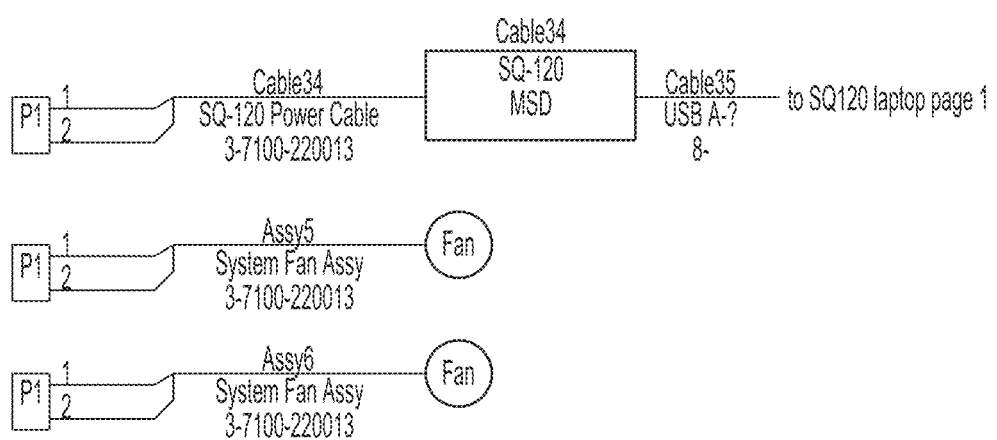

FIGS. 12-12e show aspects of a wiring diagram of an assay system, consistent with embodiments hereof.

Figure 13:
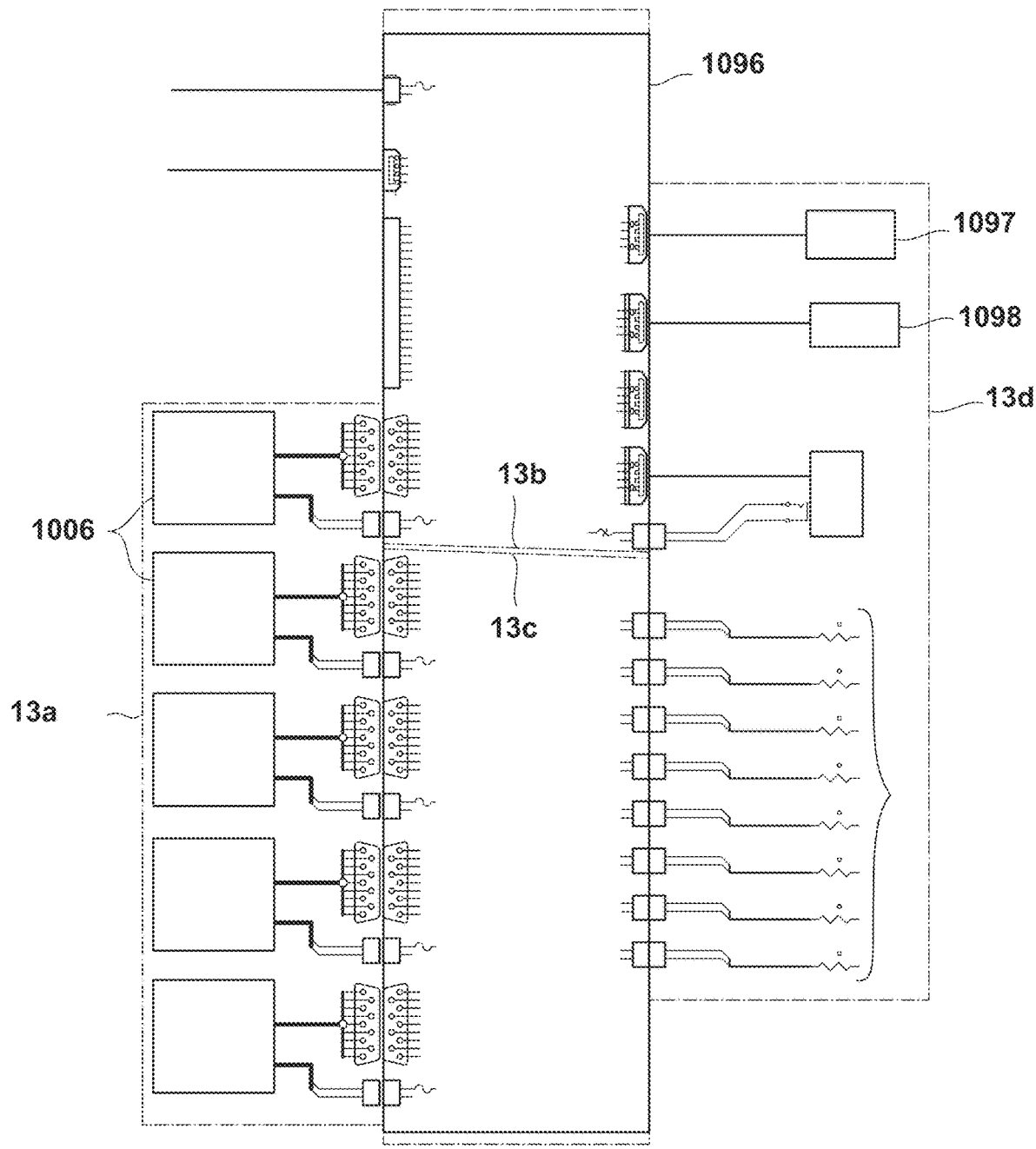
Figure 13A:
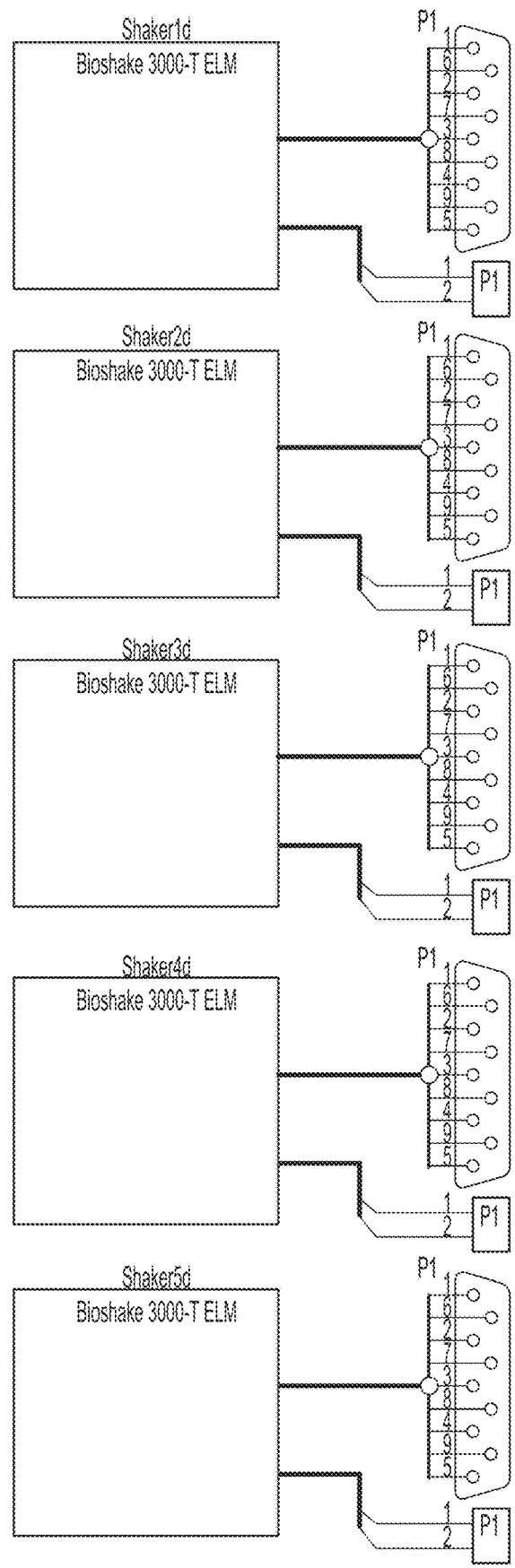
Figure 13B:
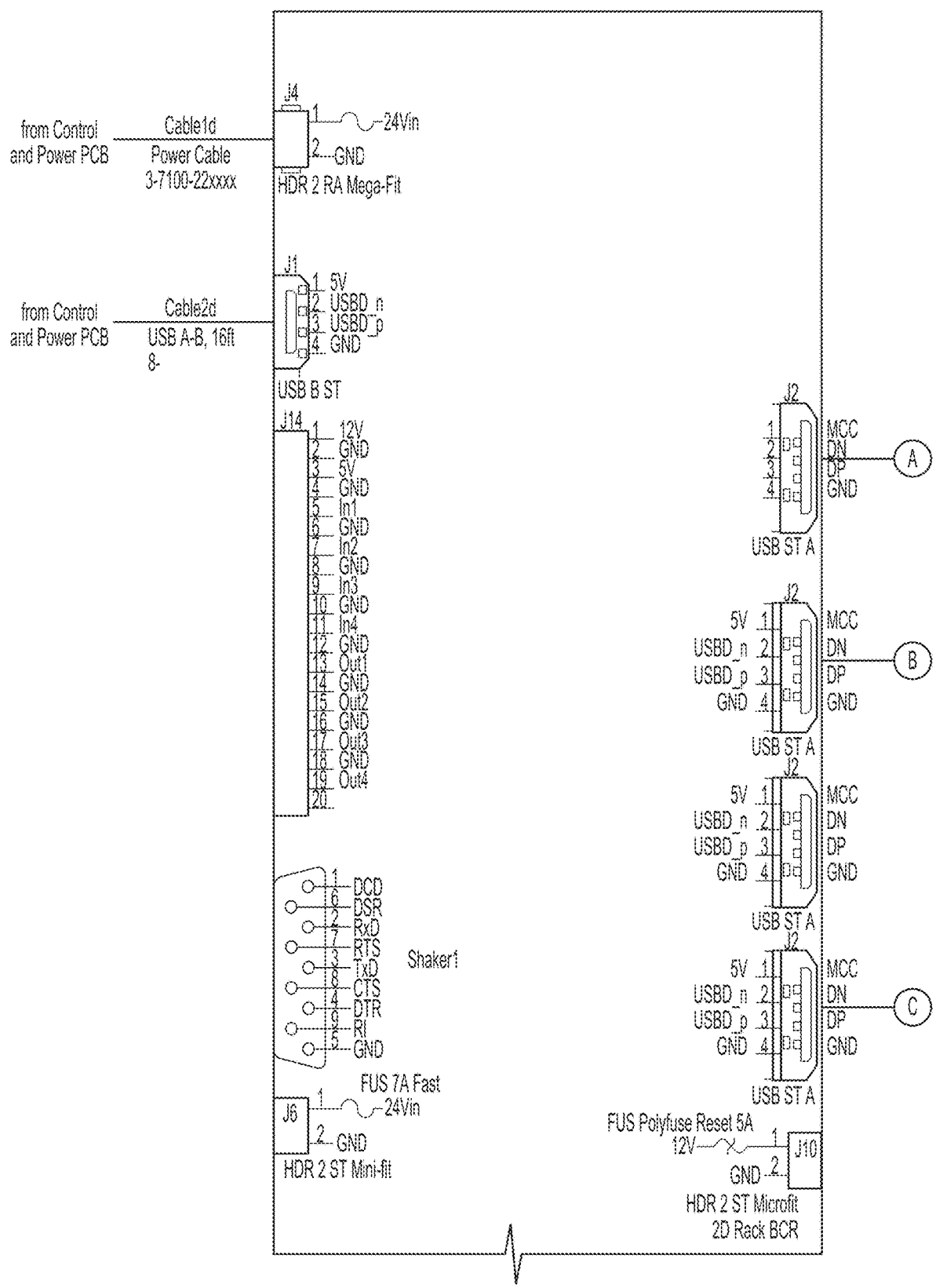
Figure 13C:
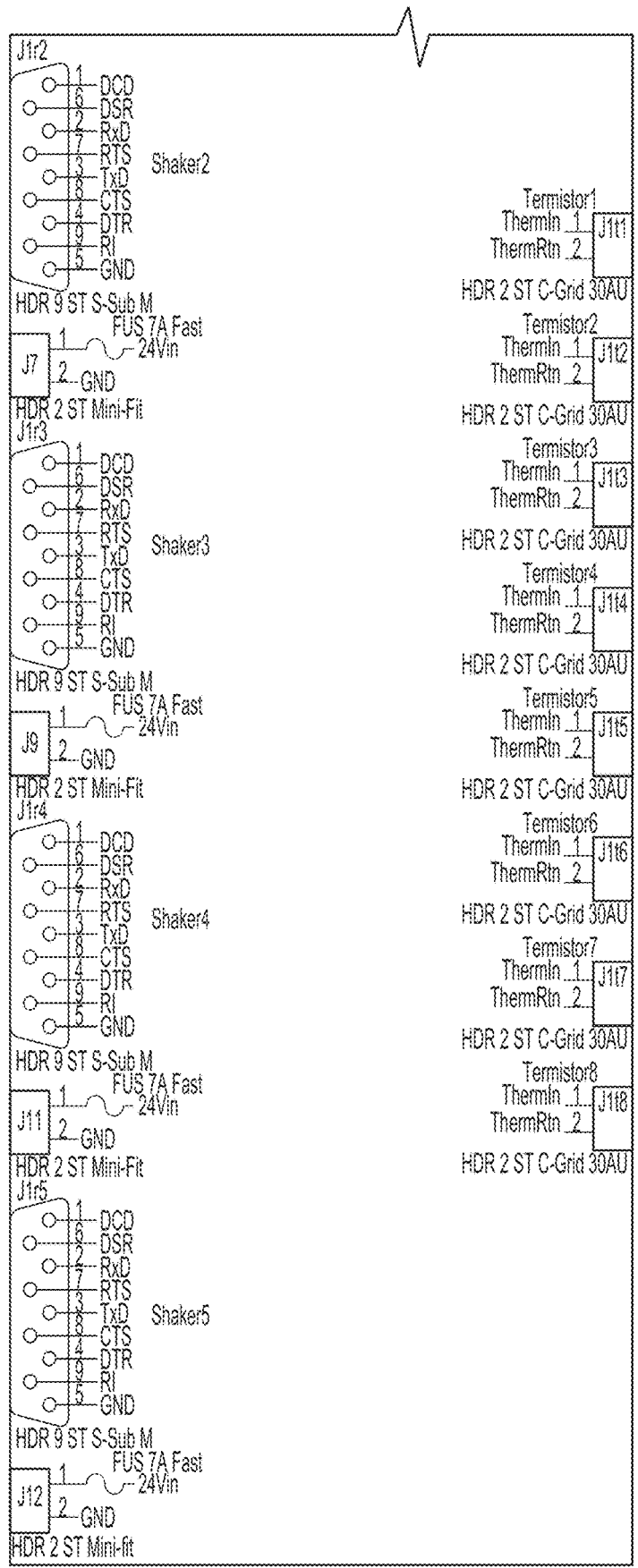
Figure 13D:
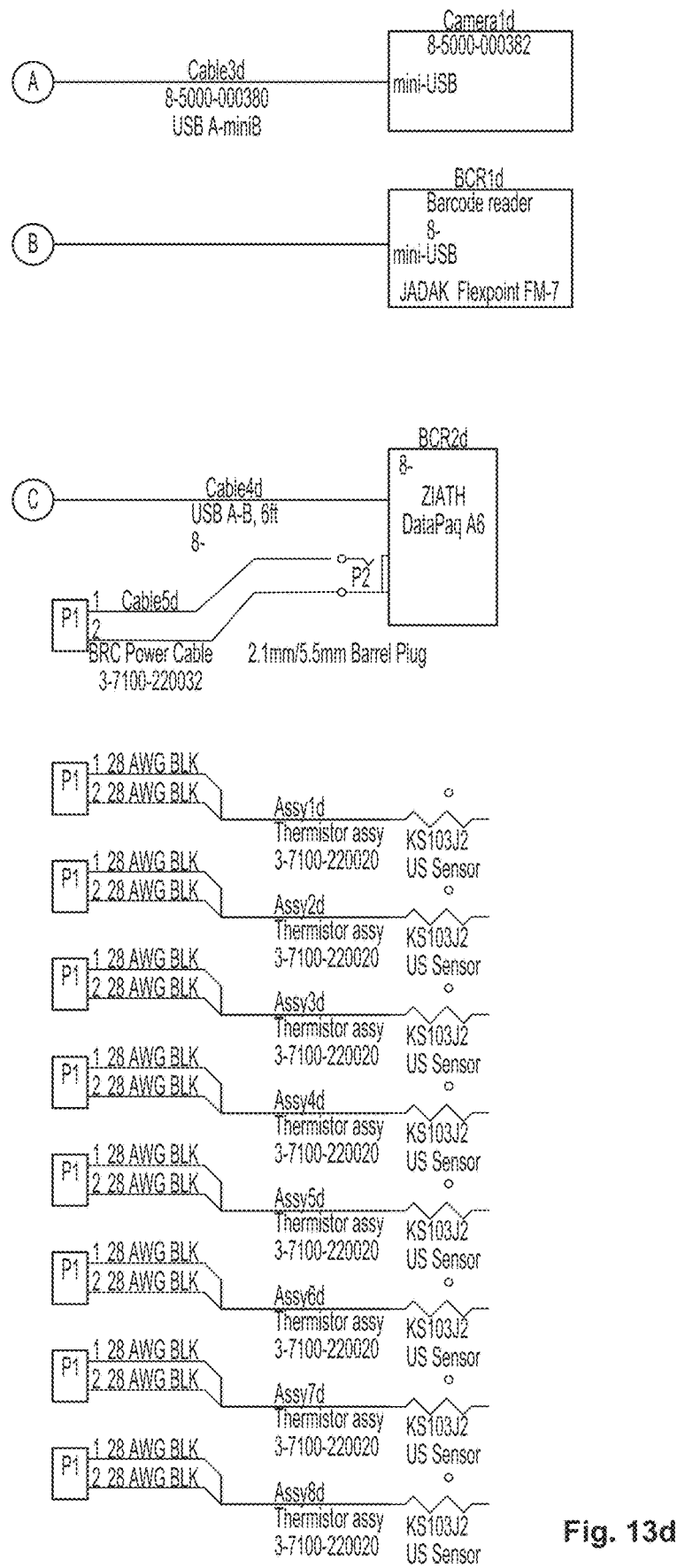

FIGS. 13-13d show aspects of a wiring diagram of an assay system, consistent with embodiments hereof.

Figures 14A, 14B:
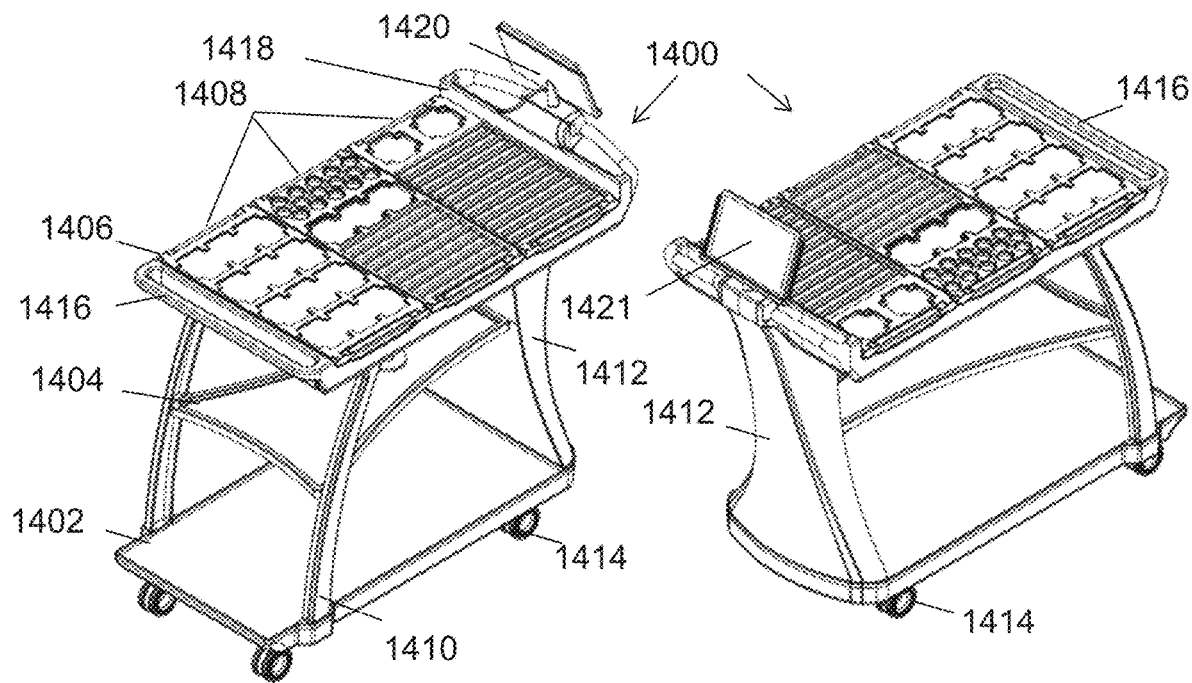

FIGS. 14(a)-(b) are perspective views of an inventive loading cart designed for use with the assay systems described herein.

Figure 14C:
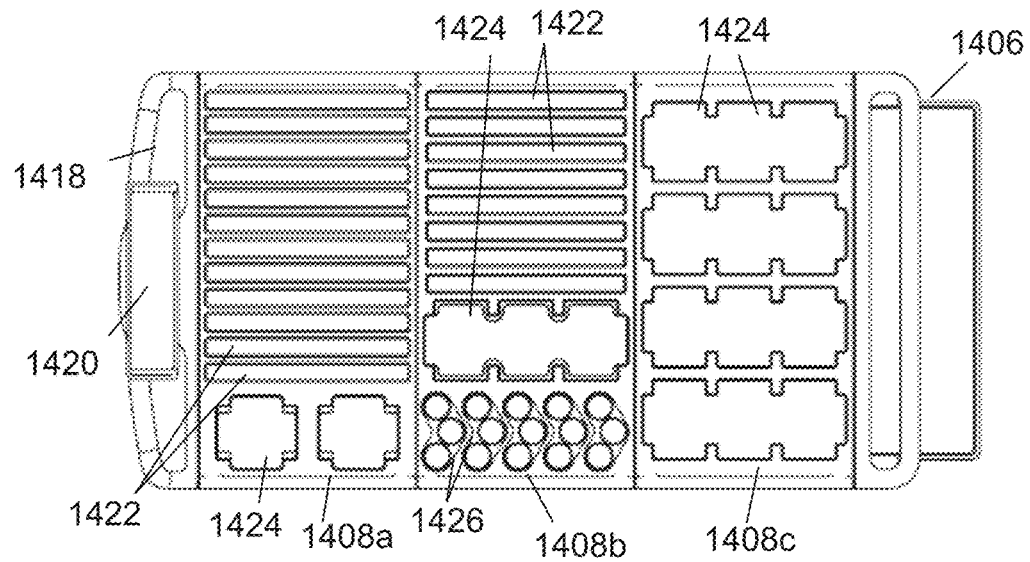
Figure 14D:
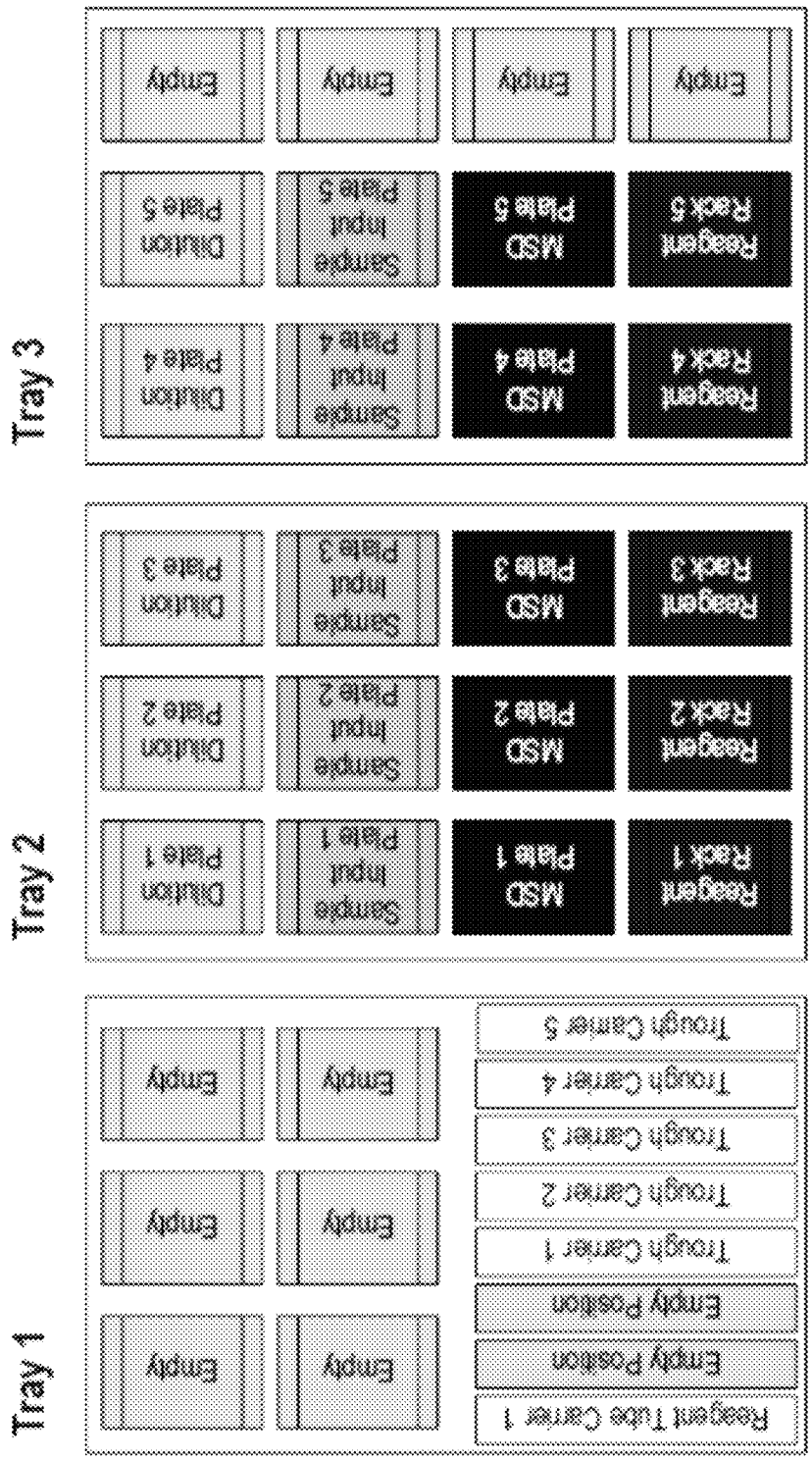
Figure 14E:
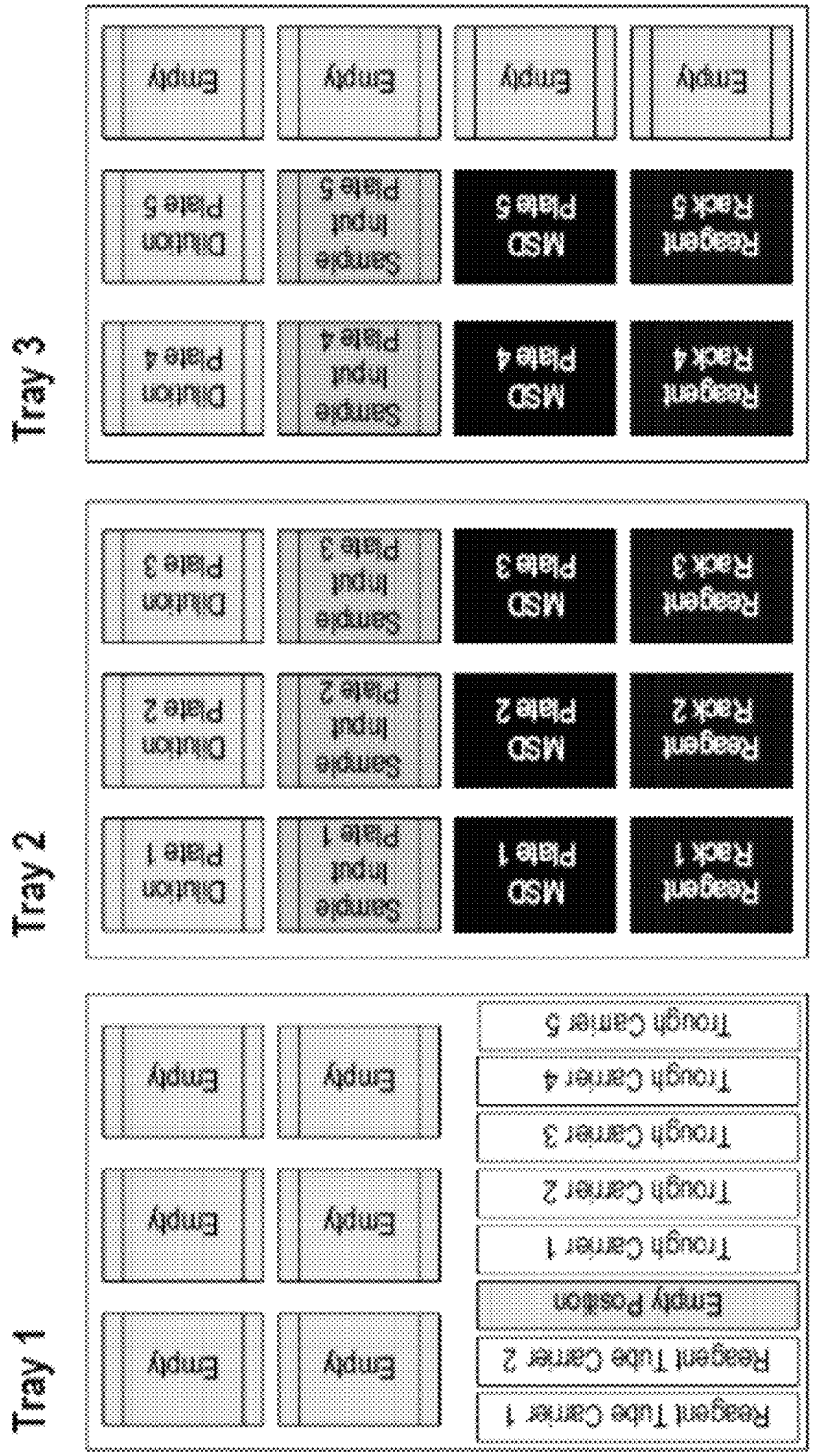
Figure 14F:
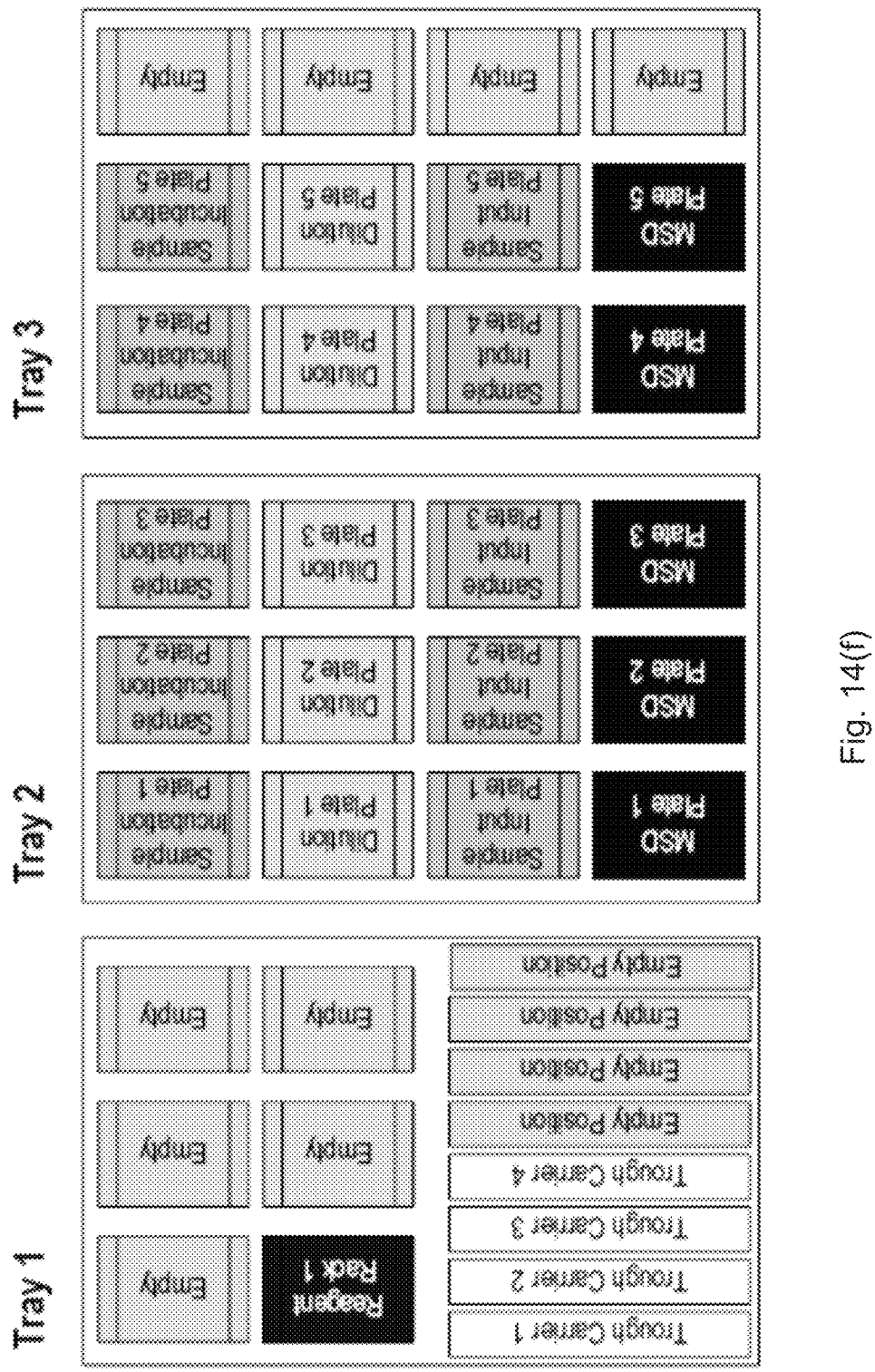
Figure 14G:
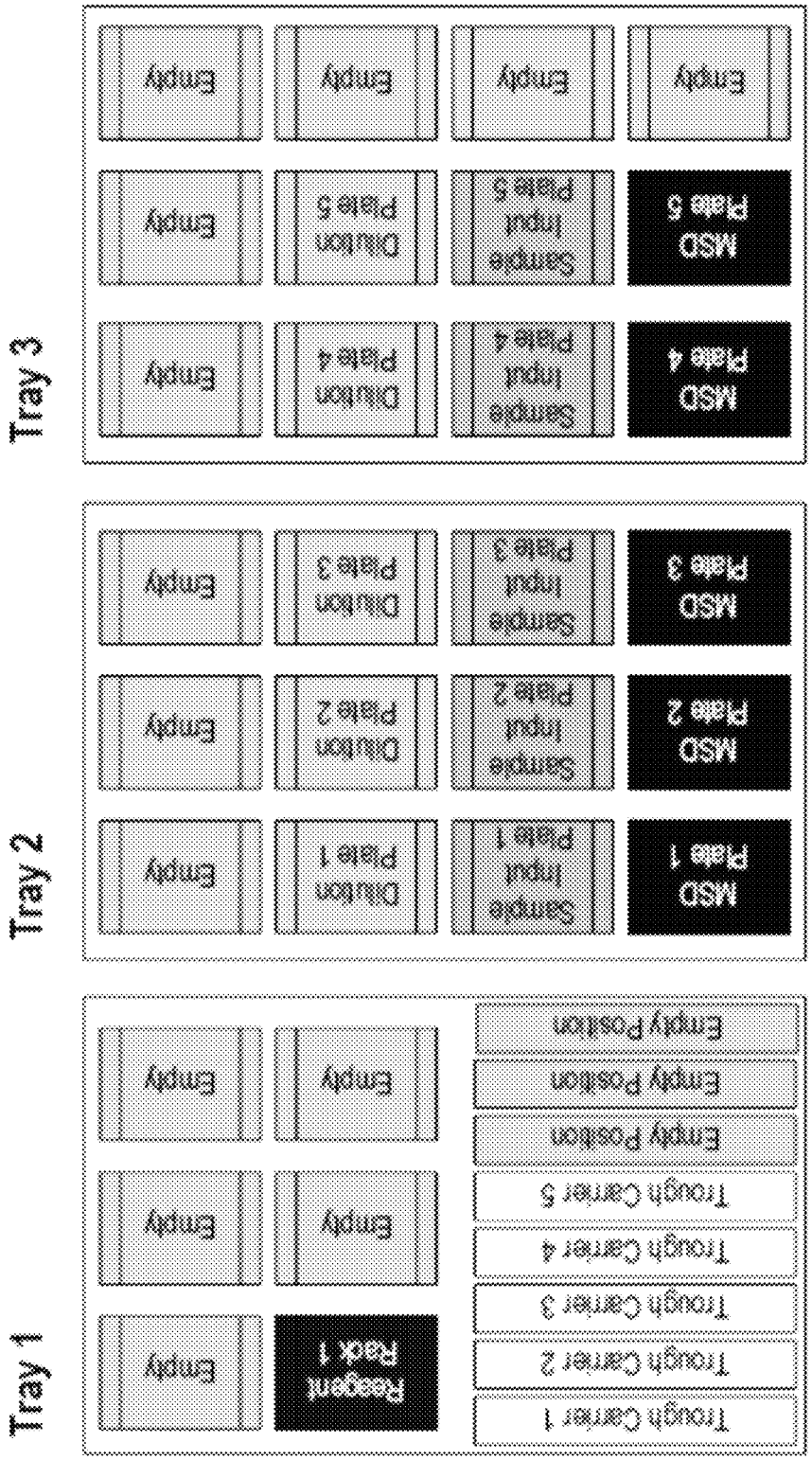
Figure 14H:
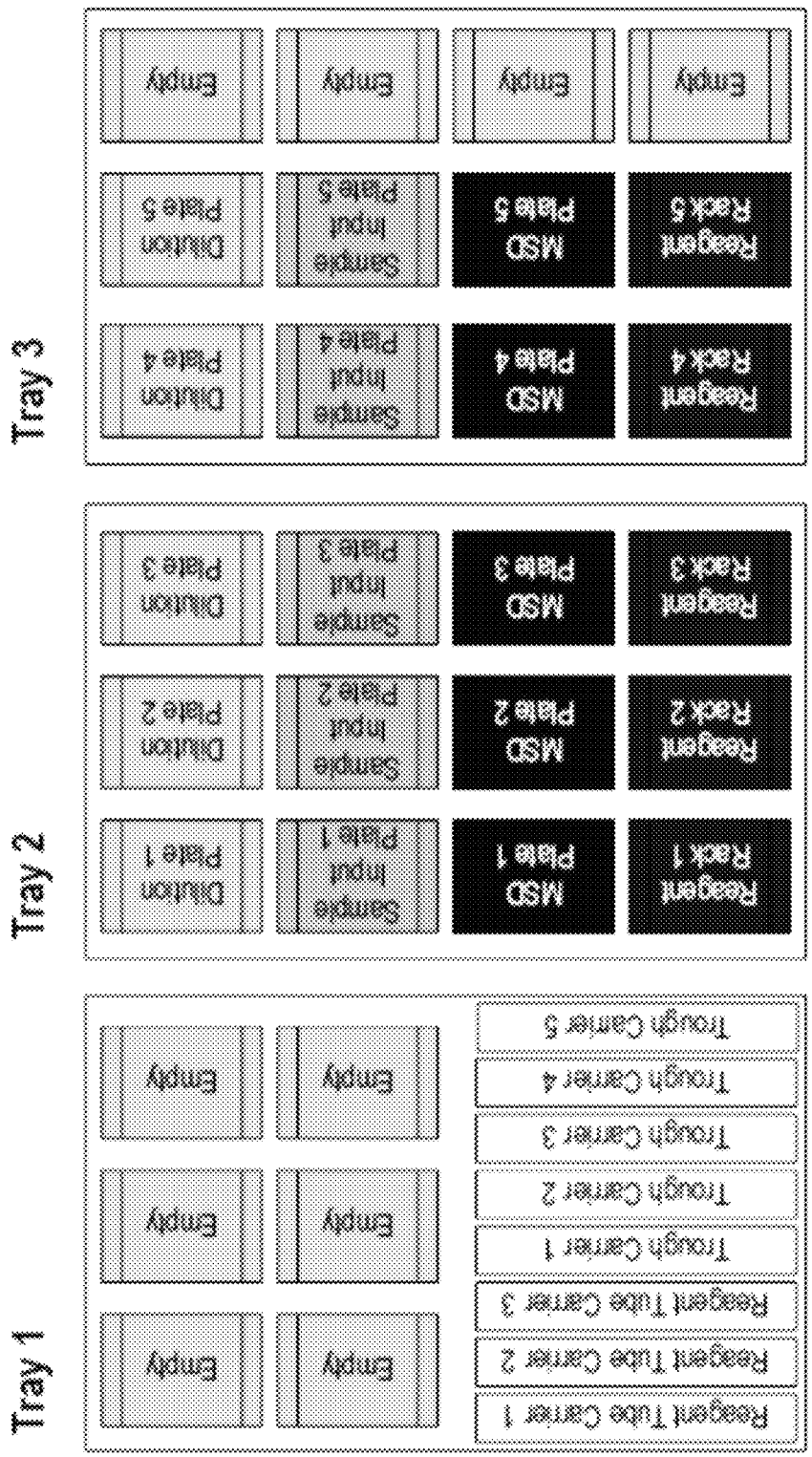

FIG. 14(c) is a top view of the loading cart showing trays adapted to receive assay consumables consistent with embodiments hereof.

FIGS. 14(d)-(h) are exemplary top view of assay consumable trays loaded with assay consumables consistent with embodiments hereof.

Figure 14I:
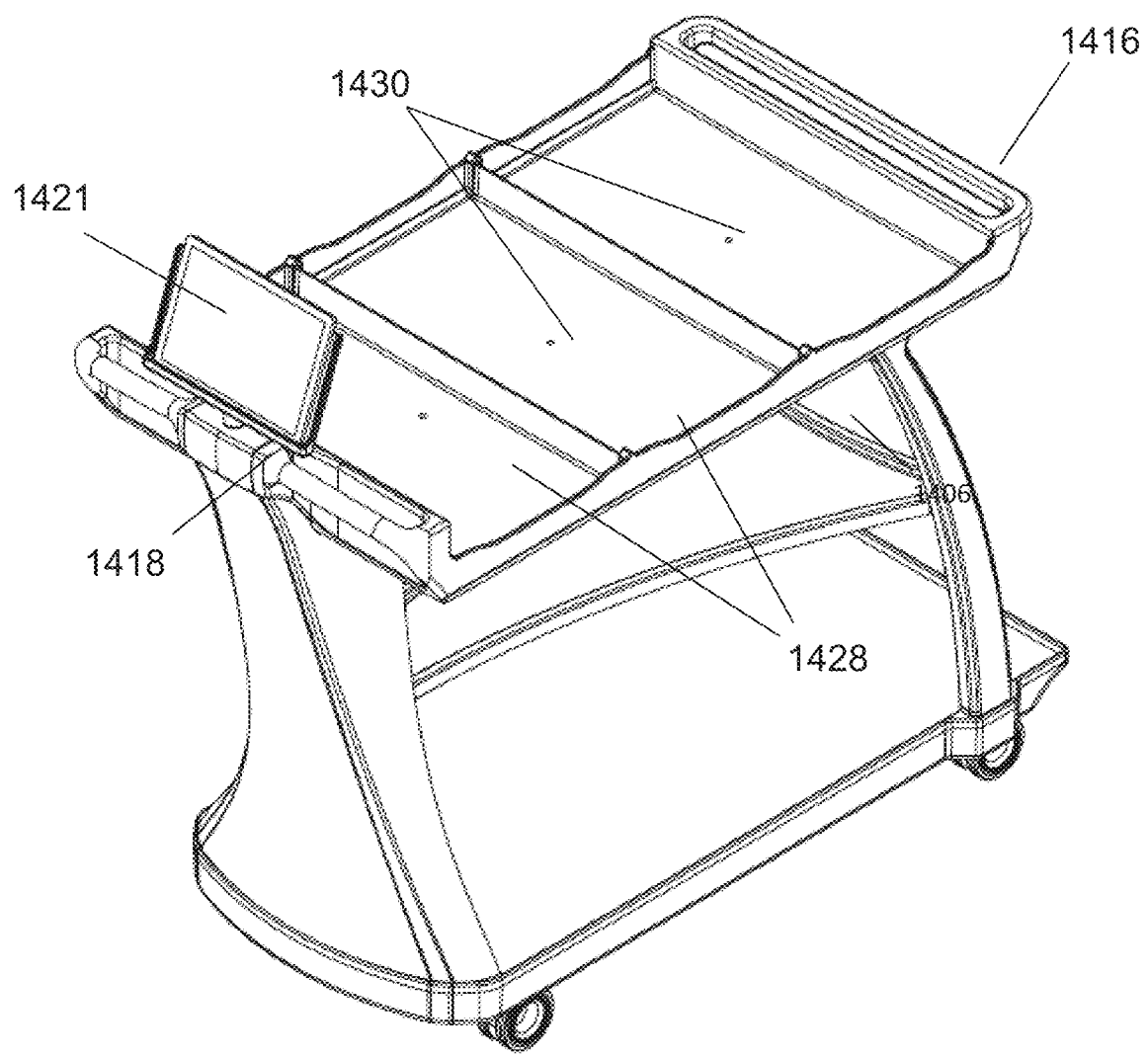

FIG. 14(i) shows cooling compartments under assay consumable trays consistent with embodiments hereof.

Figure 14J:
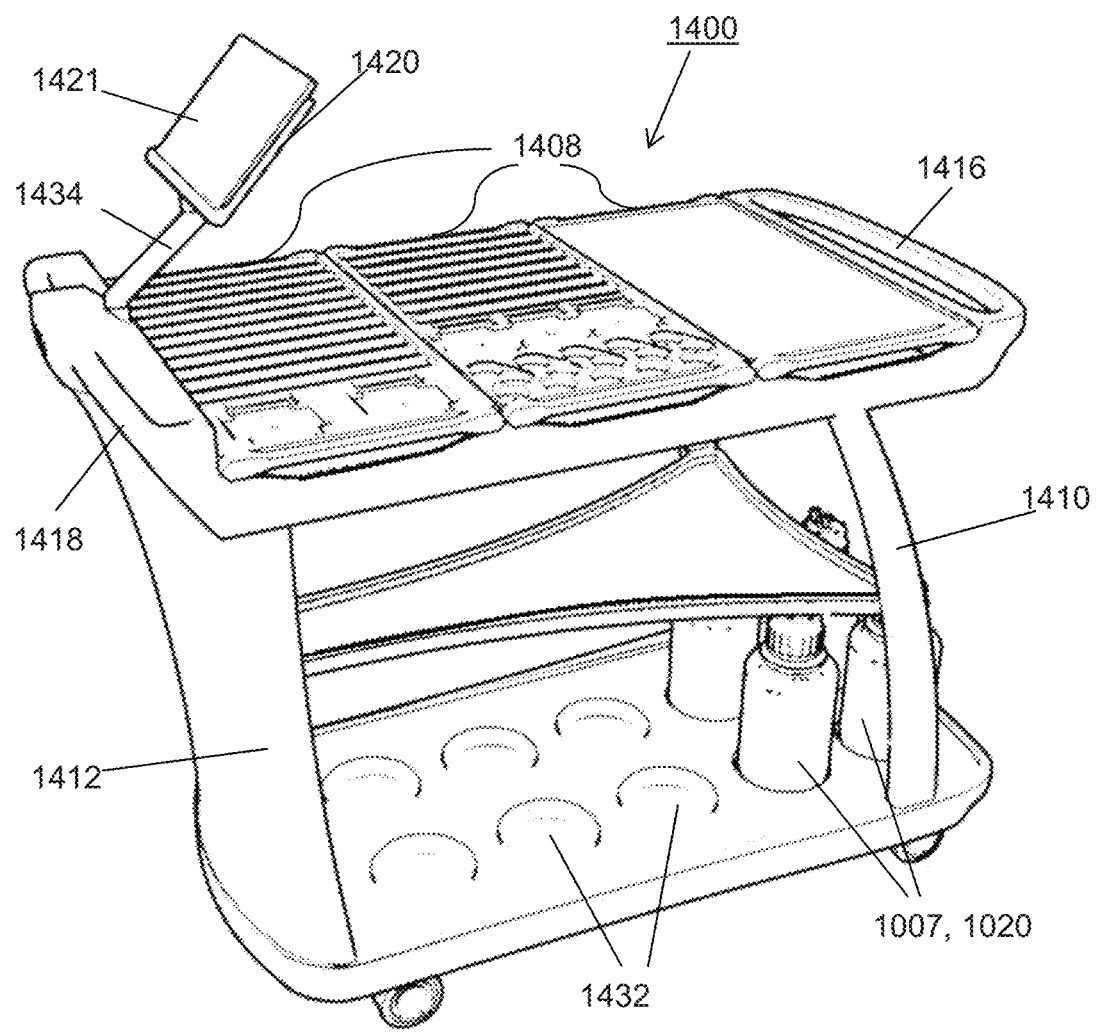

FIG. 14(j) illustrates a loading cart consistent with embodiments hereof.

Figure 15A:
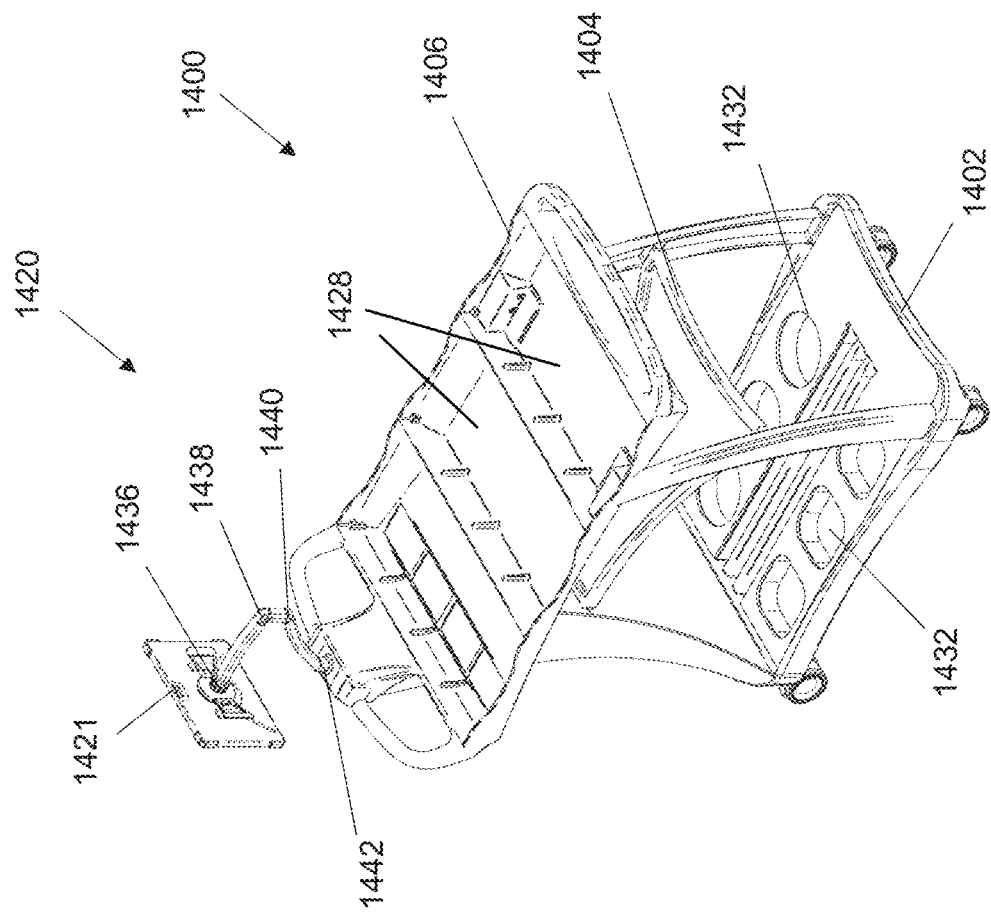
Figure 15C:
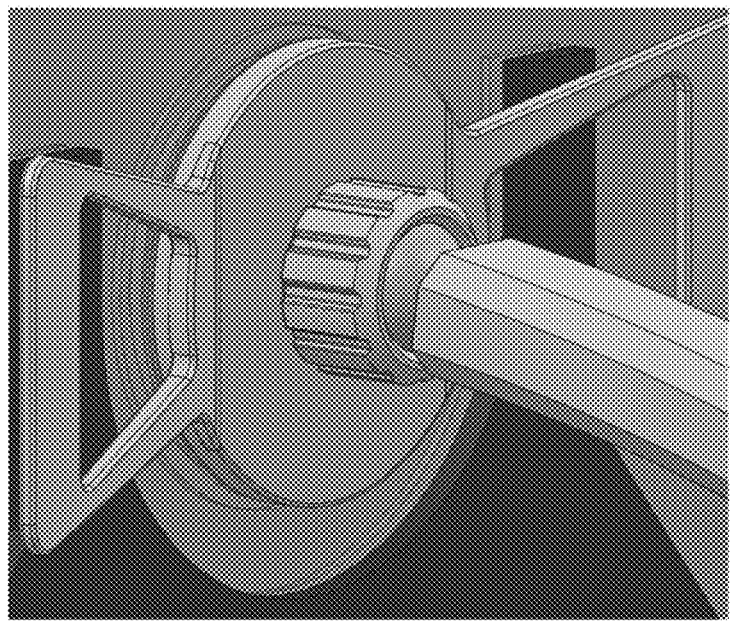
Figure 15D:
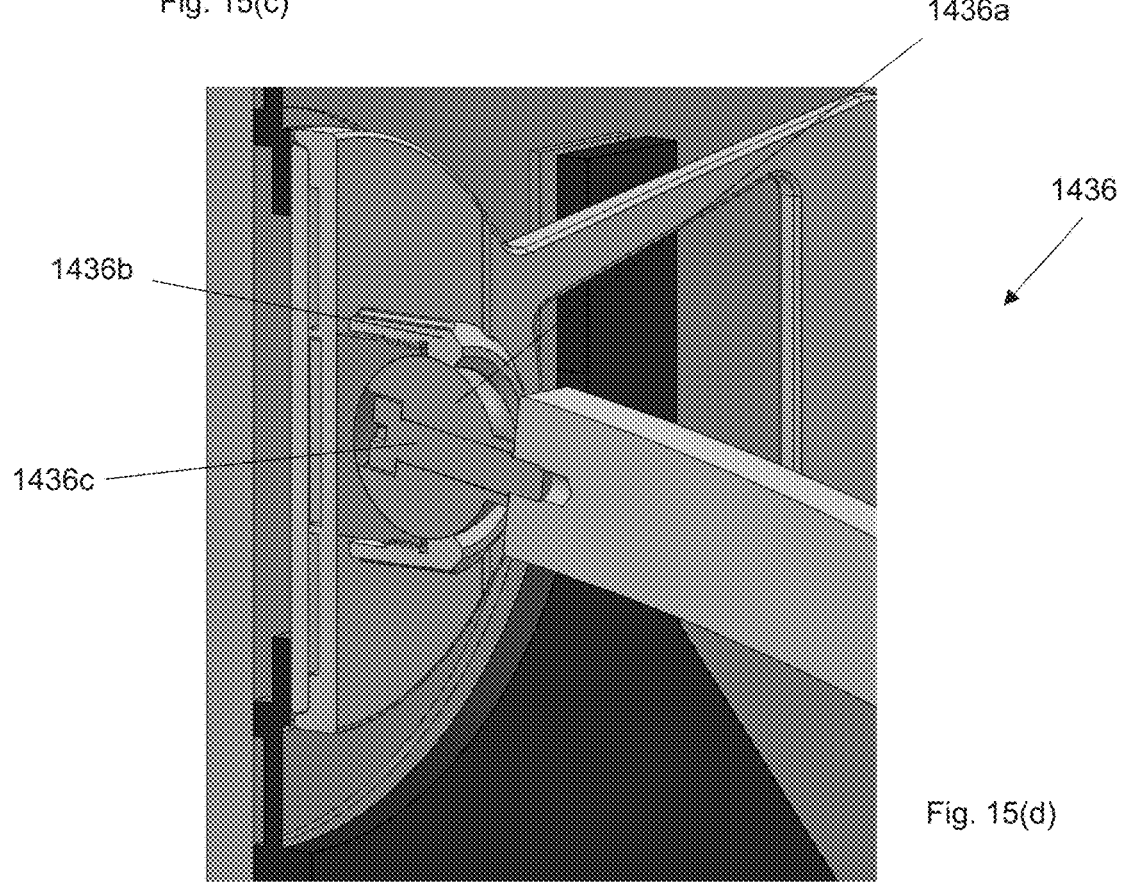
Figure 15G:
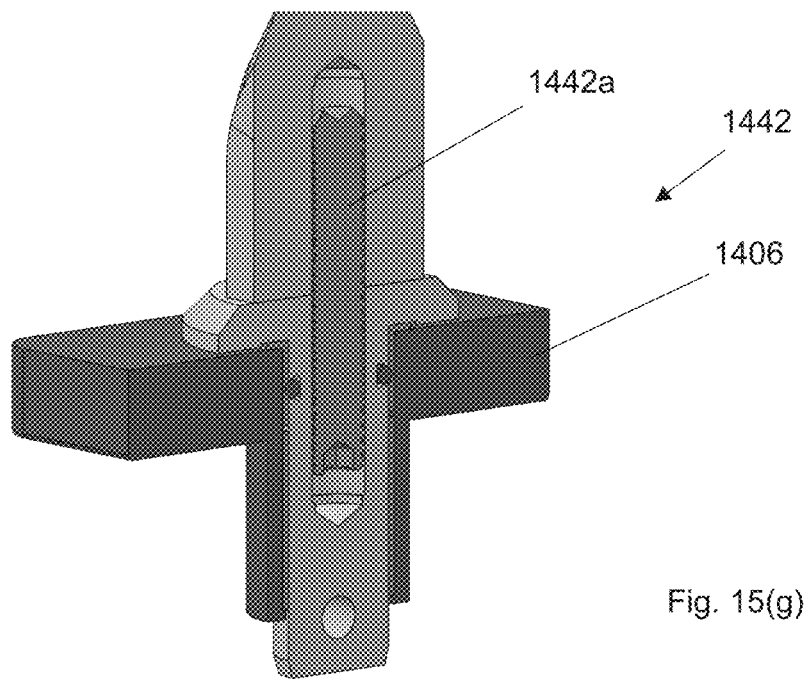

FIGS. 15(a)-(b) are a rear perspective and side view of a loading cart with an improved tablet/laptop mount consistent with embodiments hereof.

FIGS. 15(c)-(g) are perspective or cross-sectional views of joints and swivels on q improved mount consistent with embodiments hereof.

FIG. 15(h) illustrates the various degrees of freedom of the improved mount consistent with embodiments hereof.

Figure 15I:
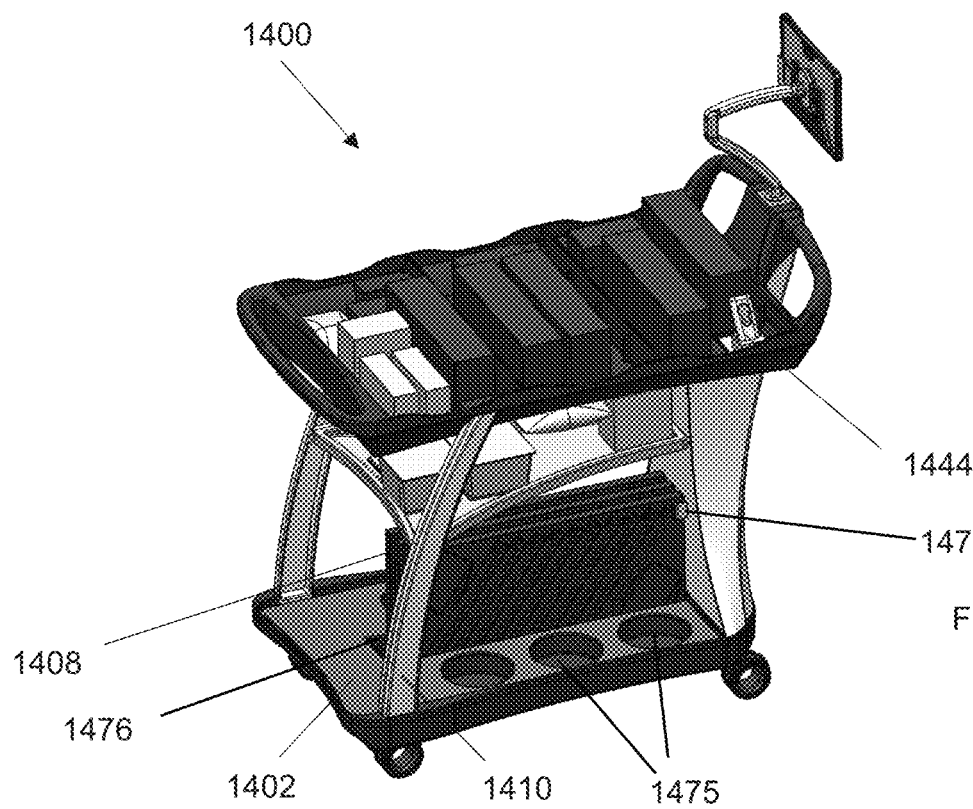
Figure 15J:
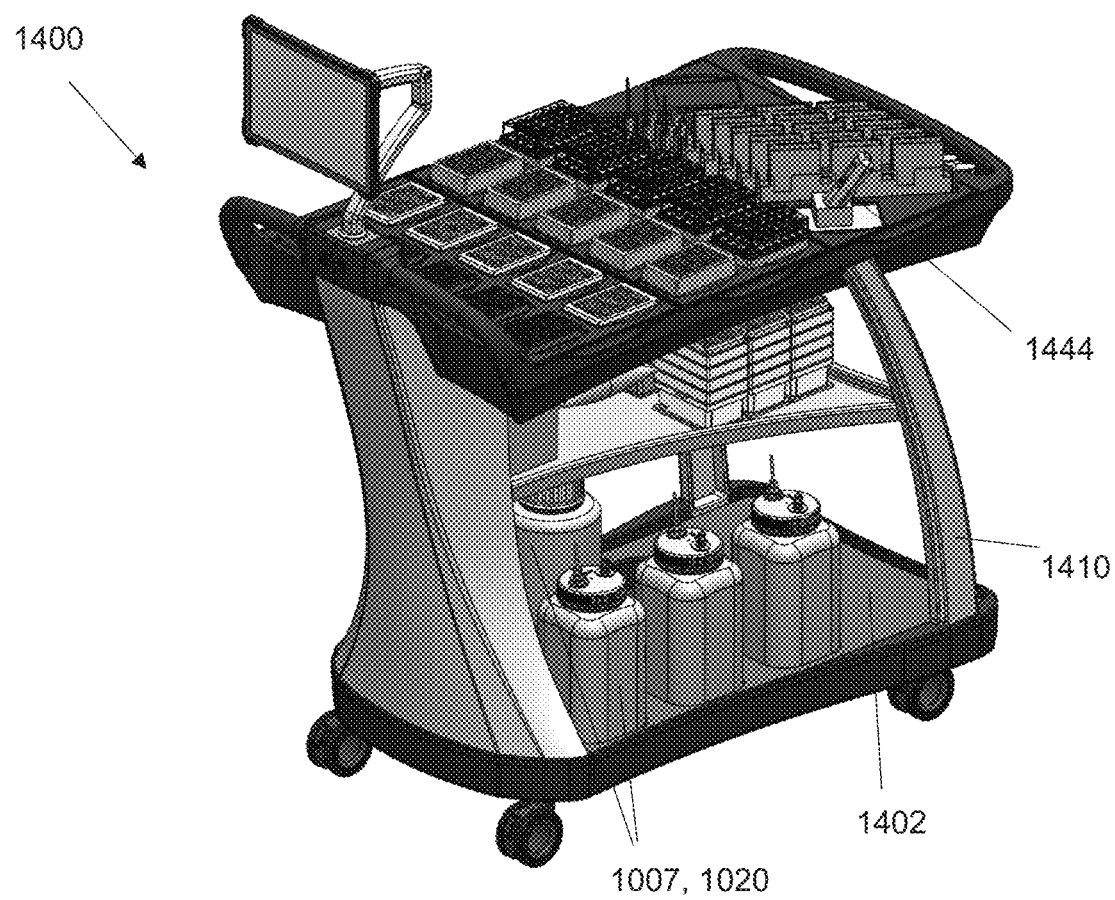

FIGS. 15(i)-(j) are perspective views of a loading cart consistent with embodiments hereof.

Figure 15K:
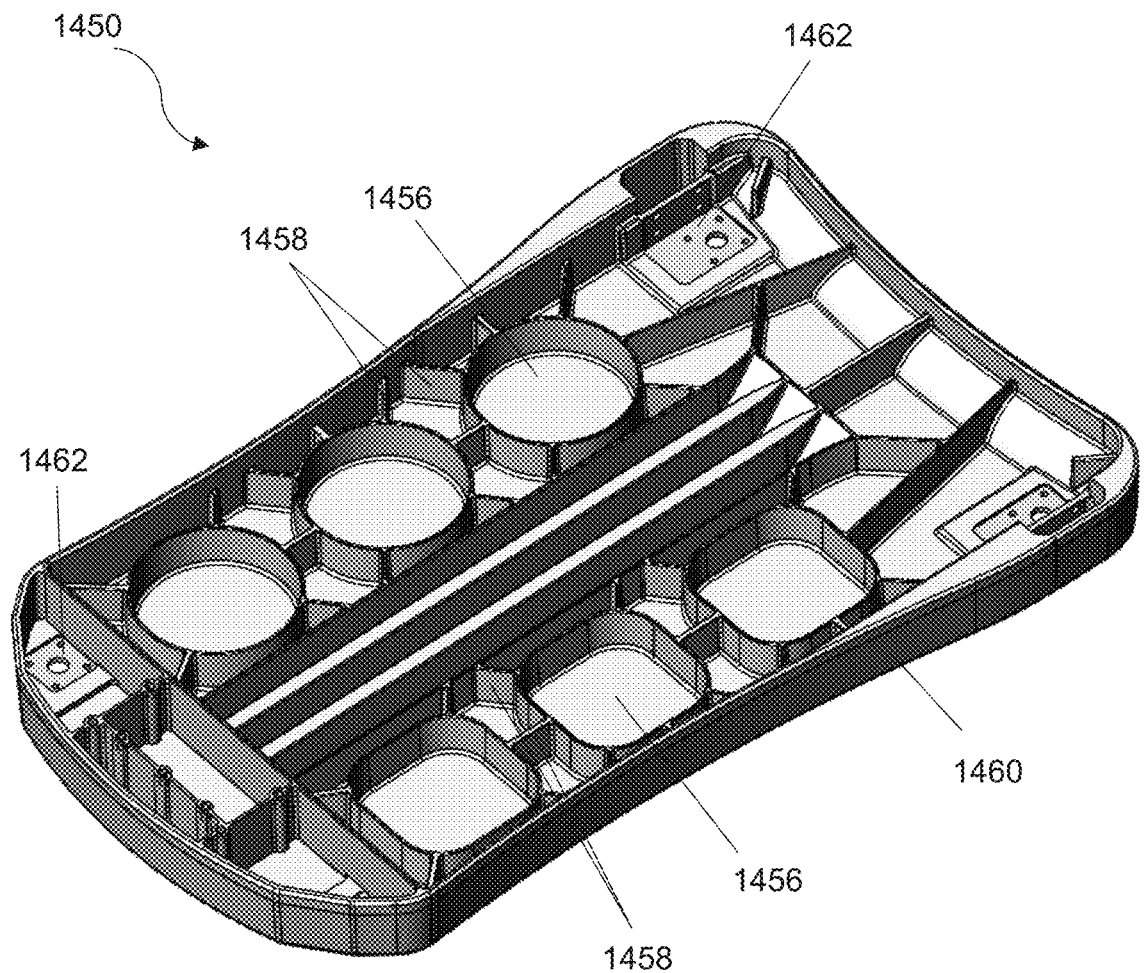

FIG. 15(k) shows internal structure of a bottom shelf of a loading cart consistent with embodiments hereof.

DETAILED DESCRIPTION OF VARIOUS EMBODIMENTS

Unless otherwise defined herein, scientific and technical terms used in connection with the present disclosure shall have the meanings that are commonly understood by those of ordinary skill in the art. Further, unless otherwise required by context, singular terms shall include pluralities and plural terms shall include the singular. The articles "a" and "an" are used herein to refer to one or to more than one (i.e., to at least one) of the grammatical object of the article. By way of example, "an element" means one element or more than one element.

As used herein, the term "sample" is intended to mean any biological fluid, cell, tissue, organ or combinations or portions thereof, which includes or potentially includes a biomarker of a disease of interest. For example, a sample may be a histologic section of a specimen obtained by biopsy, or cells that are placed in or adapted to tissue culture. A sample further may be a subcellular fraction or extract, or a crude or substantially pure nucleic acid molecule or protein preparation. In one embodiment, the samples that are analyzed in the assays of the present disclosure are blood, peripheral blood mononuclear cells (PBMC), isolated blood cells, serum and plasma. Other suitable samples include biopsy tissue, intestinal mucosa, saliva, cerebral spinal fluid, and urine. Any other biological fluids such as sputum, whole blood, etc. and liquids including solvent-based liquids, high viscosity liquids may be sampled.

The assay consumables and systems used in the present disclosure include a variety of devices and configurations. In an embodiment, the assay system described in the present disclosure includes an assay reader capable of conducting a biological assay using an assay consumable. The assay consumable comprises an identifier (referred to alternatively throughout the specification as an identifier, a consumable identifier, or an assay consumable identifier) and the assay system, assay reader or a component thereof comprises an identifier controller that interacts with the identifier. As described herein below, the identifier is associated with information concerning the assay consumable, which can include but is not limited to, how the consumable is manufactured and handled prior to use and how the consumable is used in an assay system (referred to collectively as "consumable data"). Therefore, the assay system is configured to use an assay consumable in the conduct of an assay, and the assay system includes an identifier controller adapted to (i) read consumable data from an assay consumable identifier associated with the assay consumable; (ii) access consumable data associated with an assay consumable that is indexed by an assay consumable identifier, wherein the consumable data are stored locally on the assay system or assay reader or remotely on a vendor computing system; and optionally, (iii) erase consumable data associated with the assay consumable identifier; and/or (iv) write consumable data indexed to the consumable identifier to the assay system and/or a remote data table.

In an embodiment, the invention provides an assay system configured to use an assay consumable in the conduct of an assay, wherein the assay consumable includes an assay consumable identifier as described herein and the assay system includes (a) a storage medium comprising consumable data repository; and (b) an identifier controller adapted to read information from the consumable identifier. In an embodiment, the system comprises a storage medium including a consumable data repository comprising local consumable data. The local consumable data stored to the assay system includes consumable identification and/or configuration information and one or more steps of an assay protocol that may be applied by the system in the conduct of an assay using a consumable. For example, the assay consumable identifier includes information that may be used to identify a specific consumable, e.g., lot specific information for a given lot of consumables and/or information that is specific to an individual consumable, and the corresponding local consumable data stored to the assay system includes information that is used to identify a consumable associated with the system, e.g., as a member of a given lot or as an individual consumable within a lot and it also includes information that is used by the system once the consumable is identified to carry out an assay protocol using that consumable. Still further, the consumable data (and/or local consumable data) can include one or more analytical tools that may be applied by the system to analyze and interpret data generated using that consumable, system and/or consumable technical support information or combinations thereof. Moreover, the system may also be configured to receive updates to the consumable data repository from a remote storage medium, wherein those updates include additional consumable data, including but not limited to additional consumable identification and/or configuration information, assay protocol information, and one or more of the following: (x) one or more analytical tools that may be applied by the system to analyze data and interpreted results generated during and/or after the conduct of an assay, (y) assay system maintenance information, (z) system-consumable promotional information, and (xx) system and/or consumable technical support information.

Embodiments described herein include an assay system loading cart and method for use. Possible errors can occur while loading an assay system, such as assay system (1000) described herein. These assay systems have robotic systems, pipettors, assay consumable storage units, readers, optionally heated shakers, plate washers, etc. These equipment present obstacles to placing the labware on the platform and may cause confusions. Additionally, different assay runs may require different placements and/or configurations of labware on the system's platform. The variety of different placements and configurations may also cause confusion. An inventive loading cart for loading an assay system and method of loading the assay systems utilizing the loading cart, described below, is provided. The methods described herein employ a tablet computer providing a user interface to instruct a technician in loading the required labware onto the cart and then into the assay system. Because the tablet computer provides an interactive user interface and display corresponding to the appropriate layouts on the loading cart an in the assay system, errors may be reduced.

Further embodiments described herein include improvements to door mounting systems of assay systems described herein. Door mounting systems consistent with embodiments herein provide a load distribution bracket configured to mount a door via multiple flanges. The load distribution bracket serves to balance a load or torque from the door across multiple flanges to prevent excessive torque being placed on a single flange.

Further embodiments described herein include improvements to waste disposal systems associated with assays systems described herein. In particular, improved waste disposal systems include one or more sensors configured to detect the presence or non-presence of waste storage unit and to detect whether or not a waste storage unit has remaining capacity. These features permit increased efficiency and convenience in the use of assays systems that involve multiple disposable consumables.

Further embodiments described herein provide features that improve the efficiency of robotic arms as discussed herein. Structural changes to robotic grippers, including chamfered edges, serve to increase the ability of the robotic arm to manipulate moveable items within the assay system. In particular, the chamfered edges of the robotic grippers permit the grippers to be used to nudge or push plates or other moveable items to be picked up into a more suitable position for gripping. The chamfers, or beveled edges, allow the positioning of the robotic grippers to be somewhat less precise when maneuvering into place to pick up a plate or other moveable item. As the grippers are moved into position, the angled chamfered edges serve to guide the plate or other item into place for gripping/lifting with the grippers.

In still further embodiments, a method of training a plate washer for use in washing multi-well plates is provided herein. The method includes the use of training plates and shims specifically sized and configured to precise location information. The features and sizes of the training plates and shims are configured to correspond with multi-well plates to be washed and the specific locations necessary for the aspiration tubes of the plate washer. When the aspiration tubes of a plate washer are aligned with respect to the shims and training plates, these locations may be stored by the assay system and used to later align the aspiration tubes appropriately with plates to be washed.

Figure 1A:
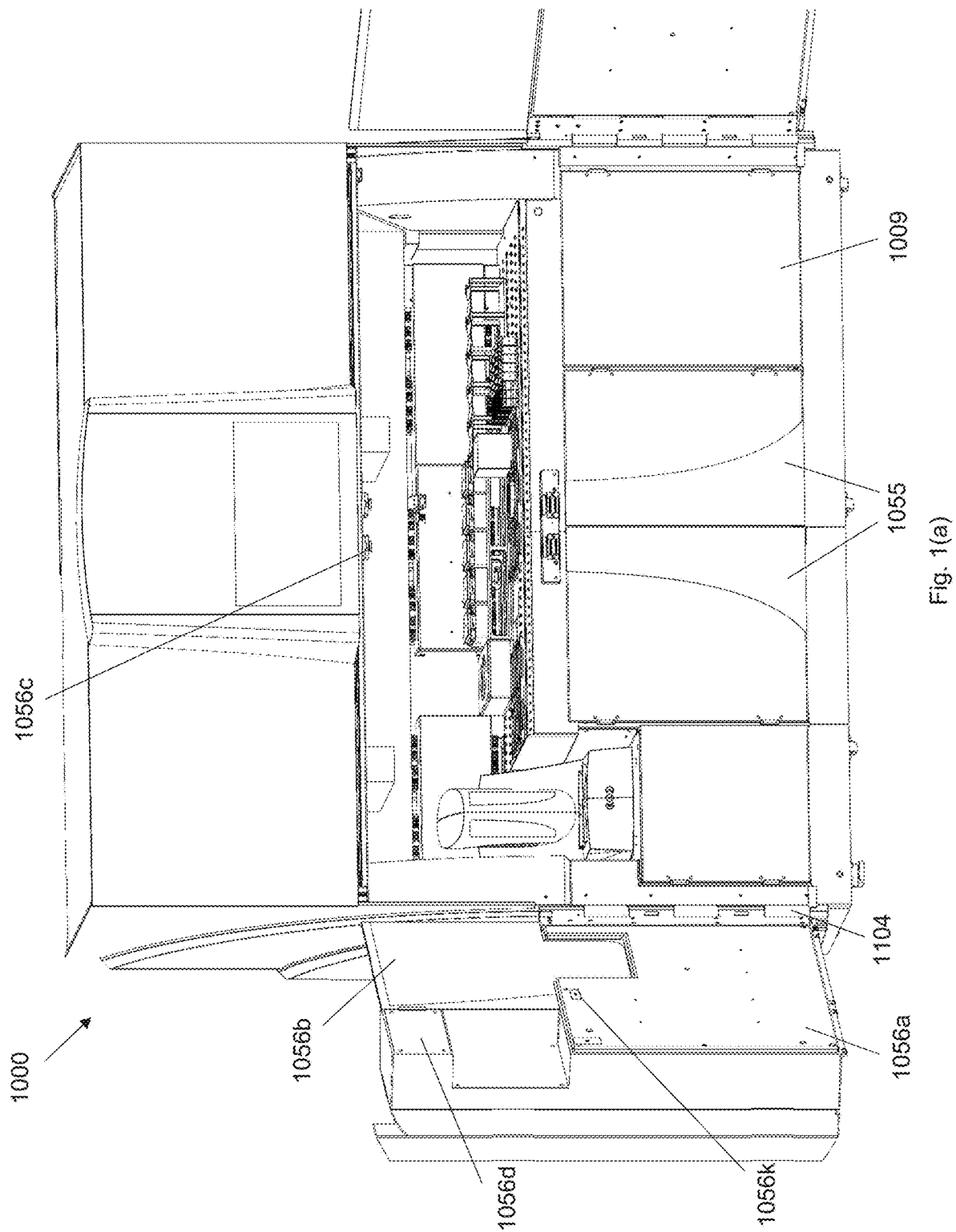
FIG. 1(e) shows a top surface of a table supporting the equipment of the assay system.
FIG. 1(f) illustrates an assay system, consistent with embodiments hereof.
Figure 1B:
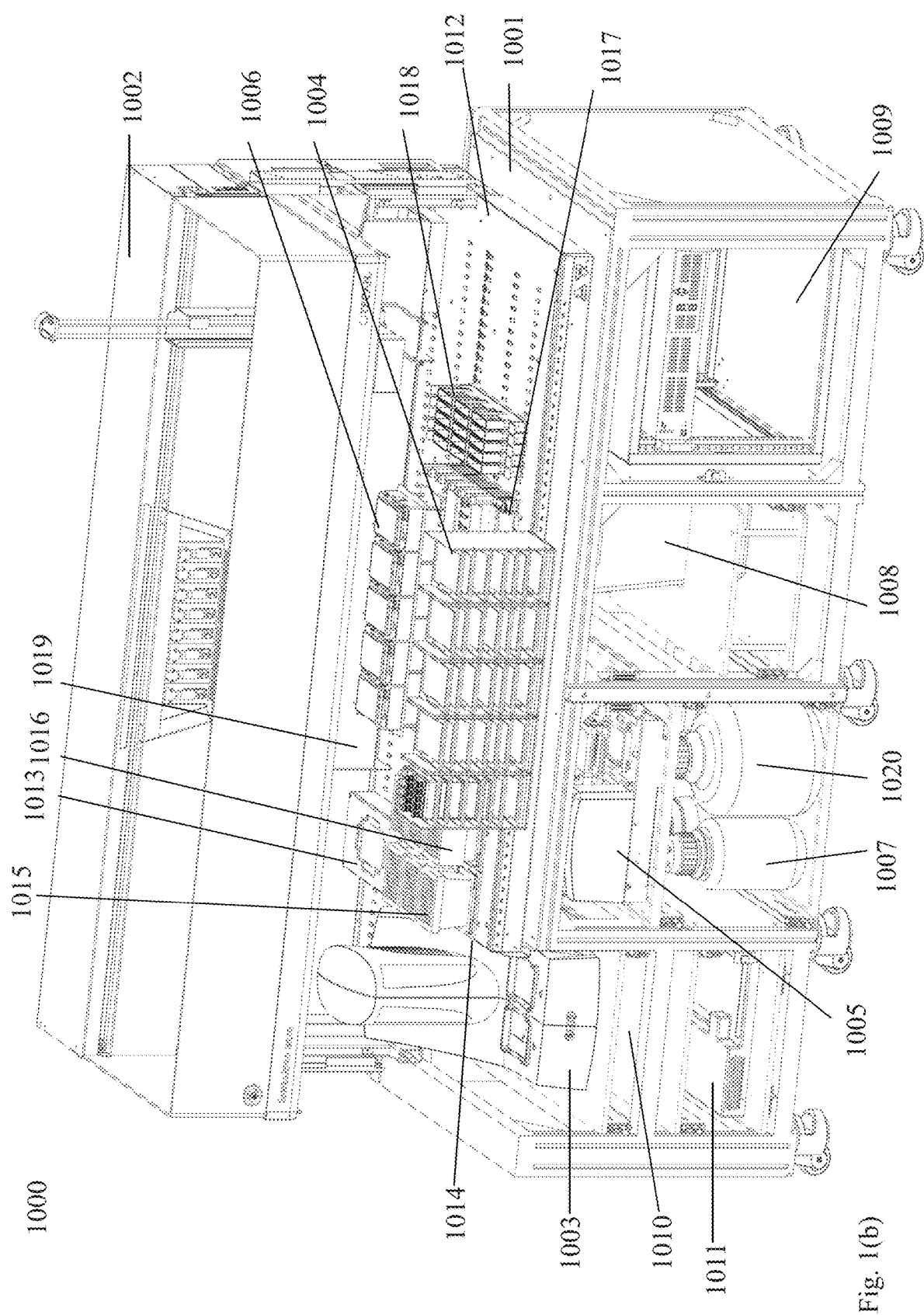
Figure 1C:
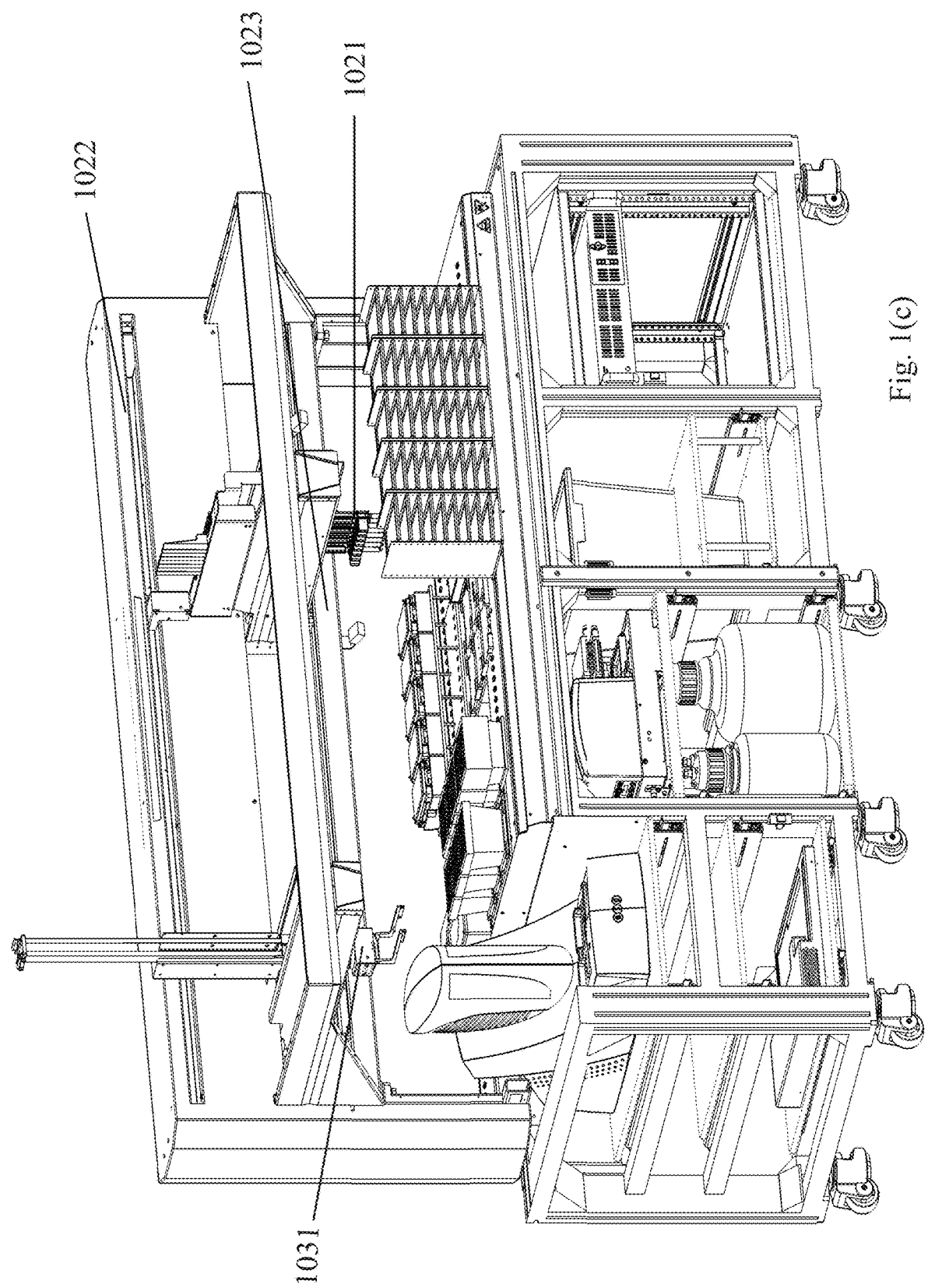

FIGS. 1(a)-(c) illustrate an exemplary assay system (1000) of the present disclosure. FIG. 1(a) shows assay system (1000) with its various doors labeled and with the outer doors opened illustrating the layout of the labwares with the front storage unit for the assay consumable omitted for clarity. As shown in FIGS. 1(b)-(c), the assay system (1000) includes a plurality of subsystems positioned on a table (1001), wherein each subsystem is operatively connected to a robotic subsystem (1002) configured to access and move one or more consumables, e.g., multi-well assay plates, troughs, tubes and/or vials, from one subsystem of the assay system to another. The robotic subsystem of the instrument (1002) includes one or more pipetting subsystems (1021), each including one or more pipetting tip head(s), e.g., a multi-channel pipetting tip head, which is used to dispense/draw fluids to/from wells of a multi-well plate. The pipetting subsystem is affixed to a gantry (1022) within the robotic system that enables the pipetting tip head to move throughout the assay system in the X, Y, and Z direction. Also supported on the gantry (1022) are gripper pads (1031), which grip and move assay consumables such as multi-well trays and reagent troughs, etc. The plurality of subsystems within the assay system includes an assay reader (1003); an assay consumable storage unit (1004); a plate washing subassembly (1005) located below table (1001); a plate shaking subassembly (1006) comprising one or more independent plate shaking apparatuses described below; a liquid reagent unit (1007); a solid waste storage unit (1008) and a liquid waste storage unit (1020); and an electronic enclosure (1009) located below table (1001) and configured to house a system control computer, keyboard, display, wireless router, and a power supply (not shown). Electronic components designated as elements (1010, 1011), which is shown in FIG. 1(b) to be under reader (1003) may also be positioned in electronic enclosure (1009). The assay system can also include a platform (1012) positioned on a table (1001) and configured to enable pipetting of liquids to and/or from one or more wells of a multi-well assay plate positioned on the preparation platform. The robotic subsystem (1002) is configured to move one or more plates to and/or from the platform, the plate washing subassembly, the shaking subassembly, the assay reader, and the consumable storage unit. The platform comprises a consumable identifier controller (e.g., a barcode reader (1013)) configured to read assay consumable identifiers, e.g., positioned on a multi-well plate, e.g., positioned on the bottom of a plate or tubes placed in a reagent rack or tube holder; a pipetting tip storage compartment (1014) configured to house pipetting tip boxes of varying size tips, as needed (e.g., 1015 and 1016, 1000 µl and 350 µl tips, respectively); one or more sample/reagent tube carriers (1017) and one or more reagent troughs (1018) positioned in one or more corresponding carriers. Pipetting tips of any available sizes could be used, for example tips having 10 µl, 20 µl, 200 µl or 1000 µl capacity may be utilized. One or more troughs (1018) or tubes (1017) or microplates may be empty to be used during an assay run as a mixing container to mix two or more reagents or diluents. The microplate may be a standard SBS microplate, including a SBS six-well microplate. A standard lid or a lid described below may be used to minimize evaporation of the reagents. The microplate may be pre-filled and/or pre-packaged with one or more reagents and/or diluents.

As best shown in FIG. 1(b), as well as FIGS. 7(b)(1-3) below, a trough carrier may carry one or more troughs 1018 generally in a side-to-side relationship along a single row. A trough carrier may extend to include two or more rows of side-by-side troughs. This larger arrangement of trough carriers allows for the combination of various reagent(s) as a kit to be identified by a consumable identifier, such as a barcode, common in clinical applications.

Optionally, the system may include a second consumable identifier controller 1023 positioned above the platform and configured to read an identifier on the side of a plate(s) and/or reagent rack; and a third consumable identifier controller (not shown) configured to read an identifier on a consumable box located outside of the system housing (not shown). In one embodiment, the third consumable identifier controller is remote from the assay system, affixed to the outer housing of the assay system, or positioned on a front or side panel of the housing of the assay system and configured to enable the user to contact a consumable identifier, e.g., on a plate or kit, with the third consumable identifier controller before the consumable is used in the system. The assay system may further include one or more environmental control units, e.g., thermoelectric cooling units or TECs (1019), disposed within the assay system. Although TECs are illustrated with assay system (1000), any environmental control systems, heat exchangers or cooling devices may be used.

Assay system 1000 is configured to conduct all sample processing steps on-board as well as all assay processing steps required in the conduct of an assay. In addition, the user-interface of the assay system of the inventive instrument is configured to display to the user stepwise instructions for appropriate sample/reagent preparation steps that should be performed manually before the system conducts the assay. The sample/reagent preparation steps and individual assay steps performed by one or more subsystems of the assay system may differ from one assay protocol to another. Detailed examples of various assays performed by an assay system of FIG. 10 and its subparts are described herein below, including but not limited to, the conduct of a cytokine, V-PLEX, U-PLEX, S-PLEX, pharmacokinetic (PK), immunogenicity (IG) assays, and custom sandwich immunoassays (available from Meso Scale Discovery, Rockville, Maryland), as well as optimization of PK, IG and custom sandwich immunoassays.

Figure 1D:
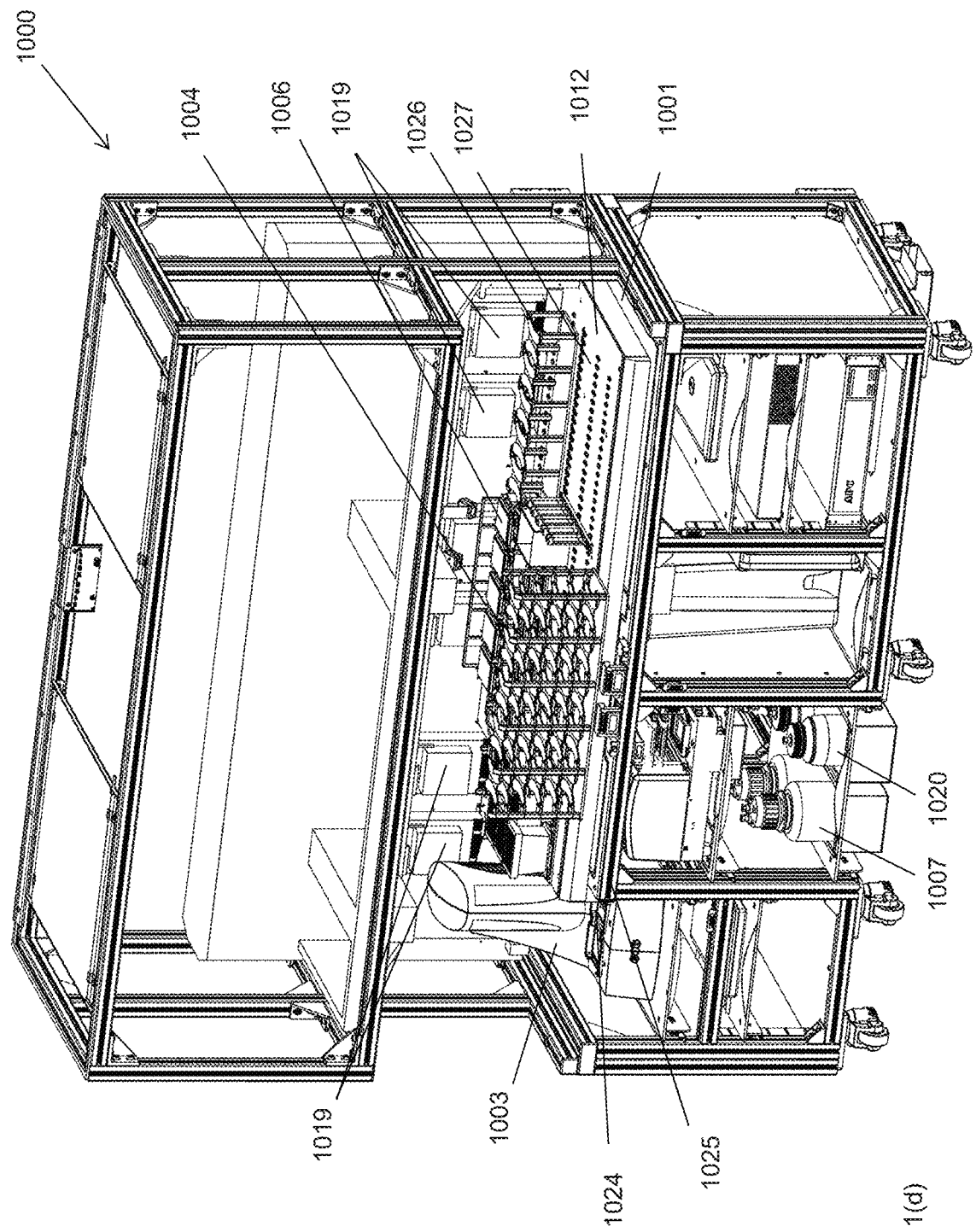
Figure 1E:
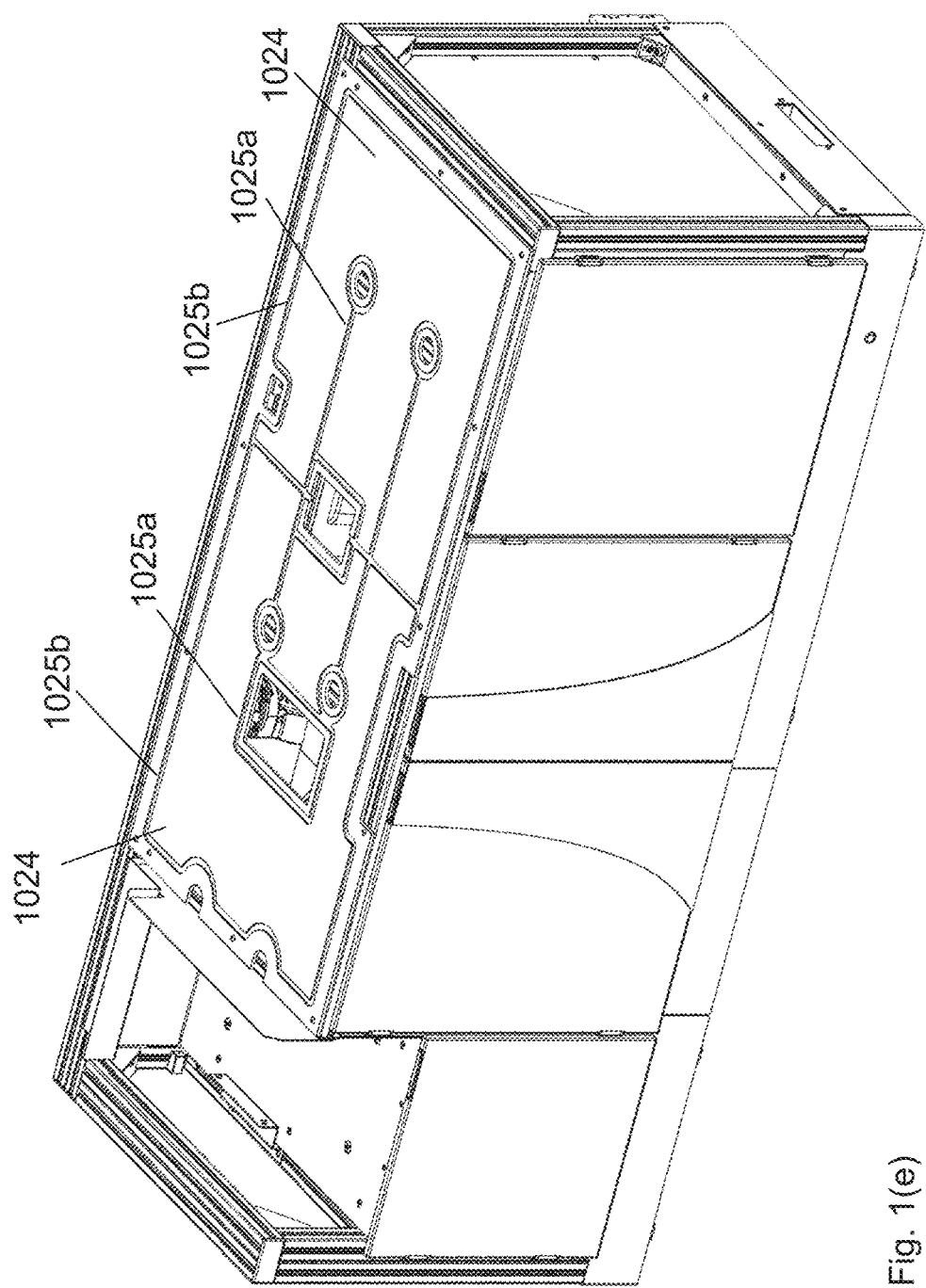
Figure 1F:
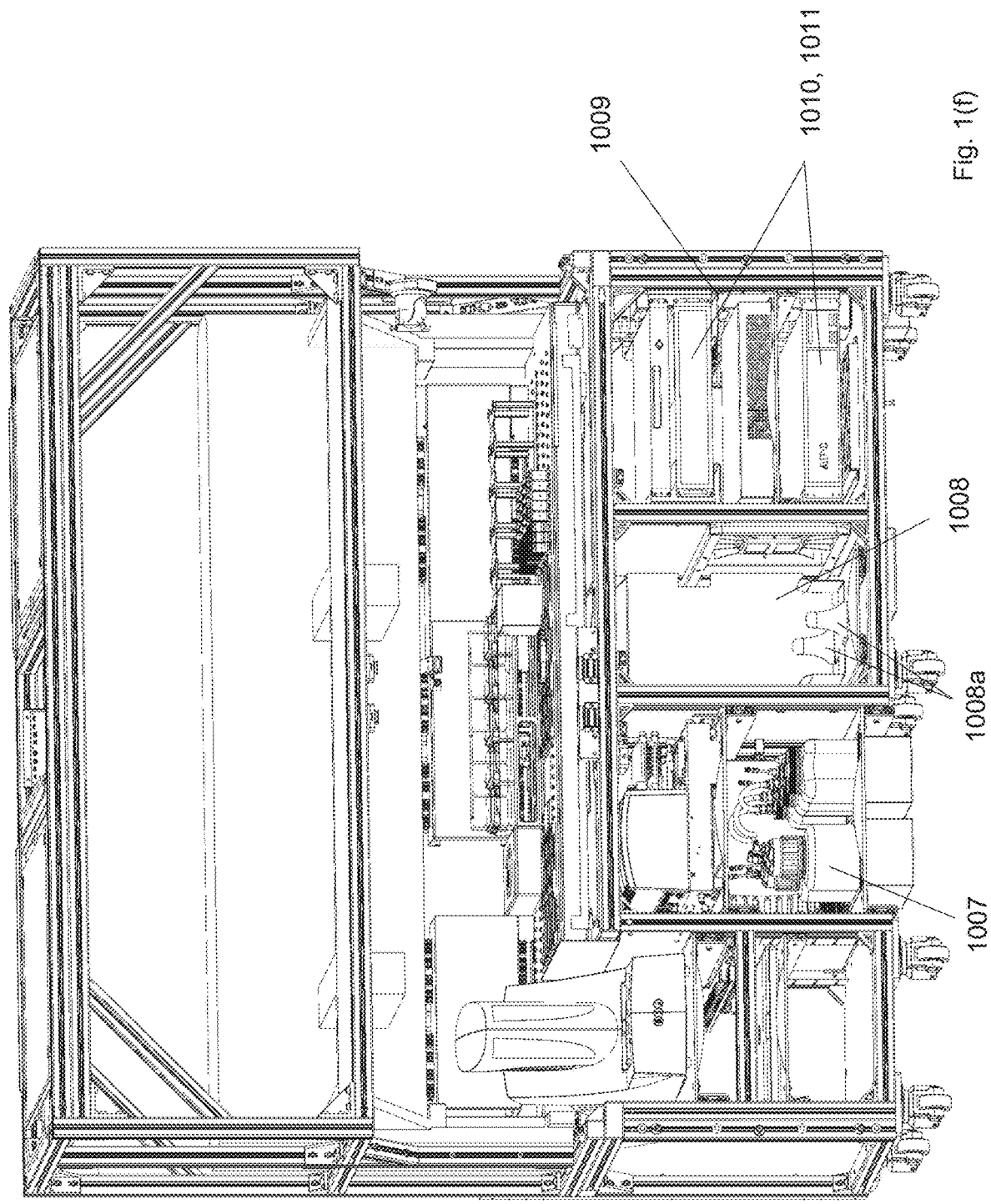

Another example of the inventive assay system (1000) is illustrated in FIGS. 1(d) and 1(e). Some of the components shown in FIGS. 1(b)-(c) are omitted for clarity. The assay system 1000 may contain one or more catching trays (1024) positioned below platform (1012) and above table (1001) to catch and hold liquid spilled from the various reagents, diluents, buffers during the operations of assay system (1000). Catching trays (1024) may have flow channels (1025) defined thereon to direct the flow of spilled liquid from trays (1024) toward waste storage unit (1008). The flow channels may include a perimeter channel (1025b) to lead liquid away from the edges of trays (1024) and internal flow channels (1025*a*) leading to waste assembly (1008). Optionally, flow channels (1025) may have absorbent materials disposed therein to absorb spilled liquids and/or wick the liquids towards waste assembly (1020), as best illustrated in FIG. 1(*e*). Alternatively, flow channels (1025) may be coated with a surfactant to reduce flow resistance.

Additionally, platform (1012) may contain additional tip carriers (1026), which are designed to hold extra disposable tips or to host additional components such as individual shakers (1006) thereby illustrating the expandable nature of assay system (1000). The raised podiums may also allow for unimpeded airflow across platform (1012) to improve heat removal resulting in good temperature uniformity over platform (1012). A plurality of holes (1027) is provided on platform (1012) to receive additional labware or other functional components.

Another iteration of assay system (1000) is illustrated in FIG. 1(*f*) with a significant number of subsystems omitted for clarity. Electronic components (1010, 1011), which include computers and/or processors, may be housed in electronic enclosure (1009). Solid waste storage unit (1008) may contain a plurality of upstanding prongs (1008*a*) which are sized and dimensioned to receive a solid waste container (1008*b*), as shown in FIG. 1(*g*). Solid waste storage unit (1008) also may contain a slot to retain a lid (1008*c*) to cover solid waste container (1008*b*).

Solid waste storage (1008) may also include a sensor (1008*d*) to detect the presence of the solid waste container, as shown in FIG. 1(*h*). Sensor (1008*d*) may be a photoelectric sensor including a transmitter that emits a visible or infrared beam to a receiver. If the beam is interrupted, then the receiver would not receive the beam indicating that an object, e.g., solid waste container (1008*b*) is present in the solid waste storage unit 1008. The transmitter and receiver may be stored in the same housing and a reflecting target may be attached on the opposite wall of solid waste storage unit (1008). The presence of the solid waste container 1008*b* would prevent the beam from reflecting back to the receiver at the proper angle or by diffusing the beam. Alternatively, the transmitter may be located on one side wall and the receiver may be located on the opposite side wall. The solid waste container 1008*b* would block or prevent the beam from reaching the receiver. A lack of receiving signal at the receiver indicates that solid waste container (1008*b*) is present. Photoelectric sensors are commonly used as a safety device on garage doors to stop the downward movement of the garage doors when an object breaks the beam from the transmitter located on one side of the garage door to the receiver located on the opposite side.

Solid waste storage unit (1008) may also comprise another sensor (1008*e*) to detect the level of solid waste inside solid waste container (1008*b*), also as shown in FIG. 1(*h*). Sensor (1008*e*) may be mounted on a top surface or a ceiling with a field of view (FOV) pointed downward into the waste container. Sensor (1008*e*) may be a proximity sensor or a similar sensor that can detect nearby objects without physical contact. A proximity sensor emits an electromagnetic field or a beam of electromagnetic radiation such as infrared and analyzes the changes in the return field or signal. Nonlimiting examples of proximity sensors include but are not limited to optical retro-reflective sensor, capacitive proximity sensor and inductive proximity sensor. A waste level in the waste container is monitored by a processor such as one of the electronic components (1010, 1011), e.g., a laptop or tablet computer, and an audio and/or visual indicator is activated when the waste level reaches a pre-determined level. Proximity sensors are commonly embedded in rear bumpers of automobiles to indicate a distance to an object behind the automobiles.

FIG. 1(*i*) illustrates a liquid reagent unit or reagent bottle (1007). Reagent bottle (1007) generally has a tube or straw (1007*a*) extending from the top of the lid down toward the bottom of the bottle. Liquid reagent is pulled from reagent bottle (1007) from the bottom of tube (1007*a*) upward and to reagent troughs (1018) or reagent tubes (1017). A sensor (1007*b*) is provided to sense the liquid reagent level inside reagent bottle (1007). The liquid level sensor 1007*b* may be any known liquid level sensor. In one non-limiting exemplary liquid sensor, tube (1007*a*) is a variable resistor, whose resistance varies depending on the location of sensor/float (1007*b*). An electrical current flows down the tube until it reaches the float (1007*b*) and returns to the source for example via a separate insulated wire. The location of the sensor/float (1007*b*) determines the resistance of the tube. Hence, when reagent bottle (1007) is full, the resistance of tube (1007*a*) would be small and when the reagent bottle is near empty, the resistance of tube (1007*a*) would be higher. The electronic equipment 1010, 1011, which can include a processor, can calibrate the resistance values and ascertain the liquid level inside reagent bottle (1007).

Other suitable liquid level sensors utilizing a float include but are not limited to a network of resistors or reed switches located at predetermined discrete levels, such as ¼, ½, ¾ or full, magnetic level gauges, magnetostrictive level transmitters. Suitable liquid level sensors not utilizing a float include but are not limited to hydrostatic devices, such as displacement level gauges, bubbler-type level sensors and differential pressure (DP) sensors, load cells or strain gauge devices, capacitance transmitters, ultrasonic level transmitters, laser level transmitters and radar level transmitters. Liquid level sensors may be deployed in any liquid containers, e.g., liquid reagent containers, liquid waste containers and washing liquid containers, etc.

In an embodiment, the assay reader is the apparatus described and claimed in U.S. application Ser. No. 14/147, 216, published as U.S. patent application publication No. US 2014/0191109, the disclosure of which is incorporated herein by reference. In another embodiment, other suitable assay readers are described in U.S. patent application publication No. US 2012/0195800 and in international patent application publication No. WO 2009/126303, which are incorporated herein by reference in their entireties. In a further specific embodiment, the assay reader is a MESO QuickPlex SQ 120, available from Meso Scale Discovery, Rockville, Maryland. Alternatively, the assay reader is a MESO SECTOR 5600 or a MESO PR-2 Model 1800, available from Meso Scale Discovery, Rockville, Maryland Additionally, other readers or instruments, such as spectrophotometers, fluorescence readers, chemiluminescence readers, multi-mode readers, photodiode-based readout systems, digital cameras with software algorithm to process signals, etc., can also be utilized. The present disclosure is not limited to any particular reader.

FIG. 1(*j*) illustrates an assay consumable storage unit 1004. The assay consumable storage unit (1004) may be configured to store any type of consumable used in the conduct of an assay in the assay reader. In an embodiment, the storage unit is a multi-well plate storage unit configured to store a plurality of multi-well assay plates. In an embodiment, the plate storage assembly is configured as a shelving subassembly comprising a plurality of shelving units each sized to accommodate a multi-well assay plate. The shelving subassembly comprises a housing including a housing top, housing back, housing left and right housing walls and a plurality of storage units disposed within the housing, wherein each storage unit includes a plate introduction aperture. The shelving subassembly can comprise an M×N rectilinear array of storage units, wherein M and N are integers, e.g., a 2×1, 2×2, 3×3, 4×4, 5×6 or 6×5 array. In one embodiment, the subassembly comprises a 2×1 array of storage units. In a specific embodiment the storage subassembly comprises a 2×1 array of twenty storage units.

As shown in FIG. 1(j), the assay consumable storage unit (1004) may include both ornamental as well as functional aspects. For example, the assay consumable storage unit may be a single integral unit with a number of parallel shelfing surfaces (1072) connected by a number of vertical supports (1074), as shown in FIG. 1(j). Each storage unit on the top row includes raised corners (1076), which are sized and dimensioned to retain the lids of reagent or kitted racks when a technician or robotic system (1002) places an assay plate or rack thereon. As shown in FIG. 1(d), the bottom horizontal shelf of assay consumable storage unit (1004) may be securely bolted by itself in a cantilever manner to platform (1012). The upper assembly of the assay consumable storage unit (1004) may secured to the bottom horizontal shelf using a plurality, for example two or more, alignment pins are used to maintain consistent positioning of the upper assembly. The alignment pins may be located off of the X and/or Y center lines to minimize the incorrect alignment of the bottom horizontal shelf and the upper assembly. A number of thumb screws, for example three or more, are used to secure the assay consumable storage unit together. Additionally, a number of Z-direction adjusting screws, for example at least three, are provided to level the assay consumable storage unit (1004), if necessary.

An advantage of having the bottom horizontal shelf installed separately from the upper assembly is the ease of removing the assay consumable storage unit (1004) for service and access to components behind the assay consumable storage unit (1004). The alignment pins and the thumb screws further allow for the ease and accurate reattachment of the upper assembly to the bottom horizontal shelf thereafter.

The pipetting subassembly (1021) is supported on gantry (1022) and powered by one or more motors to provide independent X, Y, and Z motions to a probe, such as one or more pipette tips, so as to allow it to access troughs, tubes and/or plates (as required). The pipetting subassembly (1021) may also include the appropriate pumps and valves for controlling the pipettors and/or probes, and optionally, a pipetting tip washing subassembly (not shown). A pump is used to drive fluids through the pipetting subassembly. Each pipette tip may be independently controllable or independently dispensable by the controlling software, controller and motor(s). One or more pipette tips may dispense or take up liquids independently of each other pipette tip. Additionally, the spacing between adjacent pipette tips may be varied by the controlling software and motors. These degrees of freedom allow the assay machine (1000) to perform a wide range of assays, calibrations, self-diagnostics, etc. One skilled in the art will be able to select appropriate pumps for use in the apparatus including, but not limited to diaphragm pumps, peristaltic pumps, and syringe (or piston) pumps. The pump also includes a multi-port valve to allow the pump to push and pull fluids from different fluidic lines. Alternatively, multiple pumps may be used to independently control fluidics in different fluidic lines. In one specific embodiment, the pipetting subassembly comprises air displacement pipettors. Optionally, the pipetting probes may include fluid sensing capability, e.g., using ultrasonic capacitive or pressure sensors to detect when the probes contact fluid in a tube or well as a means of minimizing the external wetted surface of the probe and detection of the presence of liquid in the container.

In an embodiment, the pipetting probe includes a multi-channel pipetting probe enabling fluid transfer to a plurality of wells of a multi-well plate either through all the pipette tips or through a selected number of pipette tips less than all the available pipette tips. For example, the pipetting probe includes an 8-channel pipetting head capable of simultaneous and independent fluid transfer to one or more channels into a multi-well plate or one or more tubes or troughs. Alternatively, the pipetting probe can include a 12-, 96- or 384-channel pipetting head. In a specific embodiment, the pipetting subassembly is supplied by Tecan Group LTD, Switzerland.

In an exemplary example, a capacitance sensor is designed between the pipette tips or pipettor and the pipetting deck to detect contact of the disposable tip with the surface of the liquid contained within a tube, plate or rack found on a pipetting deck. The pipetting deck may be conductive and the pipette tips/pipettor is also conductive so that a voltage potential may be applied therebetween.

A common capacitor is a parallel-plate capacitor, which consists of two conductive plates electrically insulated from each other by a dielectric material. In simple, parallel-plate capacitors, the capacitance is inversely proportional to the distance between the two plates. Quantitatively, the capacitance (C) in farads of two overlapping plates is expressed as:

$C = \kappa \epsilon_o (A/d)$, where $\kappa_i$ is the dielectric constant of the substance between the two plates (nondimensional) $\epsilon_o$ is the electric constant, which is about $8.854 \times 10^{-12}$ F·m$^{-1}$, A is the overlapping area between the two plates in meters, and d is the distance between the two plates in meters.

For capacitive liquid level sensing, the capacitance of the system takes into account multiple dielectrics that are found in series between the pipette tips and the pipetting deck. Quantitatively, the total capacitance (C) in farads of two overlapping plates that have multiple dielectrics between them (e.g., air, liquid, plastic/glass container) is expressed as: $1/C = \Sigma 1 C_i$, where the capacitance of each dielectric is accounted for individually as $C = \kappa_i \epsilon_o (A/d_i)$, and where is the dielectric constant of a given substance between the two plates (nondimensional) $\epsilon_o$ is the electric constant, which is about $8.854 \times 10^{-12}$ F·m$^{-1}$, A is the overlapping area between the two plates in meters, and $d_i$ is thickness of a given substance between the two plates in meters.

In a system with multiple dielectrics, the capacitance change that occurs when a single dielectric's thickness (e.g., the air between the pipette tip and the liquid in a plate or rack) approaches zero yields a significant change in capacitance, allowing for the system to recognize that the pipette tip is touching the liquid.

The present inventors have determined that the sensitivity of a particular capacitive sensing system used to detect liquid in conventional tubes and vials may be significantly increased by the use of a conductive plate or rack, made from a plastic with a conductive additive, such as carbon, metal, or metal ions. Using the conductive rack, the liquid levels held in conventional tubes and vials contained in said rack may be determined using the capacitive sensor. For example, 500 µl tubes should be filled by at least 50%, for example at least 40% or 30%, at least 10%. 2 ml tubes should be filled by at least 20%, at least 15% or 10% or at least 5%. 4 mL vials with flat bottoms should be filled by at least 25% or at least 12.5%. 4 mL vials with concave bottoms should be filled by at least 10% or at least 5%.

In an embodiment, the pipetting probe uses disposable pipetting tips that are stored in a pipetting tip storage compartment (1014). Disposable pipetting tips may be stored in one or more standard disposable tip box (e.g., 1015 and 1016, available from Tecan Group LTD, Switzerland) and used tips may be stored in a removable waste container (1008) for used pipetting tips. The dimensions of the tips vary according to the dimensions of the pipetting probe, the volume of the sample/reagents dispensed and/or the dimensions of the plates within which the tip is placed. In one embodiment, the tip volume ranges from approximately 1000 µL to 25 µL. In another embodiment, the tip volume ranges from about 350 µL to 5 µL.

As stated above, the pipetting subassembly (1021) provides independent X, Y, and Z motions for a probe or pipette tips so as to allow them to access troughs, tubes, vials, racks and/or plates. A training plate may be configured to initialize the assay system (1000) before first use or periodically thereafter, so that the X, Y and Z positions of the pipetting subassembly (1021) and its pipette tips, as well as the X, Y, Z, G (grip distance) and R (rotational) the robotic system (1002) and its gripper pads (1031) may be pin point with higher accuracy and repeatability.

As shown in FIG. 2(*a*), a training or teaching plate (1035) is positioned on platform (1012). Training plate (1035) may have similar dimensions and size as an industry standard assay plate (ANSI SLAS 1-2004), and may be configured to fit into a slot (1036), also known as a plate carrier (1036), that is designed to receive the assay plate. Training plate (1035) may be a solid rectangular prism or may be hollow with a rigid perimeter and internal web members configured to provide stiffness and rigidity. Internal web members including curved members (1037) and substantially linear elements (1038) are provided for rigidity and stability. As shown, the curved members (1037) have opposite concavity.

One or more reference points or pads (1040) are defined on a top surface of training plate (1035). During the initialization procedure for assay system (1000), a probe, such as a pipette tip (1042) connected to the robotic system (1002) or to the pipette subsystem or pipettor (1021), is brought into close proximity with a reference pad (1040), or for example within 0.1 mm of reference pad (1040) to determine a vertical or Z-reference point. In an embodiment, probe (1042) does not contact reference pad (1040) to ensure that the probe is not deformed or bent by the contact. The capacitance sensor for the pipette subsystem (1021) described above may be used in this initialization process with an electrically conductive training plate (1035) to determine the Z-reference point and the Z-maximum values for the labware without having probe (1042) touching reference pad (1040).

Alternatively, the initialization process may be completed with a substrate thinner than about 0.1 mm being moved back-and-forth between probe (1042) and reference pads (1040). When the moving substrate is caught between the probe and the reference pad, the Z-reference point is determined. In a further alternative, a proximity sensor such as those based on a magnetic field that varies a function of a distance between probe (1042) and reference pad (1040) may be used. An exemplary magnetic proximity sensor includes the Hall-effect sensor and other proximity sensors discussed above.

In yet another alternative, an optical distance sensor is used. Suitable optical distance sensors are commercially available from Keyence America, SensoPart, Omega Engineering, among others. The optical sensor is attached to or replaces probe (1042), and is then used to measure the distance to reference pad(s) (1040).

This Z-reference point is selected to be in the middle of a corner well on an X-Y plane in an industry standard ANSI SLAS 4-2004 96-well microplate (8 rows×12 columns) and in the vertical Z-direction at or near a top surface of an industry standard ANSI SLAS 2-2004 plate. The dimensions and tolerances of an industry standard ANSI SLAS 1-2004 plate are discussed below. More specifically, the Z-reference point is used to calculate the Z-maximum values or the highest height in the vertical direction for all the labware. Advantageously, having accurate Z-maximum values for the labware improves the reliability of the pipetting and placement and movement of the labware.

The training plate (1035) may be reversible, i.e., the bottom surface has the same features as the top side. In yet another variation, the X-reference and Y-reference points are also determined, in addition to the Z-reference point(s). In this variation, probe (1042) is brought into contact with at least two reference pads (1040) and a Cartesian coordinate (x,y,z) is recorded for each reference pad.

Training plate (1035) may also be used to reference the positions of the gripper pads (1031) or to align the gripper pads to the assay plate(s) on platform (1012). Accurate and consistent alignment may be employed to achieve the proper get (retrieve) and put (insert) coordinates for the assay plates or any other plates, racks, troughs, tubes, etc. Gripping areas (1044) are provided on the long sides and the short sides of training plate (1035) as best shown in FIG. 2(*b*). During initialization or alignment, with training plate (1035) positioned on platform (1012) robotic system (1002) positions its gripper pads (1031) on either the short sides or the long sides of training plate (1035). Gripper pads (1031) may be positioned within the gripping areas (1044), which may be defined by a number of raised lines to pick up and move training plate (1035). As the gripper pads (1031) do so, relative distance between the pads (grip distance), the location of the training plate in X, Y space, the orientation (in degrees) of the gripper pads (rotational coordinate), as well as the Z-elevation are also known and recorded by the processor that controls the robotic system (1002). This alignment information is stored and is used to direct the robotic gripper pads (1031) to get or put the labware in the proper places.

As shown in FIG. 2(*b*), the outer perimeter of a first surface (1043) containing the reference pads (1040) of training plate (1035) is smaller than the outer perimeter of the opposite surface (1045), which has a bead line (1041) surrounding the perimeter to provide the larger outer perimeter. When determining the Z-reference points, an opposite surface (1045) with the larger perimeter and tighter tolerance is inserted into a nest on platform (1012). This allows for a snug fit and more accurate and repeatable positioning of reference pads (1040). When determining the positions of gripper pads (1031) of robot arm (1002), first surface (1043) with the smaller perimeter may be inserted into the nest on platform (1012). This allows gripper pads (1031) to lift training plate (1035) without having to overcome any frictional force caused by the contacts between the training plate and the nest.

The training plates (1035) may be individually machined, for example by a computer numerical control (CNC) milling machine, to achieve tight tolerances. The training plates may be machined to a flatness of within 5 thousandth of one inch (0.005 inch) or 0.127 mm. In the event that there are dimensional differences between different manufactured training plates, their differences or variations are ascertained, e.g., by measuring the dimensions of the training plates on a calibrated Coordinate Measuring Machine (CMM) and using the measured dimensions to adjust the training values of the platform/assay machine (1000). The tolerances may be stored in any memory device and used to reconcile possible differences in measurements when different training plates are used to initialize and re-calibrate one assay machine.

The training plates (1035) may be made from cast aluminum for its rigidity, strength and light weight. An example cast aluminum is ATP 5 (Aluminum Tooling Plate 5) or similar metals. For example, a suitable metal may have density in the range of about 2,400 to about 3,000 kg/m$^3$, a hardness in the range of about 60 to about 80 HB, a tensile strength in the range of about 250 to about 300 MPa and a yield strength in the range of about 100 to about 150 MPa. Other suitable materials include but are not limited to stainless steel, brass, titanium and dimensionally stable hard polymers such as PEEK, glass filled PEEK, polycarbonate and polystyrene.

Figure 2A:
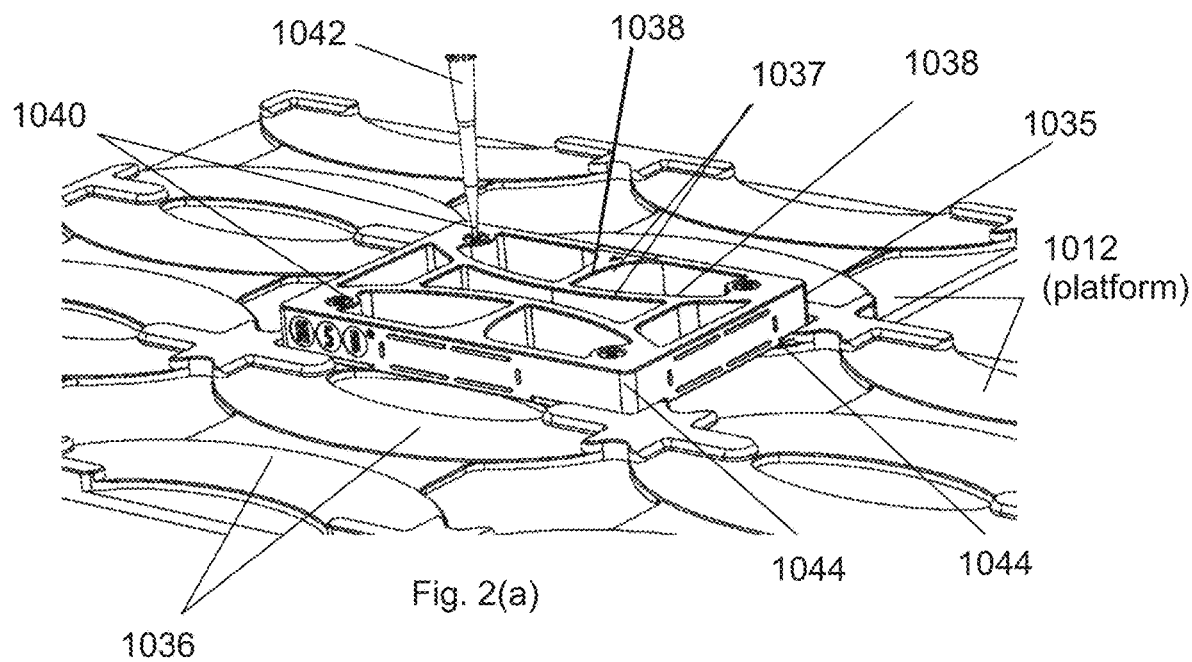

A reference pad (1040) may have a diameter of about 1.46 mm±10% and the distance from the center of the reference pad (1040) to a side of the training plate (1035) may be about 7 mm±10%. As shown in FIG. 2(a), the four reference pads (1040) correspond to the center of the four corner wells in a 96-well microplate, discussed above. Training plate (1035) may be anodized for example gold anodized. Each training plate (1035) has a part number and a revision number affixed and/or edged thereon, and a serial number affixed thereon.

Figure 2B:
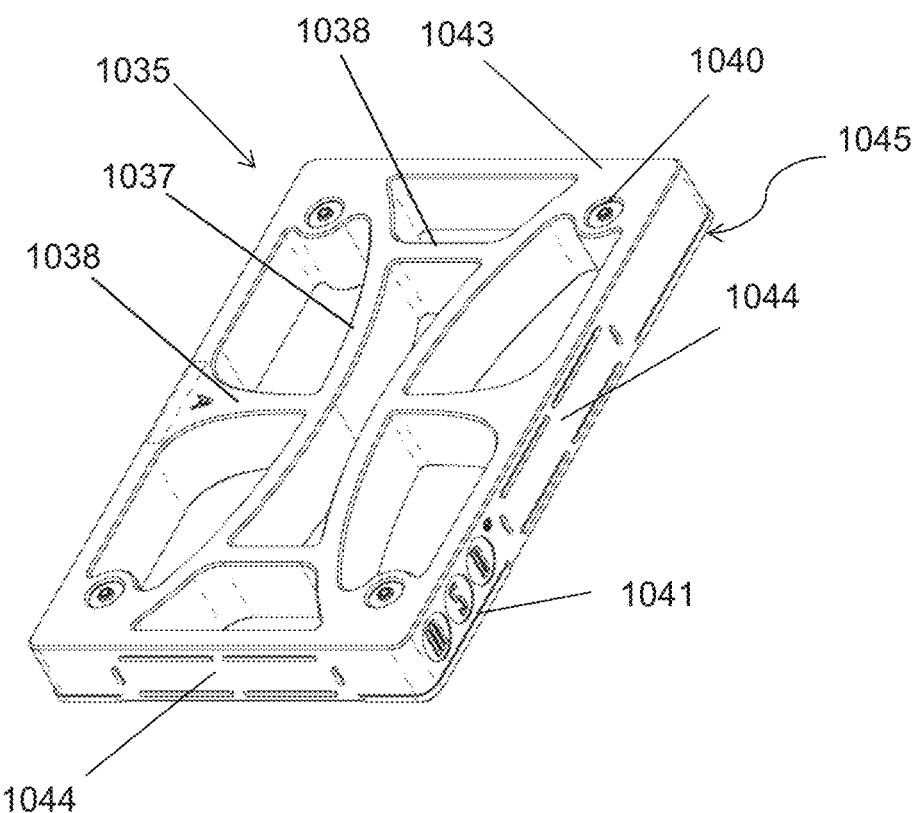

Another embodiment of training plate (1035) is illustrated in FIGS. 2(c)-(d), which is substantially similar to that shown in FIGS. 2(a)-(b), except that gripping areas (1044) are not bordered by raised lines. Instead, two rows of two dimples or divots (1044a) and (1044b). During reference setting or alignment activities, a pair of small screws, e.g., size M1.5, are attached through gripper pads (1031) of robotic arm (1002) so that the distal ends of the screws protrude through the gripper pads. As gripper pads (1031) are brought into contact with either the short or the long sides of training plate (1035), the distal ends of the screws are aligned with either divots (1044a) or (1044b) to train the position of gripper arms (1031) relative to training plate (1035). Upper pivots (1044a) are positioned so that the top of each gripper arm (1031a) is flush with the top of training plate (035), and lower pivots (1044b) are positioned so that the bottom of each gripper arm (1031a) is aligned with the skirt of training plate (1035) or aligned with bead line (1041). Divots (1044a) and (1044b) are sized and dimensioned to receive the distal ends of the screws.

Advantageously, the screws are conventional screws and are selected to work with this embodiment of training plate (1035), and the plate comprises spaces to store the screws and a tool, such as an Allen wrench, to install and remove the screws. Slots (1044c) are provided on one or more sides of training plate (1035), for example on the short sides. Slots (1044c) have a number of holes (1044d) as shown in FIGS. 2(c)-(d), each is sized and dimensioned to receive and hold a single screw. For example, these holes (1044d) are threaded similar to the screws. The screw heads are tucked within slots (1044c). Elongated slot (1044e) is also provided for the tool, and has a single hole (1044f) for the body of the tool, e.g., an Allen wrench, to be inserted into the body of training plate (1035). One or more internal holes (1044g) may be provided to accommodate the length of the tool. The head of the tool may be tucked/inserted into elongated slot (1044e), so as not to stick out of the training plate.

Figure 2E:
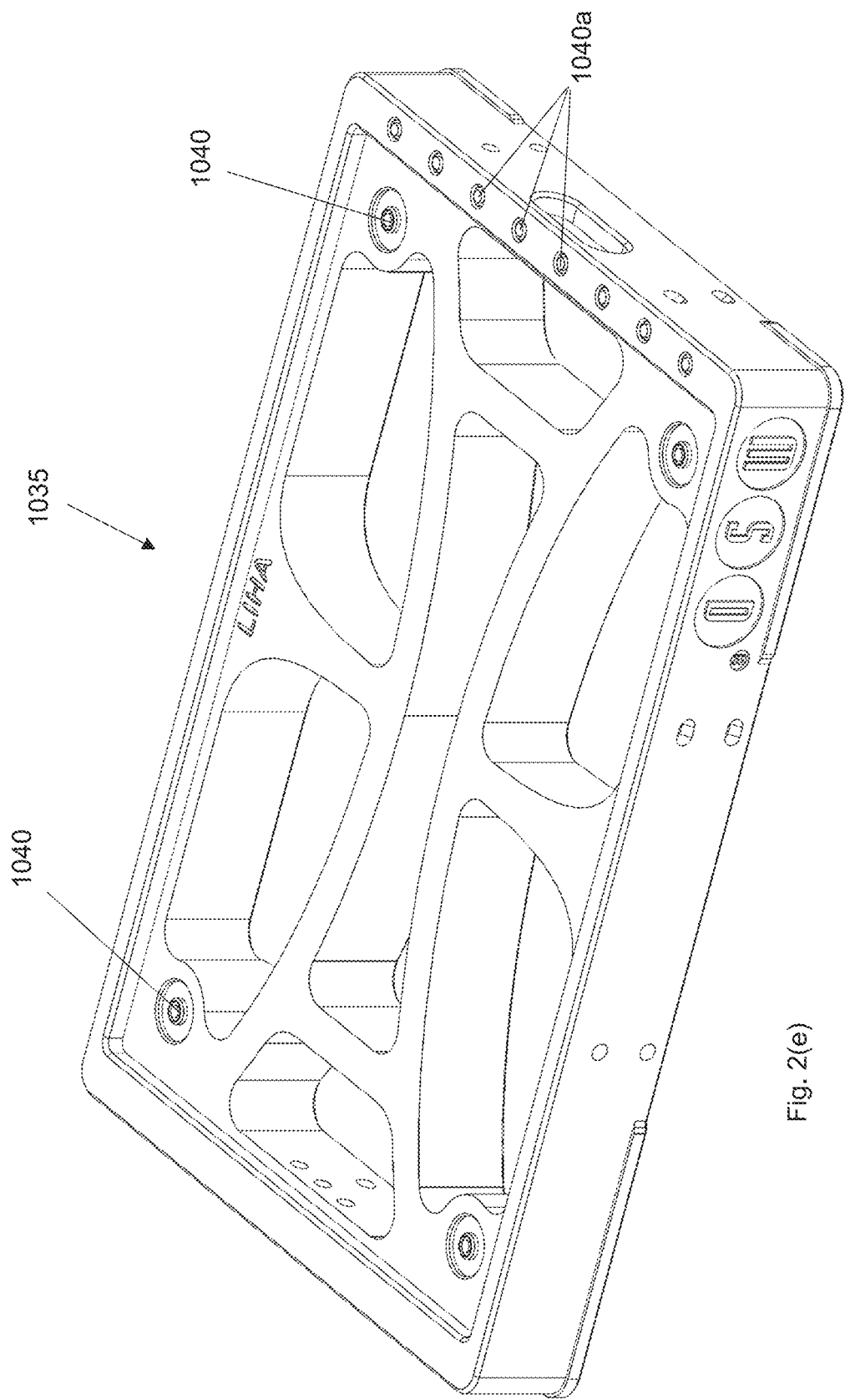

Referring to FIG. 2(e), optionally training plate (1035) may have an array of second reference pads (1040a). In this further embodiment, the number of second reference pads (1040a) matches the number of pipettes in pipetting system (1021), as illustrated in FIG. 1(c). Robotic system (1002) may lower pipette system (1021) toward second reference pads (1040b) to train the computer/processor of the X, Y, and Z components of the pipettes, similar to the training of probe (1042) by reference pad (1040), discussed above. It is noted that the height (Z-direction) of second reference pads (1040a) may be the same as or different from the height of reference pad (1040).

Referring to FIGS. 3(a)-(b), enlarged views of gripper pads (1031) are shown. Gripper arms (1031a) may have a bottom beveled or chamfered surface (1031b). The chamfered surfaces allow the gripper arms to nudge or move multi-well plates or racks horizontally into position(s) to be picked up without catching on the edges of the platform. Additionally, the distal ends of gripper arms (1031a) have at least one roughened surface (1031c) to improve the gripping action between the gripper arms and the multi-well plates or racks. Gripper arms (1031a) may be made from a metal such as stainless steel. Suitable stainless steels include but are not limited to alloy 17-4 (Alloy 630, UNS S17400). The chamfers, or beveled edges, allow the positioning of the robotic gripper arms to be somewhat less precise when maneuvering into place to pick up a plate or other moveable item. As the grippers are moved into position, the angled chamfered edges serve to guide the plate or other item into place for gripping/lifting with the grippers.

In an embodiment, the training plate may have a barcode with its serial number affixed to it to allow automated access to stored dimensional information for the training plate.

The plate washing subassembly may be any suitable commercial microtitre plate washing system, e.g., a plate washing subassembly available from BioTek Instruments, Inc., Winooski, Vermont, including but not limited to the 405 Touch Washer, 405 LS Washer, Elc405x Select Deep Well Washer, the Elx50 Washer, or the BlueCatBio system. Any plate washer may be utilized. Alternatively, the plate washing function may be performed by the pipetting system described herein, and a vacuum system or chamber may be used to remove the residual liquid. Likewise, the robotic subsystem may be any suitable tabletop commercial robotic system, e.g., systems available from Tecan Group LTD, Switzerland, such as the Tecan EVO 200. Suitable robotic subsystem may be air-based liquid handling system or liquid back system. Any type of fluidic pump may be utilized.

Referring to FIG. 4, an inventive plate washing training plate (1102) is provided to train the tubes in plate washing assembly (1005), as illustrated in FIGS. 1(b)-(d). Plate washing assembly (1005) is capable of washing all the wells in a multi-well plate at the same time, and has a pair of tubes for each well. One tube injects a washing liquid from a container such as liquid reagent assembly (1007) into the well and the other tube aspirates the same well and discards the used liquid into liquid waste storage unit or container (1020). In an embodiment, the elevation of the aspiration tube may be lower than that of the injection tube. A purpose of washing the multi-well plate is to remove any analyte or detection reagent that is unattached to the well, as well as any components of the sample that could interfere with the assay measurement.

The height of the aspiration tubes may be arranged so that the distal tips of the aspiration tubes should not be too close to the plate's surface because the electrodes could contact the plate and restrict the flow of washing fluid. If the distal tips of the aspiration tubes are too far from the plate's surface, too much of the washing fluid could remain in the wells and the fluid exchange and wash quality are less than optimum.

To train the aspiration tubes (1105) in plate washer (1005), the drawer that supports the plate washer is pulled away from assay system (1000) and a cover, if one is present, is opened. Thereafter, plate washing training plate (1102) is positioned on top of the plate washer (1005). Plate washing training plate (1102) may have a number of holes or divots (1102*a*) that correspond to the number of wells in a multi-well plate or to the number of aspiration tubes (1105). Thereafter, a first shim (1103) of a known first thickness (1103*a*) is laid on top of the plate washing training plate (1102). The substrate that holds the aspiration tubes (1105) is lowered on top of the first shim (1103), until the first shim (1103) is not movable because the tips (1105*a*) of the aspiration tubes (1105) pinch the first shim (1103) to holes (1102*a*). The substrate holding the aspiration tubes (1105) is then moved upward in the Z-direction until the first shim (1103) is slightly movable indicating that the distance in the Z-direction from the distal tips (1105*a*) of the aspiration tube (1105) to the top of training plate (1102) is the same as the first thickness (1103*a*). This training is repeated with a second shim (1107) having a second known thickness (1107*a*) different than the first thickness (1103*a*). The locations of the distal tips (1105*a*) of the aspiration tubes (1105) at the first and second known thickness (1103*a*, 1107*a*) are stored on the processor of the plate washer (1005) and of the assay system (1000).

In an embodiment, the thickness of plate washing training plate (1102) is configured so that the top of plate (1102) is at the same height as the ECL emitting spots on the multi-well plates. Hence the height of the first known thickness of the first shim corresponds to the minimum acceptable distance of the aspiration tubes from the ECL emitting spots and the height of the second known thickness is the maximum acceptable distance from the ECL emitting spots to the aspiration tubes on plate washer (1005).

Advantageously, the X and Y (horizontal) positions of the distal tips of the aspiration tubes are also known, when the aspiration tubes are inserted into holes (1102*a*) of training plate (1102). In embodiments, the first and second shims may be made from a pliant material, such as plastic or elastomers, so as not to damage the distal tips of the aspiration tubes. In a non-limiting exemplary embodiment, the first known thickness is about 0.1 mm and the second known thickness is about 0.2 mm. However, these thicknesses may be any distance.

In a specific embodiment, the plate shaking subassembly includes a counterbalanced assay consumable shaking apparatus as described in commonly owned United States patent application publication No. US 2018/0074082, published on Mar. 15, 2018, the disclosure of which is hereby incorporated herein by reference in its entirety. In particular, the shaking subassembly can include a 2×3, 2×4, or 2×6 array of twenty storage units. In an embodiment, plate shakers (1006) illustrated in FIGS. 1(*b*)-(*d*) are individual thermoshakers that have heaters to maintain the assay plates disposed thereon at an elevated temperature. Such thermoshakers are commercially available as BioShake 3000-T elm shakers from Q. Instruments from Jena, Germany. In an example, plate shakers (1006) can maintain a temperature that is about 3° C. higher than the operating temperature of the assay system and up to about 37° C. with a tolerance of about ±0.5° C. Typical plate shakers can maintain up to 99° C. Samples, buffers, reagents, etc. contained in the wells of assay plates may be mixed and incubated on these shakers. Alternatively, other shakers or heating units may be utilized. For example, heating or cooling chambers may be used with or without shaking; single or dual linear shakers may be used with or without heating; ultrasonic mixing with heating incubation can also be used, as well as, mixing with tilting rockers with heating incubation. The present disclosure is not limited to any particular shaker or incubator.

The present inventors have also discovered that during assay runs the reagents contained in troughs (1018) and during the incubation and mixing period the sample/reagent mixture in the assay plates on plate shakers (1006) experience evaporation. Evaporation of reagents in troughs (1018) represents a loss while evaporation from the assay plates on plate shakers (1006) may cause a change in concentration of the materials contained in the assay plates due to evaporation. In accordance to one aspect of the present disclosure, lids are provided for these vessels.

As illustrated in FIG. 5(*a*), exemplary trough lids (1028) are illustrated. Lids (1028) are shaped and dimensioned to fit firmly over reagent troughs (1018). Lids (1028) have a top (1029) and side walls sized and dimensioned to fit over the top of trough (1018) with a pattern of cuts (1030) created for example by a laser cutter on top (1029). Cuts (1030) are designed to allow top (1029) to flex and to allow pipette subassembly or pipettor (1021) to insert pipette tips into reagent troughs (1018) to retrieve the reagent, as shown. When the pipette tips are withdrawn, cuts (1030) allow the top to return to its original configuration. Any pattern of cuts (1030) may be used so long as the top (1029) flexes to allow the pipette tips to enter and substantially resumes its original configuration when the pipette tips are withdrawn. Exemplary patterns of cuts (1030) are shown in FIG. 5(*b*); however, the present disclosure is not limited to any particular cut pattern.

Lids (1028) limit the exposure of the reagents contained in troughs (1018) to the internal space in the assay system (1000) only to the combined area of the cuts. Generally, open troughs may contain chemicals such as tripropylamine (TPA), which can evaporate resulting in losses. Limiting the exposure limits the evaporation. To further limit the exposure, a second top (1029') with another cut pattern for example in the opposite orientation may be placed on the top or bottom of top (1029) to create a tortuous path for the evaporated gas to escape. Lids (1028) may be made from relatively rigid material or non-elastomeric material, such as polyester, high density polyethylene (HDPE) or polycarbonate, and flexibility of top (1029) is provided by the cut patterns (1030). Alternatively, lids (1028) may be made from an elastomeric material such as natural or synthetic rubber to improve flexibility and optionally the cuts are made with sharp cutting implements instead of laser cutters to minimize the lost material and the combined area of the cuts. In embodiments, lids (1028) may be thermoformed or vacuum formed and cuts (1030) are die cut. Thermoforming is a process of heating a plastic sheet and forming its shape with air pressure on a mold and vacuum forming is a similar process, but vacuum is used instead of air pressure.

Another embodiment of lid (1028) is illustrated in FIGS. 5(*c*) and (*d*), which may be utilized with any liquid container in any assay system. This version may have two simple cross-cuts on top (1029) to allow two pipettes from pipette system (1021) to be inserted therethrough. In an embodiment, lid (1028) has a certain thickness (d) that allows lid (1028) to sit more securely on top of troughs (1018). The number of cuts is reduced to minimize the evaporation from troughs (1018). Advantageously, the pipettes when inserted through the cross-cuts can lift and transport lids from troughs (1018) and dispose of them into solid waste container (1008). In one example, the lid has a thickness from about 0.12 inch to about 0.18 inch, from about 0.13 inch to about 0.17 inch, from about 0.14 inch to about 0.16 inch, or about 0.15 inch. In an embodiment, lid (1028) may be made from a clear plastic such as PVC, so that a visual check can confirm whether reagent is in the trough before loading. The lid may be made from an opaque material, such as high impact polystyrene, in case the reagent is light sensitive.

To minimize the possibility of troughs (1018) being pulled out of the trough carriers, shown without reference number in FIG. 1(b), an elastomeric block may be inserted between troughs. Such elastomeric blocks have a main body with a protrusion on each side that faces an adjacent trough. Each block may have two protrusions, and for example the protrusions are configured to have different sizes and/or volumes depending on the amount of gripping desired. For example, the protrusion facing an end trough should have a larger volume than the protrusion facing a center trough.

In embodiments, plate lids (1032), as illustrated in FIG. 6(a), have no cut pattern since plate lids (1032) are placed on assay plate (1031) after the processing steps are completed and the assay plates (1031) are incubated and mixed on shakers (1006). As discussed above, shakers (1006) may be heated to the proper incubation temperature. Elevated temperatures promote evaporation particularly when exposed to ambient conditions inside assay system (1000). Lids (1032) may comprise a plurality of downward facing dimples (1034). Evaporated vapor from the sample/reagent mixture in the wells (1051) within the assay plate (1033) may condense at dimples (1034) and the condensate drops back into the wells (1051). In embodiments, one dimple (1034) may be positioned above each well (1051) in the assay plate (1033). For example, for a 96-well assay plate, 96 downward facing dimples are provided on lid (1032). Alternatively, standard microtiter plate lids, e.g., low-profile ones, may be used.

As shown in FIGS. 6(b)-(c), lid (1032) comprises a skirt (1050) dependent on a top surface. When placed on top of a multi-well assay plate (1033), the outer perimeter of the top surface rests on the outer perimeter of assay plate (1033) creating a contact line at (1052). The contact line (1052) provides a flow restriction or a seal to restrict or keep evaporated gas from leaving the enclosure between assay plate (1033) and lid (1032). Lid (1032) may have no structural rib on its bottom surface to interfere with the contacts at contact line (1052).

Additionally, in the embodiment of lid (1032) shown in FIGS. 6(b)-(c), secondary contact lines (1053) exist between the bottom surface of lid (1032) and the top surface of each well (1051). These secondary contact lines (1053) present another obstacle discouraging the evaporated vapor from escaping. The effectiveness of secondary contact lines (1053) for each well (1051) depends on the flatness of lid (1032) and the flatness of the top surface of assay plate (1033). Dimples (1034) along with skirt (1050) also help prevent lid (1032) from sliding off assay plate (1051) during the shaking and incubating period on shaker (1006). Additionally, dimples (1034) also act as the condensation enhancers to promote condensation of the evaporation back into the wells (1051).

The plate lid (1032) may be made of polystyrene, polypropylene or cyclic olefin copolymer (COC) or any other material commonly used in biological studies.

To further minimize inconsistent evaporation and condensation, lid (1032) may be made from a hydrophobic polymer or other hydrophobic materials and/or the bottom of lid (1032) is coated with a hydrophobic coating or rendered hydrophobic.

The bottom surface of lid (1032) may be made hydrophobic by microetching the surface to create micro-sized air pockets. These micro-sized pockets may create a rough micro-topography, which may act as a buffer of air that prevents liquids from sticking to the surface. This is also known as the "lotus effect" after the hydrophobic nature of the lotus leaves. This effect is also observed on the skin of geckos. The rough micro-topography does not allow for water to aggregate together preventing wide distribution. Aggregated water would form larger droplets and fall away from the lid thereby promoting condensation. Hydrophobic surfaces may also have anti-microbial properties due to their ability to repel moisture.

Suitable hydrophobic polymers include, but are not limited to, poly(tetrafluorethene), polypropylene, polyamides, polyvinylidene, polyethylene, polysiloxanes, polyvinylidene fluoride, polyglactin, lyophilized dura matter, silicone, rubber, and/or mixtures thereof.

Suitable hydrophobic coatings may also include, but are not limited to, polyethylene, paraffin, oils, jellies, pastes, greases, waxes, polydimethylsiloxane, poly(tetrafluorethene), polyvinylidene fluoride, tetrafluoroethylene-perfluoroalkyl vinyl-ether copolymer, fluorinated ethylene propylene, poly (perfluorooctylethylene acrylate), polyphosphazene, polysiloxanes, silica, carbon black, alumina, titania, hydrated silanes, silicone, and/or mixtures thereof. Suitable hydrophobic coatings may also include surfactants, such as perfluorooctanoate, perfluorooctanesulfonate, ammonium lauryl sulfate, sodium laureth sulfate, alkyl benzene sulfonate, a sulfated or sulfonated fatty material, salts of sulfated alkyl aryloxypolyalkoxy alcohol, alkylbenzene sulfonates, sodium dodecyl benzenesulfonate, fluorosurfactants, sodium lauryl sulfate, sulfosuccinate blend, sodium dioctyl sulfosuccinate, sodium sulfosuccinate, sodium 2-ethylhexyl sulfate, ethoxylated acetylenic alcohols, high ethylene oxide octyl phenols, high ethylene oxide nonyl phenols, high ethylene oxide linear and secondary alcohols, ethoxylated amines of any ethylene oxide length, ethoxylated sorbitan ester, random EO/PO polymer on butyl alcohol, water soluble block EO/PO copolymers, sodium lauryl ether sulfate, and/or mixtures thereof.

In a variation, portions where the outer perimeter of the top of plate (1032) rests on the outer perimeter of assay plate (1051) that form contact line (1052) may be roughened, e.g., by a wire brush or similar instruments to increase the tortuous path for gases and vapors thereby minimizing the amount of vapor escaping. The bottom surface of lid (1032) may be roughened to increase its hydrophobicity, discussed above, to exhibit Cassie-Baxter behavior. It is known that microstructuring a surface amplifies the natural tendency of a surface, and in certain instances if the roughened surface can entrap vapor (such as air or other gases) the hydrophobicity of the surface may be further enhanced (Cassie-Baxter equation). It is also contemplated that the bottom surface of lid (1032) may be microstructured using methods known in the art including, but not limited to, creating patterns or textures on surfaces using micromachining, lithography (photolithographic, soft lithographic (nano imprint lithography, capillary force lithography, micromolding in capillaries, microtransfer molding), e-beam lithography), and plasma etching; as well as chemical bath deposition, chemical vapor deposition, electrochemical deposition, layer-by-layer deposition via electrostatic assembly, colloidal assembly, sol-gel methods, nanosphere lithography, water droplet condensation induced pattern formation, and/or microabrasion. Hydrophobic materials, coatings and surface treatments are disclosed in published international patent application WO 2012/003111, which is incorporated herein by reference in its entirety.

Optionally, a gasket may be placed proximate to contact line (1053), for example on the outer perimeter of lid (1032) adjacent to skirt (1050). One or more stacking features (1057) may be positioned on the top of the lid (1032) around its perimeter, so that multiple lids (1032) may be stacked on top of each other without sliding off.

Lid (1032) may be omitted or be replaced by a standard e.g. flat lid.

The liquid reagent subassembly (1007) includes a plurality of liquid reagent and waste compartments and for use in one or more steps of an assay conducted in the apparatus. A reagent/waste compartment comprises a compartment body that encloses an internal volume and a reagent or waste port for delivering reagent or receiving waste. The volumes of the compartments in the subassembly may be adjustable such that the relative proportions of the volumes of the compartment body occupied by reagent and waste may be adjusted, e.g., as reagent is consumed in assays and returned to a compartment as waste. The total internal volume of the compartment body may be less than about 2, less than about 1.75, less than about 1.5, or less than about 1.25 times the volume of liquid stored in the body, e.g., the volume of reagent originally provided in the compartment, thus minimizing the space required for waste and reagent storage, and allowing for convenient one-step reagent replenishment and waste removal. In certain embodiments, the apparatus has a reagent compartment slot configured to receive the compartment, and provide fluidic connection to the waste and reagent ports, optionally via "push-to-connect" or "quick connect" fittings.

Optionally, the reagent and/or waste compartments are removable. In one embodiment, the reagent and/or waste compartments are removable and the apparatus further includes a sensor, e.g., an optical sensor, other than the liquid level sensors described above to monitor the fluid level(s) in the reagent and/or waste compartments. Alternatively, the liquid reagent may include electronic scales to monitor the weight of fluid in the reagent and waste reservoirs for real-time tracking of reagent use and availability. Once the reagent and/or waste compartments reach a certain minimal or maximal capacity, as detected by the sensor or scale, the apparatus alerts the user to remove the reagent or waste compartment to replenish and/or empty the contents. Other liquid level detectors such as the ones described above may be used. One exemplary liquid level detector comprises a plurality of thermistors arranged vertically within each compartment, e.g., at ¼, ½, ¾ and full marks. Due to the different heat capacity of liquid and air/vapor, a thermistor submerged in liquid produces a different electrical signal than one located in air or vapor. Another liquid level detector comprises a capacitor with one conductive plate at the top of the liquid and the other conductive plate at the bottom of the compartment. The measurable capacitance of the liquid between the two plates varies the distance between the two plates, as described above, indicating the amount of liquid contained in the compartment.

In an embodiment, the pump or motor of the pipetting subsystem (1021) is in communication with these sensors or scales and when the reagent and/or waste compartments reach the minimal or maximal capacity, the pipetting probe motor is disabled by the apparatus, e.g., the probe sensor relays information regarding the capacity of the compartment to the instrument software, which then halts further pipetting action.

The reagent and waste compartments may be provided by collapsible bags located in the subassembly body. One of the reagent and waste compartments may be provided by a collapsible bag and the other may be provided by the compartment body itself (i.e., the volume in the compartment body excluding the volume defined by any collapsible bags in the compartment body). Alternatively, the reagent and waste compartments may be housed in the same container and separated by a flexible, movable or elastic membrane or separator. In addition to the first reagent and waste compartments, the reagent cartridge may further comprise one or more additional collapsible reagent and/or waste compartments connected to one or more additional reagent and/or waste ports. Alternatively, one or the other of the reagent and waste compartments may be constructed from blow-molded plastic. Also, as illustrated in FIGS. 1(*b*)-(*d*), the waste compartment may be in its own container, such as liquid waste storage unit (1020).

In accordance with another aspect of the present disclosure, assay system (1000) may be capable of controlling the internal temperature when its panels or doors (1056) are closed. While illustrated in FIGS. 1(*b*)-(*d*) without its housing and doors to show the internal components, assay system (1000) includes front doors and/or panels designated as inner doors (1055) and outer doors (1056), as shown in FIG. 7(*a*). These doors and panels may be closed before assay system (1000) executes a run. For example, all the doors on assay system (1000) are closed and remain closed during an assay run. The doors may be closed using electromagnetic interlocks, solenoid locks or the like. Once the system starts an assay run, the internal air temperature, in the area above and near the platform where the assay steps are performed, may be maintained within a range of about 20° C. to about 24° C., inclusively. Once an operating temperature is selected depending on the particular assay being run, the selected temperature may be maintained within ±1° C. Alternatively, any non-condensing temperature range may be chosen for systems that use liquid samples and liquid reagents and solutions. The temperature control area may be defined as from the front of the platform (1012) or assay consumable storage unit (1004) to about six inches in front of the back of the deck or to the back of the deck. The control area may also extend from the left to the right of platform (1012), or from position 26 to position 49, as shown in FIG. 7(*b*)(1), e.g., to cover the length of all shakers (1006). For example, the deck is leveled and is anchored for seismic remediation to minimize re-training of the assay system in known areas with earthquakes and other seismic activities.

A top view of the layout of labware of assay system is illustrated in FIG. 7(*b*)(1). The relative locations of assay reader (1003), first consumable identifier controller (1013), e.g., a first barcode reader, and protruding assay consumable storage unit (1004) on platform (1012). Also shown on FIG. 7(*b*)(1) are pipette tips (1015) and (1016), shakers (1006), tube carriers (1017) and troughs (1018). As discussed above, platform (1012) comprises lines of holes (1027) numbered from 1 to 69 for ease of referencing the locations of the labware relative to holes (1027). One or more grid position clips (1027*a*) are sized and dimensioned to fit into holes (1027) on platform (1012) to assist in the positioning of the labware. Multiple lines of hole (1027) may be utilized to hold larger holder(s) for troughs (1018) and/or tubes (1017) that extend to more than one line of holes, as discussed above. Lines of holes (1027) allow the flexibility of holding holders that extend more than one line or single line holders.

Another configuration of the layout is illustrated in FIG. 7(*b*)(2). First consumable identifier controller (1013) is located closer to shakers (1006), and pipette tips (1015) and (1016) are omitted showing tip carrier (1026). An exemplary location for second identifier controller (1023), e.g., second barcode reader is shown. The configuration layout in FIG. 7(*b*)(3) is similar to that in FIG. 7(*b*)(2), except that a different consumable identifier controller (1013) is shown, e.g., one that scans the entire bottom surface of the consumable, such as multi-well plates or racks holding vials, tubes containing reagents and such, wherein each vial and tube has its own identifier such as a barcode.

Assay system (1000) also has temperature sensors located at a number of locations to monitor the temperature(s) inside the assay system. The temperature readings may be monitored by the system's software, described herein, and the user is notified if the operating temperature is outside of operating range. The temperature of liquid in a lidded plate placed on the plate shaker with the shaker temperature control turned off should rise by no more than 2° C. above the ambient deck temperature over a duration of two hours. For other types of assays, this temperature rise may have other maximums. Alternatively, a user of assay system (1000) may have the ability to change the setting for the deck temperature and/or to set temperature for each TEC to optimize the running of certain assays.

The selected operating temperature is maintained, notwithstanding the heat produced by plate shaking apparatus (1006), which may also incubate the assay plates at an elevated temperature as discussed above, and assay reader (1003), which contains electromechanical components and thermoelectric coolers for optical sensors such as charge-coupled device (CCD) or complementary metal-oxide semiconductor (CMOS) devices that generate heat. The selected operating temperature is maintained by a number of TECs (1019), as best illustrated in FIG. 1(*d*). An example, six TECs (1019) are used; however, any number may be deployed. In embodiments, two TECs may be focused on reader (1003) to dissipate the heat generated by the reader. The remaining TECs may be used to control the selected operating temperature and some of the remaining TECs may focus on the optionally heated shakers (1006). Additionally, some of the cooling is directed to the electronic equipment (1010, 1011) or the electronic equipment housed in electronic enclosure (1009), discussed below. While TECs are one example, any heating and cooling device may be used, e.g., conventional heat pumps with a compressor and a coolant are suitable. TECs in combination with humidity controllers, such as humidifier and dehumidifier, would allow the assay system to operate in wider temperature ranges and relative humidity (RH) ranges, and in environments exposed to sunlight and/or air flows caused by HVAC equipment.

As illustrated in FIG. 7(*c*), which shows a cross-sectional side view of assay system (1000), TEC (1019) absorbs heat near its midsection, as shown by arrows (1046), and produces cool air at the top and bottom as shown by arrows (1047). Cool air (1047) flows toward the front of assay system (1000) cooling the enclosure, and is turned around by the closed doors or panels (1056) and returns as warm air (1046), where the heat is absorbed by TEC (1019). FIG. 7(*d*) shows a top view, where all six exemplary TECs (1019) are illustrated. The return warm air is directed toward certain areas proximate the center of the TECs. FIG. 7(*e*), which is a perspective view, shows with more detail the flow paths of the warm and cool air and baffles (1048). Each baffle (1048) may enclose one or more TECs (1019), as shown, forcing cool air (1047) to flow upward and downward, as discussed above. Baffles (1048) also guide the returning warm air to the sides of the baffles where heat is exchanged by the TECs. Additional heat exchange occurs on the hot side of the TECs outside of the enclosure of assay machine (1000), where the heat absorbed from inside the assay machine is exchanged with atmospheric air.

Additionally, shakers (1006) may be raised above platform (1002) to allow air to flow underneath as well as over the top of shakers to improve the convection heat transfer.

FIG. 7(*f*) illustrates a cooling of electronic equipment (1010, 1011), which may be housed in electronic enclosure (1009). Cooling of enclosure (1009) employs chimney effect, by taking cool air (1047) from the bottom and pulling it upward to cool electronic equipment (1010, 1011) and ejects warm air (1046) through cooling channel (1049) to the outside of assay machine (1000). For example, cooling channel (1049) is positioned away from the main portion of assay machine (1000) and is positioned adjacent to an outer wall or skin of the system, as shown, for more effective heat removal. One or more fans are used to draw in cool ambient air and to push the air within electronic enclosure (1009) to cool and to eject warmed air through chimney (1049).

Referring back to FIG. 7(*a*), at least one computer screen or tablet (1058) is attached to a glass surface (1060) of assay system (1000). The pressure transducers commonly used in touch screen are attached or adhered directly to the glass surface (1060) and rely on the glass surface (1060) of assay system (1000) to transmit the pressure exerted by the fingertips of the users to the transducers to generate electrical currents signals to the CPU of the tablet or computer. At least one sound exciter (1062) also rely on the same glass surface (1060) to generate sound waves. Sound exciter (1062) is also attached or adhered to glass surface (1060). Exciter (1062) vibrates glass surface (1060) to create sound. Both the touch screen and sound exciter may be used for the graphical user interface (GUI) or user interface (UI), described herein. The sound volume may be fixed or variable.

To minimize or eliminate interference caused by the vibrations generated by exciter (1062) to the pressure transducers of tablet (1058), a minimum distance between the exciter and the pressure transducers/touch screen may be established. While human audible frequency ranges from about 20 Hz to about 20 kHz, typical human speech occupies a significantly smaller range, e.g., from about 2048 Hz to about 8192 Hz ($7^{th}$ to $8^{th}$ octave). For example, the pressure transducers in tablet (1058) are designed, selected or tuned so that they are not responsive in the human speech range, so that the same glass surface (1060) may be shared by a visual device and an audio device.

Additionally, the glass surface (1060) or other surfaces on the front of assay system (1000) may contain lights, such as LED lights or light strings. For example, the LED lights are located on the door handles of the assay system and can also be located on the top and/or bottom (reflecting off the floor) of the assay system. These lights may illuminate different colors depending on the status of the immunoassay being run. In one example, the lights may communicate a satisfactory run by emitting a constant green or blue light, flashing or pulsing green or blue while the system is running, emitting yellow or red when an error or warning is detected, and emitting white when the assay is completed. The same colors can also be displayed on tablet (1058). The inside top of the assay system may be illuminated using red/green/blue LED lights where all the lights are illuminated resulting in a combined white light shining onto the deck and its subcomponents. This allows, for example, video capture of the deck during an assay run.

Another aspect of assay system (1000) relates to how panels and doors (1055, 1056), which may be heavy and bulky especially outer door (1056), are supported on the frame of the system. Referring to FIG. 8(a), a flange system (1063), which includes a main hanging part (1066) and a movable bracket (1064) movably mounted on rail (1065) to allow bracket (1064) to be adjusted up and down in the Z-direction. Main hanging part (1066) has a pair of C-shaped openings (1067) adapted to be mounted to support (1068) on bracket (1064). Once the vertical position of door or panel (1056) is satisfactorily established, bolts are threaded into openings ((1069) to fix the vertical position.

The horizontal position (X-Y plane) of door or panel (1056) can also be adjusted by cam (1070). Cam (1070) can have any suitable shape, including a circular lug eccentrically mounted onto bracket (1064). More specifically, cam (1070) may be attached via an axis that is spaced apart from the center of the circular lug. A nut, for example polygonal and/or hexagonal, is attached to the lug at the eccentric axis. Rotation of the nut would move main hanging body (1066) horizontally on the X-Y plane. The horizontal movement of the main hanging body (1066) is limited by the shape of opening (1069). In other words, opening (1069) has a horizontal oval shape which allows the connecting bolt a small amount of movement inside the oval shape.

Hence, flange system (1063) allows the outer door (1056) or inner door (1055) to be adjusted in two directions to ensure that assay system (1000) may be closed appropriately. Flange system (1063) may be used on any and all doors and panels on the assay system.

A door, such as outer door (1056) may need at least two sets of flanges (1063) to mount onto a frame. However, as shown in FIG. 8(a) when movable bracket (1064) is small, e.g., covering substantially the main hanging part (1066) and when C-shaped openings (1067) on one set of flange (1063), either near the top or bottom of the door, are hooked onto supports (1068) of movable bracket (1064), the weight of the door is supported only by supports (1068) of one set of flanges (1063). This creates a torque or moment about the supports (1068) of this one flange, and this torque or moment can cause deformation(s) of the flange, the door and/or the frame.

In an embodiment, a way to avoid this torque or moment may be to distribute the load caused by the weight of the door through a larger or longer bracket (1064), which is a load distribution element and which may be unitary or one-piece in construction, and/or to distribute this load among all the flanges (1063). Referring to FIG. 8(b), bracket (1064) is extended continuously from top flange (1063a) to bottom flange (1063b). Flanges (1063a and 1063b) are parts of hinges (1104a, 1104b) which may be already bolted to door (1056). Once door (1056) is mounted on the frame, for example, to extended bracket (1064), cams (1070a, 1070b and 1070c) may be rotated to adjust the horizontal and vertical positions of the door before the bolts above and below cams (1070a and 1070c) are tightened to secure door (1056) to the frame. As shown in Figured 8(b) and 8(c), cams (1070a and 1070c) are located in vertical oval slots and their rotation causes the door to move in a horizontal direction. Cam (1070b) may be located in a horizontal oval slot, and its rotation would cause a vertical movement of the door.

Another embodiment of the flange system is illustrated in FIGS. 8(d)-(f). Hinge (1104) is extended to cover a substantial portion of door (1056), as shown in FIG. 8(d). The right side as shown in FIG. 8(d) of hinge (1104) is bolted to a portion, for example a metal portion, of door (1056). The left side of hinge is loosely bolted to the frame of assay apparatus (1000) by bolts (1106). Cams (1070a, 1070b and 1070c) are adjusted in the same manner as described above, and bolts (1106) are tightened to secure door (1056). It is noted that bolts (1106) are located in a larger round holes allowing door (1056) to move vertically as well as horizontally. FIG. 8(e) shows cam (1070c) and a bolt (1106) in an enlarged view. A protective or ornamental cover (1106) as shown in FIG. 8(f) is provided to cover cams (1070) and bolts (1106).

Referring to FIGS. 1(a) and 7(a), the outer door (1056) has lower portion (1056a) and top portion (1056b). The lower portion may be heavier and attached to the frame by hinge (1104), as discussed above. Top portion (1056b) may be made mostly from glass to allow the technician or operator to view the assaying operation and for ornamental purpose. To ensure closure of the top glass portion to the frame, a magnetic latch (1056c) is provided for each door to attach to a ferrous portion (1056d) of the top door portion (1056b). Referring to FIG. 8(g), magnetic latch (1056c) includes a base (1056e) which may slide linearly relative to the frame. The sliding motion is allowed by movements of oval slots (10560 relative to bolts (1056g), which may be threadedly attached to the frame. Any number of slots/bolts may be used, and as shown four sets are used. To ensure that the linear movement is controlled, base (1056e) has a dovetail cut (1056h) and the frame has a corresponding dovetail projection, sized and dimensioned to be received in the dovetail cut. Latch (1056c) also has a pivot member (1056i) which is rotationally attached to base (1056e) and magnetic member (1056j) attached to its front edge. As arranged, magnetic member (1056j) may be adjusted by rotating and moving linearly along the dovetail cut to attach to ferrous member (1056d) of door 1056 to ensure proper enclosure for the top portion (1056b) of the door.

Additionally, to ensure that the glass in top portion (1056b) is flush with lower portion (1056a), at least one small block of metal, e.g., aluminum or stainless steel (shown in broken line with reference number (1056k) in FIG. 1(a)), with a threaded hole is attached to the glass via epoxy or another high-grade adhesive. As best shown in FIG. 8(h), block (1056k) may be received in a cavity in lower portion (1056a) sized and dimensioned to receive it. A screw (1056l) is inserted through the inside surface of the lower door portion (1056a) and into the threaded hole of the block (1056k). The screw (1056l) and the block (1056k) are in a lagging relationship, i.e., the portion of the screw traversing the lower door portion (1056a) has no threads, or a bushing (1056m) with a smooth inside surface is positioned between the screw and the lower door portion (1056a). The lagging relationship allows the glass portion to be pulled toward the lower door portion (1056a) as the screw is tightened.

Optionally, a video camera may be positioned within the enclosure of assay system (1000) to record assay runs and to stream the video to remote locations, where the user or technician can monitor the assay runs, without having to be present at the assay system. The video may also be saved and stored for future reference. The video camera may be mounted on a frame of assay system (1000) described below. The video camera may be mounted anywhere inside or outside of the assay system (1000) so long as the camera's field of view (FOV) incorporates the deck area and the labware. The video camera can interface with the computer (1421) via USB, serial, Ethernet, WiFi or Bluetooth or other connection methods.

Assay system (1000) is designed to be stable and as shown in FIG. 9(a) table (1001) that support platform (1012), all permanent components and labware/consumables, has a length (L) of 85 inches±n %, a height (H) of about 28 inches±n % not including the caster wheels, and a width (W) of 33 inches±n %. When assembled to table (1001), each caster wheel has a height of about 4.5 inches±n %. The opening (1078) for the plate washer (1005) is about 5.5 inches±n % x 10 inches±n %. The opening (1080) for the solid waste storage unit is about 4.5 inches±n % x 6 inches±n %. The opening (1082) for the reader (1003) has a length (L direction) of about 16 inches±n %. The tolerance n % may be 10%, 5% or 2.5%.

Referring to FIG. 9(b), frame (1084) has a height (H) of about 52 inches±n %, a front overhang height (H front) of about 30 inches±n %, a length (L) of about 84.5 inches±n %, a width (W) on top of about 34.5 inches±n %. The bottom support has a long width (W2 bot) of about 33 inches±n % and a short width (W1 bot) of about 18 inches±n %. The tolerance n % may be 10%, 5%, or 2.5%.

Reader (1003) is advantageously positioned within recessed opening (1082) and plate washer (1005) is positioned within recessed opening (1078) to provide clearance for the movements of robotic system (1002)'s gripper pads (1031) and pipette system or pipettor (1021) and to make room for the labwares and consumables on platform (1012). Reader (1003) is also positioned away from the center, e.g., on a side of table (1001) so that the heat it generates is kept away from the center of the assay system and is more readily dissipated. Both gripper pads (1031) and pipette system or pipettor (1021) share the same gantry (1022) to save space. The assay consumable storage unit (1004) is cantilevered to the front edge of platform (1012) and the shakers (1006) are located toward the back of platform (1012), as discussed above, to make room for the labwares or consumables on the platform, and allows the lab technician to load the consumables from the front and the gripper pads to take and put the consumables from the back. The combination of the dimensions of the table (1001) and frame (1084) and the locations/elevations of the major components described herein provides for the stability and space saving for assay system (1000).

Exemplary electrical and electronic connections for assay system (1000) are shown in FIGS. 10-13c. FIGS. 10-10d show the power and internet connections. Power and optional Ethernet (for access to a mainframe computer or to cloud storage) module (1085) is shown on the left and in connection to UPS (1086). UPS (1086) provides emergency power to assay system (1000) when power is cutoff. UPS (1086) is also connected to the processors (1087) for the reader (1003) and the assay system (1000), as well as router (1088). UPS (1086) is also connected to washer (1005) and its pump and to the robotic system (1002). As discussed above, the subparts of each of FIGS. 10-13 delineated by broken lines and individually labeled are enlarged and shown on individual drawing sheets. In one embodiment, the UPS provides sufficient power for a controlled shutdown. In other embodiments, the UPS provides sufficient power to complete the assay run.

FIGS. 11-11h continue the wiring diagram of FIGS. 10-10d and show the electrical contact the right side. FIGS. 11-11h show that the UPS is connected to another power source (1089), which is a 300 W AC and 24 V DC unit. Power source (1089) supplies a stepped down power to DC power module at 5V DC at 24 A. This 5V power module supplies power to a number of sensors on both sides, such waste bucker sensors, plate washer sensors, etc. on its left side. On its right side, it supplies power to panel (1091) that powers the light panels and to illuminate the left and right doors (1092). Panel (1091) also supplies power and signals to exciter (1062), touch screen (1058) and barcode reader (1013). Alternatively, touch screen (1058) may be replaced by a keyboard and computer mouse for user inputs.

FIGS. 12-12e continue the diagrams of FIGS. 11-11h and show a control and power PCB (1093), which is connected to six TECs (1019) and their associated sensors (1094). Control and power PCB (1093) also powers fans (1095) and reader (1003).

FIGS. 13-13d show deck control PCD (1096) that powers five shakers (1006), barcode reader (1098) and thermistor sensors (1099) used to monitor temperatures associated with assay reader (1000).

FIG. 7(b)(4) is a top view showing a plate carrier (1036) and two versions of a tip carrier (1026), including one shown in FIG. 7(b)(3).

In the inventive assay system discussed herein, additional microprocessors and computers in the assay system can interact with the assay consumable identifier by transferring data and commands to/from the identifier to the various microprocessors/controllers throughout the system to perform various operations of the components listed above within the assay system, as described in the related patent applications.

The inventive assay system may adjust the assay parameters prior to initiating an assay based on the consumable data saved to the identifier and/or stored or provided as consumable data via a direct or indirect interface. Thereafter, the system makes the appropriate electrical, fluidic and/or optical connections to the consumable (making use of electrical, fluidic and/or optical connectors on the consumable and system) and conducts an assay using the consumable. The sample may be introduced into the consumable prior to inserting the consumable in the system. Alternatively, the sample is introduced by a component of the system after the consumable is inserted in the system. The assay can also involve adding one or more assay reagents to the consumable and instructions for adding those various assay reagents may be saved to the identifier and/or provided as consumable data and the system adds those reagents to the consumable before or during the assay according to the instructions saved to the assay consumable identifier and/or provided as consumable data, as described in the related patent applications.

Another aspect of the present disclosure that minimizes possible operator errors is a loading cart designed to work in conjunction with assay system (1000) discussed and illustrated above. Moreover, the inventive loading cart may be used with other assay systems, including but not limited to those discussed in the Related International Patent Applications, and other commercially available assay systems. The inventive loading cart is (1400) illustrated in the subparts of FIG. 14. Loading cart (1400) may have two or more shelves for storing consumables and labware. Although three shelves or levels are shown, any number of shelves may be used. Bottom shelf (1402) is configured to store liquid reagent storage (1007), liquid waste storage (1020) and other larger or heavier storages or bottles. Middle shelf (1404) is configured to hold any labwares, such as extra pipette tips, such as 1000 µl tips (1015) and 350 µl tips (1016). Top shelf (1406) is configured to handle a large number of consumables such as tubes, tube carriers (1017), rack (1200), assay multi-well plates, troughs (1018), etc. The bottom and middle shelves may be coated or lined with a non-slip material. The shelves may be made from cast urethane.

Loading cart (1400) may have a light weight frame comprising rear supports (1410) and tapered front support (1412) as the main weight bearing members. Rear supports (1410) may be made from lightweight aluminum, and tapered front support (1412) also has aluminum or metal frame wrapped by a polymeric skin. Loading cart (1400) may also have shock absorbers, for example positioned in the legs or supports (1410, 1412). The shock absorbers may have springs or compressed air to dampen shocks and vibrations to minimize their effects on the consumables. Loading cart (1400) is supported by four caster wheels (1414), for example hubless wheel casters that contain ball bearings to reduce friction. Such hubless casters can carry significantly higher load than standard caster wheels, e.g., up to 275 lbs. or 125 kg. Alternatively, self-braking casters may be used. For example, the back two casters (1414) do not rotate during transport.

Loading cart (1400) also has a rear handle (1416) and front handle (1418). Front handle (1418) also contains a mount and support (1420) designed to support a computer or computer tablet (1421), such as an iPad or Surface tablet. Mount (1420) may be rotated 360° and the tablet may be tilted through a limited range to adjust to the user's reading height. Loading cart (1400) may also include a hand-held or fixed mount barcode scanner (not shown) for scanning barcodes on consumables.

In an example, the loading cart may weigh about 133 lbs. (60 kg) when unloaded and about 154 lbs. (69 kg) when the top shelf (1406) is loaded with consumables. Loading cart (1400) may stand 41 inches tall (104 cm) to top tray (1406) and have a width of 27 inches (69 cm) and a length of 52 inches (132 cm).

The top shelf (1406) may be configured to receive a number of trays (1408). Although three trays (1408) are shown, any number of trays of any size may be used and the present disclosure is not limited to any number of trays or any tray sizes. Each tray (1408) may have any configuration. Three exemplary configurations are illustrated in FIG. 14(*c*). Tray (1408*a*) has a plurality of slots (1422) that can store tube carriers (1017) and troughs (1018), shown in FIG. 1(*b*) and square slots (1424) for labwares such as assay plates, dilution plates, sample plates, reagent racks, carriers for pipette tips (1015, 1016), etc. Tray (1408*b*) also may have slots (1422) and slots (1424), as well as circular slots (1426) adapted to carry tubes, such as vials (1206) and tubes (1208). Tray (1408*c*) may have a plurality of square slots (1424). It is noted that an inventive tray can have any combination of slots (1422, 1424, 1426) and slots of any shape and sized. The trays may be reversible, i.e., the trays may have slots on the top and bottom surfaces.

In one example, tray configurations for V-PLEX, U-PLEX, Immunogenicity (IG), pharmacokinetic (PK) and S-PLEX are illustrated in FIGS. 14(*d*)-(*h*). It is noted that these tray configurations are for illustrative purpose only and the present disclosure is not limited thereto. Certain reagents, buffers or diluents may have to be kept cool while the assay run is being setup. Another improvement built into top shelf (1406) is compartments (1428) that are built below trays (1408), as best shown in FIG. 14(*i*). One compartment (1428) may be provided below each tray (1408), as shown. Compartments (1428) may be filled with a coolant such as ice or dry ice. The bottom surface of compartments (1428) is concave with a minimum point proximate its center. A drainage hole (1430) may be provided near the minimum point to drain melted water.

Another embodiment of loading cart (1400) is illustrated in FIG. 14(*j*). Bottom shelf (1402) may optionally have a plurality of depressions (1432) that are sized and dimensioned to hold securely liquid reagent storage (1007) and/or liquid waste storage (1020), while the top shelf (1406) may include a plurality of depressions (1430) sized and dimensioned to support the trays (1408) securely. Additionally, mount and support (1420) for computer tablet (1421) may be raised to a higher elevation relative to trays (1408). While remaining rotatable and tiltable, mount and support (1420) may have extender (1434) that connects the mount and support to front handle (1418). A first ball and shoulder joint that allows rotation and tilting may connect extender (1434) to front handle (1418). A second ball and shoulder joint may connect extender (1434) to mount and support (1420). Both ball and shoulder joints may be included in loading cart (1400). Other joints that allow rotational and/or tiltable motions may be included.

An inventive method of loading the assay systems utilizing loading cart (1400) is described below. The method described herein employs a table computer providing a user interface to instruct a technician in loading the required labware onto the cart and then into the assay system. Because the tablet computer provides an interactive user interface and display corresponding to the appropriate layouts on the loading cart an in the assay system, errors may be reduced.

A lab technician when starting an assay run may use the tablet computer on loading cart (1400) to select the assay to be run, e.g., V-PLEX, U-PLEX, S-PLEX, PK or IG, and any specific subset of the assay. The user interface may advise the technician how to arrange the trays (1408*a*, 1408*b*, 1408*c*) on top shelf (1206). Trays (1208) may be color coded and/or labelled to assist the lab technician in loading the labware including one consumable kit (1200) discussed above, for example as shown in FIGS. 14(*d*)-(*h*). Such arrangements may match exactly the arrangements on platform (1012) of assay system (1000) as shown in FIGS. 1(*b*)-(*d*). Other consumables such as liquid reagent (1007) and the liquid waste container (1020) should be loaded on bottom shelf (1402) and containers of pipette tips (1015, 1016) are loaded on middle shelf (1404). The arrangements of labware on loading cart (1400) may be checked against the display by the user interface on the tablet on loading cart (1400). Thereafter, loading cart (1400) is pushed to an assay machine, such as assay system (1000). The technician would then open the system, activate computer screen (1058), and optionally sound generator (1062) as shown in FIG. 7(*a*). The technician would then follow the user interface on computer screen (1058) and transfer the labware on loading cart (1400) to assay system (1000), for example by following the same configurations and placements of the labware on trays (1408).

Another embodiment of cart (1400) is illustrated in FIGS. 15(*a*)-(*b*). This embodiment still has bottom, middle and top shelves (1402, 1404, 1406), respectively, along with front support (1412) and the back support. Compartments (1428) are still present on top shelf (1406), as well as support or mount (1420) which is adapted to hold or support laptop or tablet computer (1421). Mount (1420) may also charge the laptop or tablet either wirelessly or through a USB-type connection.

Advantageously, support (1420) in this embodiment has at least four joints to increase its degrees of freedom to six.

As shown, support (1420) has ball joint (1436) that connects to the flat support for the laptop/tablet (1421), elbow pivot (1438), elbow swivel (1440) and stem swivel (1442). As shown in FIGS. 15(*c*)-(*d*), ball joint (1436) has ball (1436*a*) clamped by socket (1436*b*). A threaded connector (1436*c*) connects the joint to support (1420).

As shown in FIGS. 15(*e*)-(*f*), elbow pivot (1438) has one threaded member (1438*a*) to allow rotational movement about the axis of threaded member (1438*a*), which has a polygonal or hexagonal hole (1438*b*) on its head to allow tightening. In further embodiments, the threaded member (1438*a*) may have any suitable mechanism for tightening, such as wings and/or a star shaped grip. In embodiments, the elbow pivot 1438 may include an alternate mechanism for arresting movement of the elbow pivot, such as, for example, a releasable trigger. Elbow swivel (1440) has a cylindrical threaded member (1440*a*) to allow rotational movement about the axis of cylindrical member (1440*a*). Similarly, as shown in FIG. 15(*g*), stem swivel (1442) has a cylindrical threaded member (1442*a*) to allow rotational movement about the axis of cylindrical member (1442*a*). Stem swivel (1442) is connected to top shelf (1406) or handle (1418) of cart (1400).

FIG. 15(*h*) illustrates the possible movements and the degrees of freedom that mount (1420) possesses. The support for laptop/tablet (1421) can also rotate, e.g., to be upside down (180°, 540°, etc.) or ¼ turn clockwise or counter clockwise (90°, −90°, 270° or −270°, etc.).

FIG. 15(*i*) illustrates a loaded cart (1400) with a holster for a handheld barcode reader (1444) being held and/or charged by the cart. Also included in FIG. 15(*i*) are tray slots 1476 and tray tabs 1477. The tray slots 1476 are sized and dimensioned to accommodate the trays 1408 when arranged in an upright position as shown in FIG. 15(*i*). The tray tabs 1477 are configured to provide support to the trays 1408 to maintain the trays 1408 in the upright position.

FIG. 15(*j*) illustrates another tray design that provides a defined location for the barcode reader holster (1444). Advantageously, the holster for the barcode reader has the same footprint as a multi-well plate, such as an MSD plate, and therefore the holster and the handheld barcode reader may be securely positioned on the cart in one of the available slots for the plates.

FIG. 15(*k*) shows an embodiment of the internal support (1450) within bottommost shelf (1402) of cart (1400) shown in FIGS. 15(*i*)-(*j*), where the bottommost shelf (1402) has a plurality of depressions (1475) adapted to receive round or rounded polygonal liquid containers (1007,1020), as illustrated in FIG. 15(*j*). Internal support (1450) provides the structure and rigidity to supports trays (1408) and bottles (1007, 1020). Internal support (1450) comprises bottle slots (1456) adapted to receive bottles (1007, 1020). Bottle slots (1456) are connected by webs (1458) to each other and to frame (1460). Tray slots (1462) are adapted to receive trays (1408). Internal support (1450) also has brackets (1462) to connect to legs (1410) or front support (1412). In one embodiment, internal support (1450) is made from a hard plastic and may be made from metal for example from casting and possibly by welding. A top cover and a bottom cover may sandwich internal structure (1450) therebetween to provide smooth top and bottom surfaces for bottom shelve (1402). Assay system (1000)'s controlling software and user interface (UI) or graphical user interface (GUI) may provide step-by-step instructions to a user or technician to load the labware, samples and consumables from the cart (1400) to assay system (1000). The GUI/UI can also prompt the user to collect and prepare reagents, and can guide the user in defining an experiment or assay to run. Alternatively, the cart (1400)'s software and UI or GUI prompts the user to collect and prepare reagents and a separate device guides the user in defining an experiment or assay to run. Thereafter, the GUI/UI may prompt the user to unload the labware, samples and consumable from the assay system for example to the cart (1400) after a run.

In another embodiment, the controlling software may communicate to selected or all users the status of the assay run, such as run start time, run finish time, error state/codes and/or requiring user's intervention, via the GUI/UI, e-mails, text messages, Bluetooth notification and other modes of communication. The present assay system or its controlling software may also have the capability to determine automatically at the end of the run whether the run was successful.

The software may be updated by downloading from the cloud or Internet or flash drive and may be initiated by the scanning of an identifier, e.g., barcodes or QR codes, of an assay kit before the running of the assay using said assay kit.

As described above, assay system (1000) may be considered a batch processing system, e.g., a discrete number of microplates is processed at a time. In an alternative, assay system (1000) operates as a continuous processing system.

While five shakers (1006), which can also be incubators, are shown and discussed herein, any number of shakers may be utilized and a corresponding number of plates may be processed by assay system (1000).

Barcode as used herein includes conventional barcodes that are 1-dimensional or comprise a series of parallel lines, and 2-dimensional barcodes also known as QR codes, which comprise square pixels in a substantially square tag. Barcodes may be replaced by other identification methods, including but not limited to, radio frequency identification (RFID). Barcodes and other identifiers may be located anywhere or any location on the multi-well plates, throughs, vials, tubes, assay kits, assay containers, assay kit containers or other labwares.

The pipette tips disclosed above may be disposable, as discussed. These tips which may be used to aspirate, to dispense, etc. may also be permanent or washable/reusable tips. Furthermore, the pipetting system may include a 8-channel pipetting arm as shown herein, or may include a 96-channel pipetting array, e.g., one pipette for each well in a 96-well multi-well plate. Alternatively, the pipetting system may have any number of channels or pipettes, e.g., 1, 2, 4, 8 96 or 384 channels.

Samples, reagents and/or diluents may be mixed in a tube, a trough, a multi-well plate or any container(s) by pipette mixing or other forms such as rotational agitation, magnetic mixing, mixing with disposable or reusable mixing bars or beads, and ultrasonic mixing, etc. The dilution plates discussed above may be diluted using the pipette mixing. For bulk dilutions, a peristaltic or syringe pump may be used. Dilution may be up to 100-fold or higher.

The inventive assay system (1000) may comprise other components, including but not limited to, a plate centrifuge, a mini-refrigeration system to hold or store temperature sensitive reagents, etc.

While the V-PLEX, U-PLEX, S-PLEX, PK or IG protocols are discussed herein, inventive assay system (1000) may be used with protocols known as ELISA protocols, for example, if the reader is a multi-mode microplate imaging reader or spectrophotometer.

An industry standard ANSI SLAS 4-2004 96-well microplate (8 rows x 12 columns) is discussed herein as a vessel for sample processing. However, sample processing may be carried out on any vessels, including but not limited to tubes, vials or any other sample collection container. Also, the microplate may have any number of wells, and any number of tubes and vials may be utilized. Furthermore, a combination of microplate having any number of wells and one or more tube(s)/vial(s) may be used in a single run.

In addition to the microplates described above, microplates with filter bottom can also be used, such filtration microplates are commercially available as Unifilter® from VWR International, LLC.

The training plate (1035) and the plate washing training plate (1102) may be stored within assay system (1000) to be available to the users to conduct re-training of the robotic system or other subsystem of assay system (1000).

The present disclosure is not to be limited in scope by the specific embodiments described herein. Indeed, various modifications of the invention in addition to those described herein will become apparent to those skilled in the art from the foregoing description and accompanying FIGS. Such modifications are intended to fall within the scope of the claims. Various publications are cited herein, the disclosures of which are incorporated by reference in their entireties. Trademarks and service marks are the property of their respective owners.

The invention claimed is:

1. A method for training a plate washer configured to wash a multi-well plate for use in an automated assay system including an ECL reader, the method comprising:
    placing a training plate in the plate washer, the training plate having a top surface including a plurality of divots, wherein a height of the top surface of the training plate when positioned in the plate washer corresponds to a height of a plate surface in wells of a multi-well plate when positioned in the plate washer and a number of the plurality of divots corresponds to a number of a plurality of aspiration tubes in the plate washer;
    placing a first shim of a known first thickness on top of the training plate;
    lowering the plurality of aspiration tubes toward the first shim to secure the first shim through contact with the plurality of aspiration tubes;
    raising the plurality of aspiration tubes until the plurality of aspiration tubes reaches a first height at which the first shim is unsecure;
    storing, by at least one processor associated with the plate washer, the first height as a minimum acceptable height corresponding to a minimum acceptable distance of the plurality of aspiration tubes from the plate surface in the wells during a washing procedure of the multi-well plate;
    replacing the first shim with a second shim of a known second thickness different than the first thickness on top of the training plate;
    lowering the plurality of aspiration tubes toward the second shim to secure the second shim through contact with the plurality of aspiration tubes;
    raising the plurality of aspiration tubes until the plurality of aspiration tubes reaches a second height at which the second shim is unsecure; and
    storing, by the at least one processor associated with the plate washer, the second height as a maximum acceptable height corresponding to a maximum acceptable distance of the plurality of aspiration tubes from the plate surface in the wells during the washing procedure of the multi-well plate.

2. The method of claim 1, wherein the first height corresponds to a first distance representing a minimum acceptable distance from the aspiration tubes to the plate surface in the wells during the washing procedure, and
    wherein the second height corresponds to a second distance representing a maximum acceptable distance from the aspiration tubes to the plate surface in the wells during the washing procedure.

3. The method of claim 1, wherein at least one of the first shim and the second shim includes a flexible material.

4. The method of claim 1, further comprising:
    lowering the plurality of the aspiration tubes into the plurality of divots of the training plate; and
    storing, by the at least one processor, horizontal coordinates of the plurality of aspiration tubes.

* * * * *